United States Patent [19]

Williams et al.

[11] Patent Number: 4,958,342

[45] Date of Patent: Sep. 18, 1990

[54] ADAPTIVE DIGITAL NETWORK INTERFACE

[75] Inventors: Stephen J. Williams, Denver, Colo.; Elden D. Traster, Richardson, Tex.

[73] Assignee: Aristacom International, Inc., San Francisco, Calif.

[21] Appl. No.: 435,276

[22] Filed: Nov. 9, 1989

Related U.S. Application Data

[63] Continuation of Ser. No. 234,262, Aug. 19, 1988, Pat. No. 4,935,925, which is a continuation of Ser. No. 24,345, Mar. 11, 1987, Pat. No. 4,882,727.

[51] Int. Cl.$^5$ ............................................. H04J 3/06
[52] U.S. Cl. .................................... 370/79; 370/102
[58] Field of Search ...................... 370/79, 80, 83, 102, 370/110.1

[56] References Cited

U.S. PATENT DOCUMENTS

| | | |
|---|---|---|
| 3,400,372 | 9/1968 | Beausoleil et al. . |
| 3,573,851 | 4/1971 | Watson et al. . |
| 3,676,846 | 7/1972 | Busch . |
| 3,886,317 | 9/1975 | Drapkin ........................... 370/110.1 |
| 4,065,862 | 1/1978 | Meyer . |
| 4,149,238 | 4/1979 | James et al. . |
| 4,156,111 | 5/1979 | Downey et al. ..................... 370/102 |
| 4,205,373 | 5/1980 | Shah et al. . |
| 4,228,499 | 10/1980 | Springolo et al. . |
| 4,261,035 | 4/1981 | Raymond . |
| 4,365,296 | 12/1982 | Ulmer . |
| 4,388,683 | 6/1983 | Beifuss et al. . |
| 4,419,728 | 12/1983 | Larson . |
| 4,428,042 | 1/1984 | Niethhamer et al. . |
| 4,442,502 | 4/1984 | Friend et al. . |
| 4,453,211 | 6/1984 | Askinazi et al. . |
| 4,511,969 | 4/1985 | Koenig et al. . |
| 4,542,498 | 9/1985 | Bodros et al. ........................ 370/79 |
| 4,569,046 | 2/1986 | Hadziomerovic et al. ...... 370/110.1 |
| 4,597,074 | 6/1986 | Demichelis et al. .................. 370/79 |
| 4,602,347 | 7/1986 | Koyama ............................. 365/231 |

OTHER PUBLICATIONS

"R8071 ISDN/DMI Link Layer Controller", Document No. 29300N18, Rockwell, Sep. 1986.
"R8070 TI/CEPT PCM Transceiver", Document 29300N14, Rockwell, Rev. 1, Jun. 1986.
"T7110 Synchronous Protocol Data Formatter with Serial Interface", AT&T, Jul. 1986.
"AN-10 Digital Multiplexed Interface Implementation", AT&T, Jan. 1985.

Primary Examiner—Douglas W. Olms
Assistant Examiner—Melvin Marcelo

[57] ABSTRACT

A multiplexing data communication system (10) provides for communication between a plurality of microcomputer terminals (12) with a host computer (30). Communications from the microcomputer (12) are multiplexed over a T1 line (26) between two DMI interfaces (22 and 24). The DMI interface (24) includes an adaptive digital network interface (62) which processes the multiplex data in a serial manner allowing for flexibility in framing the data and processing protocol information. Program control in the adaptive digital network interface (62) is performed in part by the status of three counters (266, 268 and 272) and the bit present at the output of the fifo memory (112) allowing for increased processing speeds. Furthermore, processing speed is enhanced through use of an instruction set allowing simultaneous strobing and enabling of the elements of the adaptive digital network interface (62).

26 Claims, 27 Drawing Sheets

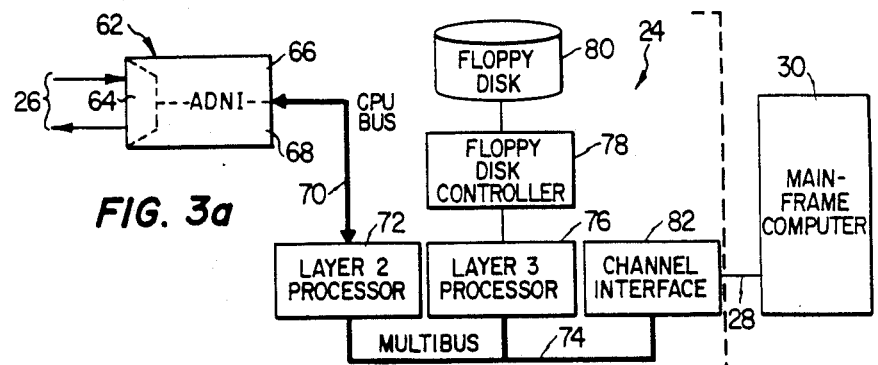
FIG. 3a
FIG. 3b
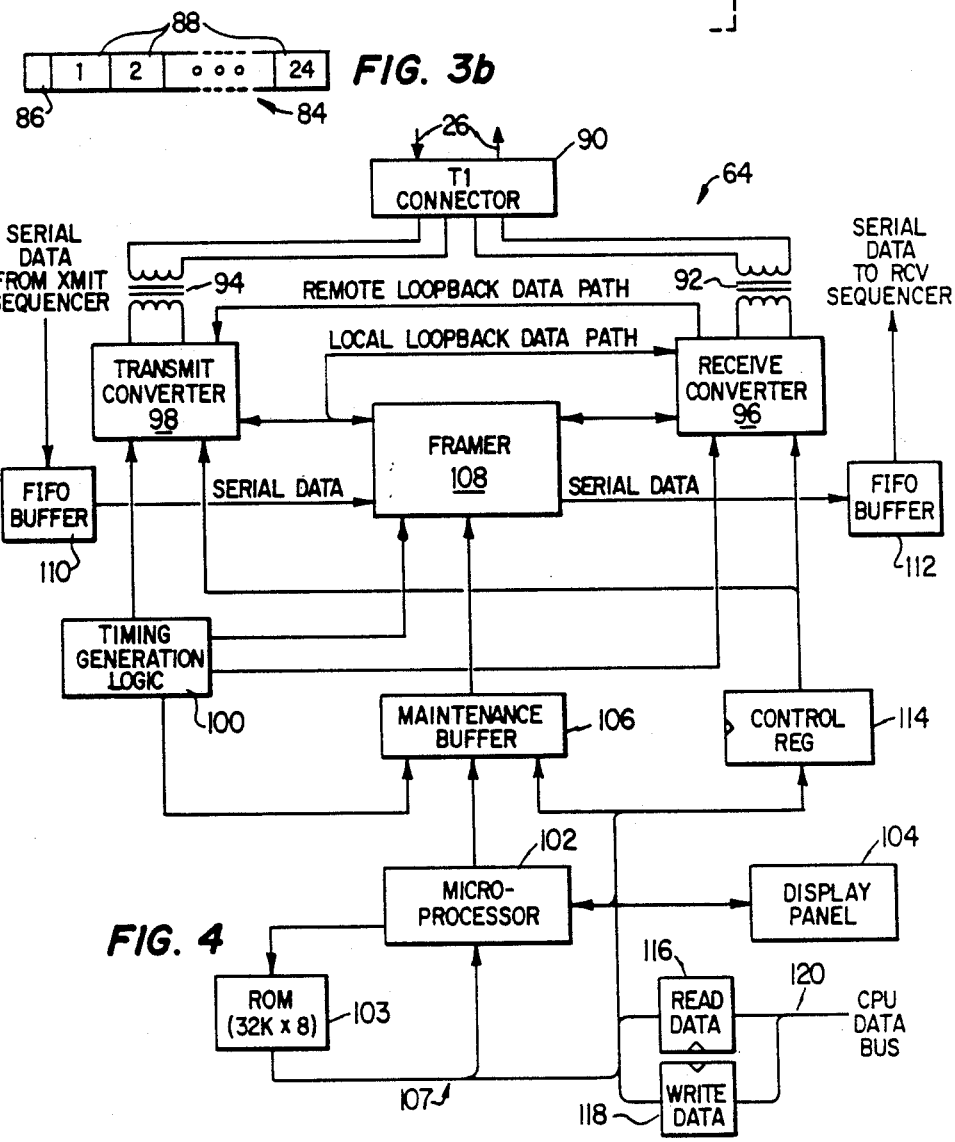
FIG. 4

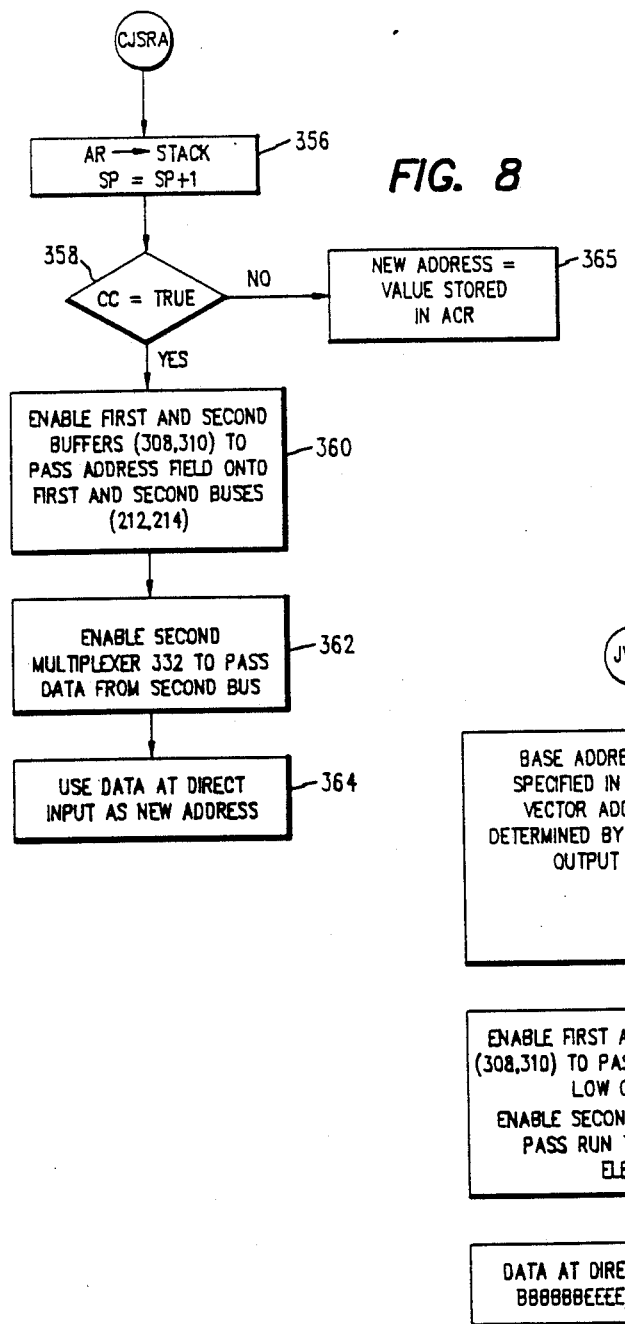

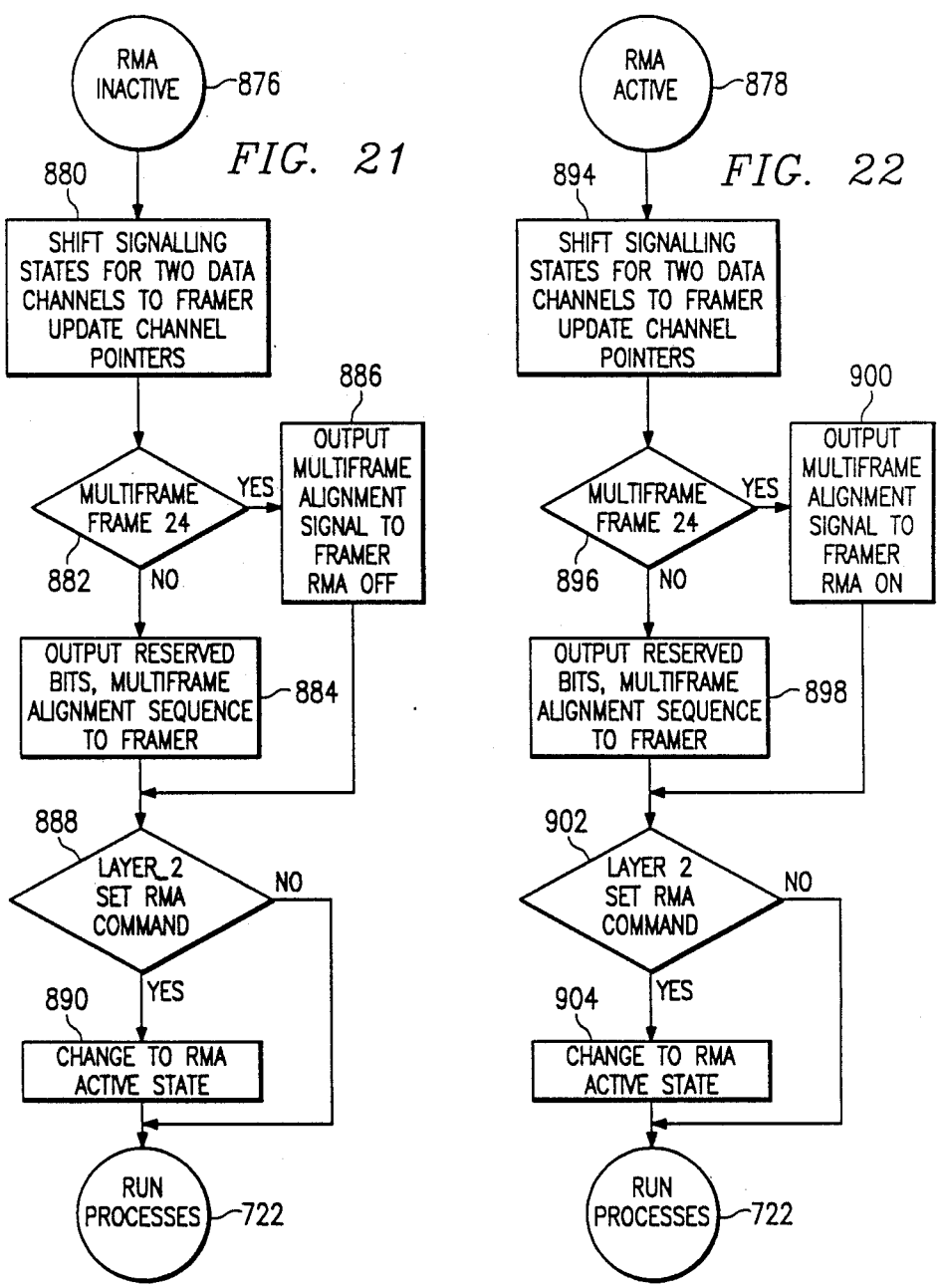

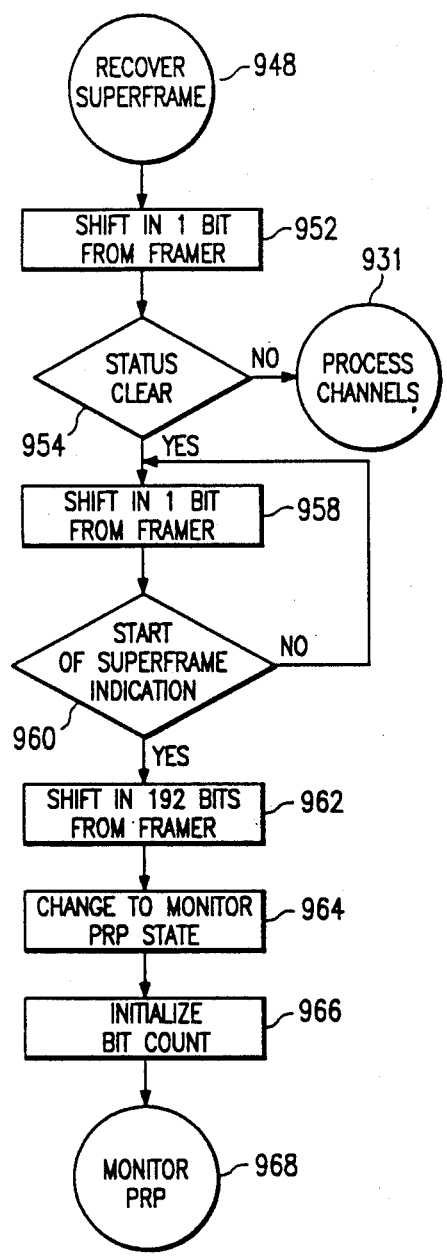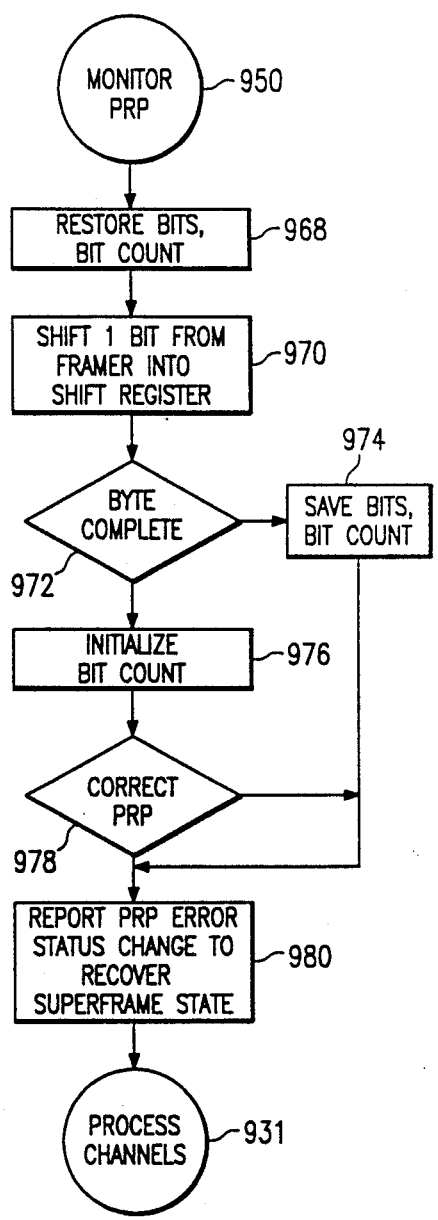
*FIG. 26*      *FIG. 27*

ADAPTIVE DIGITAL NETWORK INTERFACE

RELATED APPLICATIONS

This is a continuation of application Ser. No. 07/234,262, filed Aug. 19, 1988, now U.S. Pat. No. 4,935,925 which is a continuation application of Ser. No. 07/024,345, filed Mar. 11, 1987, and entitled "ADAPTIVE DIGITAL NETWORK INTERFACE", now U.S. Pat. No. 4,882,727, issued Nov. 21, 1989.

TECHNICAL FIELD OF THE INVENTION

This invention relates in general to a method and apparatus of transmitting and receiving data, and more particularly relates to a method and apparatus for transmitting and receiving multiplexed data.

BACKGROUND OF THE INVENTION

In the area of data communications, it is desirable to provide multiplexed data communications over a standard carrier. An application of multiplexed communications is to provide a link between a plurality of data terminals to a local host computer.

The Digital Multiplexed Interface (DMI) specification promulgated by AT&T Information Systems establishes a protocol for providing an interface between a computer and a PBX. In North America and Japan, the interface operates over a 1.544 Mbit/s channel (commonly referred to as a T1 channel), over which it provides 23 data communications channels and one signalling channel. Each data channel has a data rate of 64 kbps. In Europe, DMI operates over 2.048 Mbit/s facilities, providing 30 data channels and 1 signalling channel at a 64 kbps rate.

Hence, DMI allows switched access between a plurality of standard data terminals and a host computer over the 23 data channels (using the North America standard) Since the terminals may communicate with the host computer over two twisted pairs of wires, the DMI is a cost effective interface. The user may communicate with a host computer connected to his PBX, or with a host computer connected to a second PBX connected to the user's PBX.

DMI provides a fully implementable standard which is compatible with the Integrated Services Digital Network (ISDN) defined by the CCITT. A physical layer of DMI is based on the T1 carrier scheme. A frame format consists of 24 eight-bit words (octets) and one frame bit, resulting in a total 193 bits per frame. The 24 octets provide 24 communications channels; channels 1-23 carry data, while channel 24 provides signalling information relevant to channels 1-23.

Many T1 facilities have a "ones-density" requirement specifying the number of consecutive zeros which may be transmitted before a one is transmitted. The purpose of the ones-density requirement is to maintain the timing and synchronization of the communication equipment. A solution to the ones-density requirement is to use an inverted HDLC-based protocol. The DMI version of HDLC allows no more than seven consecutive ones to be transmitted without transmission of a zero; thus, an inverted HDLC data stream can contain no more than seven consecutive zeros. To implement the HDLC requirement, zeros are "stuffed" into the data stream during transmission; upon receiving the data stream, stuffed zeros are removed to recover the original data.

Presently available systems implementing DMI process the eight-bit communication channels in a parallel fashion. These systems use a standard chip set to support the physical layer; use of the standard chip set mandates conformance with the standard of twenty-four eight-bit data channels. Furthermore, HDLC processing is performed in parallel on a per-channel basis. Currently available HDLC processing chips allow up to two channels to be processed simultaneously, necessitating twelve chips to handle the full twenty-four channels.

A problem associated with present day systems is their rigid conformance to the present DMI specification. As ISDN is an evolving standard, and since DMI is intended to evolve with ISDN, it is desirable to implement the DMI interface such that the implementation may evolve with the specification. However, because of their reliance on parallel processing of eight-bit channels, present day systems would require substantial hardware modifications in order to meet future needs for data channels having transmission rates greater than 64 kbps. For example, further implementations may allow for different configurations of the 192 data bits provided in the T1 frame. One such configuration might allow for four eight-bit data channels and ten sixteen-bit data channels, or for a single 192 bit data channel. Also, it may be desirable in the future to deviate from the present standard of a 193-bit frame. In conclusion, any change in the framing configuration will render present day implementations obsolete.

Since present day systems cannot accommodate changes in the data channel bandwidth configuration, they cannot perform statistical multiplexing wherein a user with higher bandwidth requirements can be allocated additional channels, either by the user's request or by statistical analysis of the user's channel usage. Statistical multiplexing capability will be an important feature in future telecommunications systems.

HDLC chip sets further restrict the performance of present day DMI implementations, limiting the implementation to the HDLC protocol. Furthermore, the HDLC chips cannot selectively process bits in a channel's bit stream, and are therefore inoperable to process a 56 kbps mode using "rate adaption" wherein only seven bits of each eight bit data unit is used for data and the eighth bit is always set to one. Since HDLC processing in the 56 kbps mode is performed only on the seven data bits, the HDLC chips cannot be used effectively in a DMI implementation if a 56 kbps mode is a requirement of the system.

Therefore, a need exists in the industry to provide a method and apparatus for multiplexed data communications whereby the multiplexed data stream may be processed in a serial fashion to allow for flexibility in framing data and in protocol processing. Specifically, a need exists for a method and apparatus which allows the length of a frame and the configuration of data channels therein to be easily modified. Further, a need exists for a DMI implementation which can modify the bandwidth of data channels in response to a user's needs. Additionally, a need exists for a method and apparatus for multiplexed data communications with adaptable protocol processing.

SUMMARY OF THE INVENTION

In accordance with the present invention, a method and apparatus for transmitting and receiving time-multiplexed digital data is provided which substantially eliminates or prevents the disadvantages and problems associated with prior art communication systems.

In accordance with another aspect of the invention, a method and apparatus for transmitting and receiving serial time-multiplexed data over a digital carrier is provided wherein the processing of the data for protocol purposes is performed substantially concurrently with the time-multiplexing of the data onto (transmit) or from (receive) the appropriate channel. By performing processing and multiplexing concurrently, the communication system is capable of accommodating data channels having various bandwidths. The bandwidth of the multiplexed channels may be determined prior to transmission or determined dynamically, by adjusting the bandwidth of a particular channel as needed during transmission.

In a further aspect of the present invention, a method of transmitting data units over a plurality of channels is provided wherein a data unit is stored in a first memory capable of outputting individual bits of the data unit. Bits of the data unit are transmitted on a first channel, while a counter counts the number of bits of the data unit transmitted from the first memory. After the appropriate number of bits have been transmitted on the first channel, the untransmitted bits of the data unit are stored in a context memory along with the number of bits of the data unit transmitted from the first memory. Additionally, the number of consecutive ones or zeros transmitted may be stored in the context memory for protocol purposes.

In yet another aspect of the present invention, a method and apparatus for transmitting data units over a plurality of channels is provided wherein a plurality of data bits are stored in a first memory capable of outputting individual data bits. Three counters are used to count: (1) the number of data bits output from the first memory, (2) the number of consecutive data bits having the same binary value transmitted from the first memory, and (3) the number of bits transmitted on a first channel, including non-data bits transmitted for protocol purposes. Each of the counters generate a control signal upon reaching a predetermined value. A predetermined base address contained in an instruction is combined with the control signals from the three counters and a signal corresponding to the value of the next bit to be output from the first memory in order to address the next instruction to be performed. By using the run time values of the counter control signals and the output signal from the first memory to control program flow, processing speed is dramatically increased.

In yet a further aspect of the present invention, a method and apparatus of transmitting data over a plurality of time-multiplexed data channels is provided wherein a single instruction is used to control the operation of a plurality of elements in a transmit processor.

In another aspect of the present invention, a method for receiving data units over a plurality of channels is provided wherein bits are received on a first channel and stored in a first memory capable of inputting individual bits from the first channel. Counters are used to count the number of bits received on the first channel, the number of consecutive bits having a predetermined value, and the number of bits stored in the first memory. Non-data bits used for protocol purposes are removed from the data stream prior to storage in the first memory. If a partial data unit is received at the end of the first channel's time period, the number of bits of the partial data unit, the number of consecutive bits of a predetermined value, and the partial data unit are stored in the context memory until the first channel's next time period.

In a further aspect of the present invention, a method and apparatus for receiving data units over time-multiplexed data channels is provided wherein data bits are received on a first channel and data bits forming data units are stored in a first memory capable of receiving individual bits from the first channel. A first counter is used to count the bits received from the first channel, a second counter is used to count the number of consecutive bits having a predetermined binary value, and a third counter is used to count the number of bits received which are part of the data units. Non-data bits are removed from the data stream prior to storage in the first memory. Each counter is operable to output a control signal after a predetermined value has been reached. A predetermined base address contained in an instruction is combined with the control signals of the three counters and with a value corresponding to the last bit received to determine the address of the next instruction in instruction memory. By using the run time values of the counters as input to control program flow, the speed of the receive processor is greatly increased.

In yet another aspect of the present invention, a single instruction word has separate fields corresponding to elements in the receive processor such that any or all of the elements may be operated in a single command.

In yet a further aspect of the present invention, run time status information of processing elements are combined with predetermined base address bits of a first program instruction in order to determine the address of a subsequent program instruction.

BRIEF DESCRIPTION OF THE DRAWINGS

For a more complete understanding of the present invention and the advantages thereof, reference is now made to the following description taken in conjunction with the accompanying Drawings in which:

FIG. 3a illustrates a block diagram of a DMI interface;

FIG. 3b illustrates the configuration of a data frame;

FIG. 4 illustrates a block diagram of the physical interface portion of an adaptive digital network interface;

FIG. 7 is a flow diagram of the jump vector instruction;

FIG. 8 is a flow diagram of the conditional jump to subroutine, register/address instruction;

FIGS. 10-21 are flow diagrams relating to operation of the transmit processor portion of the adaptive digital network interface; and FIGS. 22-30 are flow diagrams of the operation of the receive processor portion of the adaptive digital network interface.

DETAILED DESCRIPTION OF THE INVENTION

The preferred embodiment of the present invention is best understood by referring to FIGS. 1-30 of the drawings, like numerals being used for like and corresponding parts of the various drawings.

Figure 1:
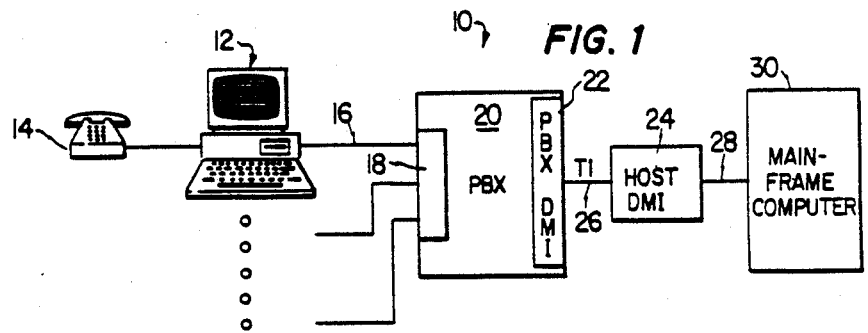
FIG. 1 illustrates a data communication system having a host computer and a plurality of terminals.

Referring now to FIG. 1 there is illustrated a communication system 10 using a digital multiplexed interface. A plurality of microcomputers 12, each with an associated digital phone 14 are each connected via a transmission line 16 to a port on a digital line card 18 in a private branch exchange (PBX) 20, typically an AT&T System 75 or System 85. The PBX 20 has a digital multiplexed interface (PBX DMI) 22 which is connected to a host DMI 24 (hereinafter DMI 24) via a T1 carrier line 26 (hereinafter T1 line) or other standard digital carrier. The DMI 24 is connected to a host computer channel 28, which is connected to a host computer mainframe 30.

In operation, the communication system 10 transmits both voice and data over the transmission line 16 and data over the T1 line 26. In the illustrated embodiment, the communication system 10 is shown in a configuration suitable for transferring data from a microcomputer 12 to the host computer mainframe 30. In the illustrated embodiment, the microcomputer 12 is an AT&T 6300 or 6300+, or another IBM PC compatible computer running MS-DOS (MS-DOS is a trademark of the Microsoft Corporation) and the host computer mainframe 30 is an IBM System 370 or compatible system. The host computer channel 28 is preferably a System 370 compatible I/O channel. However, the communication System 10 could also be implemented with other computer systems in the place of the AT&T 6300 and the IBM System 370 mainframe.

The digital line card 18 supports a plurality of transmission lines 16 using a digital communications protocol. The PBX 20 sets up a data channel between the microcomputer 12 and the DMI 24. The DMI 24 sets up a communications session between the microcomputer 12 and the mainframe 30 over the host computer channel 28. The operation of each of the constituent parts will be described in greater detail hereinbelow.

Figure 2:
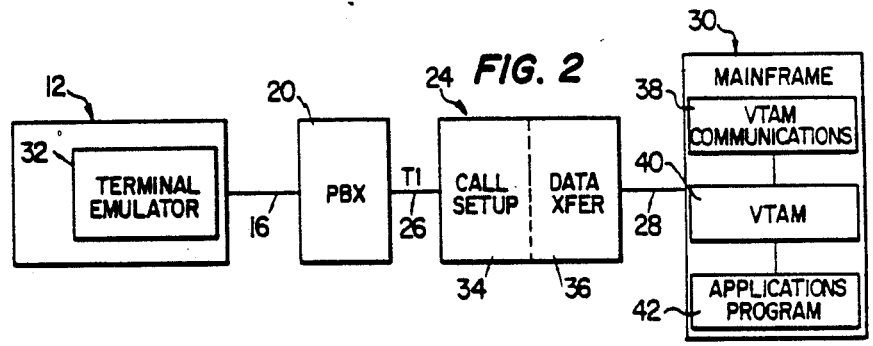
FIG. 2 illustrates a functional diagram of the communication system of FIG. 1.

Referring now to FIG. 2, a more detailed functional illustration of the communications system 10 is depicted The microcomputer 12 runs a terminal emulator program 32 which produces data for transmission over the transmission line 16. The data are transmitted through the PBX 20 and over the T1 line 26 to the DMI 24. The DMI 24 is functionally depicted as containing a circuit control section 34 and a data transfer section 36. The DMI 24 is connected through the IBM System 370 channel 28 to the host computer mainframe 30, which is shown running a VTAM (Virtual Telecommunications Access Method) communications application 38, a VTAM program 40 and a general applications programs 42.

The VTAM communications program is designed to allow a circuit switching network to interface with the IBM VTAM program which was designed to operate with direct lines, rather than circuit switching networks.

Figure 2A:
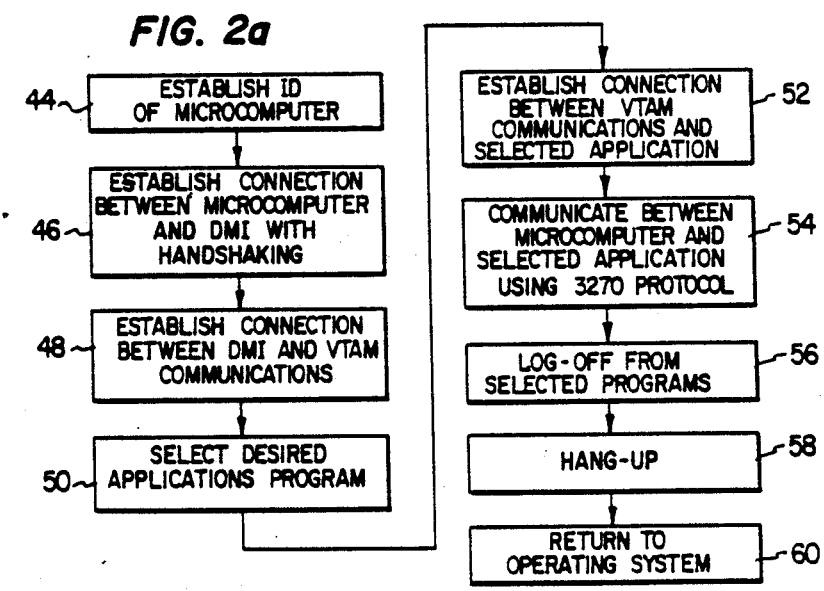
FIG. 2a is a flow diagram illustrating the operation of a terminal emulator program.

The operation of the terminal emulator program 32 is detailed in the flow chart of FIG. 2a. In step 44, an ID is established which is used to identify the terminal in subsequent operations of the communications system 10. Next, in step 46, communications between the DMI 24 and the microcomputer 12 are established, verified by a "handshake" between the microcomputer 12 and the DMI 24. Once the connection has been established between the microcomputer 12 and DMI 24, the DMI establishes a connection to the VTAM communication application 38 in step 48, thus providing a connection from the microcomputer 12 to the host computer mainframe 30. In step 50, the operator may choose a particular general application program 42 with which he wishes to communicate. In step 52, a connection between the VTAM communications application program 38 and the chosen general application program 42 is established. In step 54, communication proceeds between the microcomputer 12 and the mainframe 30 using IBM 3270 or other suitable terminal protocol. After the desired communication is completed, the user logs off in step 56, terminating the connection between the VTAM communications application program 38 and the general application program 42. After log-off, "hang-up" occurs in step 58, disconnecting the microcomputer 12 from the communication application 38, and in step 60, the microcomputer returns its control to the MS-DOS operating system.

The VTAM communication application 38 sets up the communications path with the terminal emulator 32. Once this communication path is established, the terminal emulator 32 requests a communication with a particular general application program 42, which the VTAM communication application 38 establishes as a logical unit to a logical unit communication session through VTAM 40. Once the logical unit to logical unit connection is established, the VTAM communication application 38 passes data between the terminal emulator 32 and the particular general application program 42. When the logical unit communication session is terminated, the VTAM communication application 38 disconnects the connection between the VTAM communication application 38 and the particular general application program 42, and maintains communication with terminal emulator 32 while waiting for another log-on request. If the communication path between the terminal emulator 32 and the VTAM communication application 38 is broken, the logical unit to logical unit session with the particular general application program 42 will also be terminated.

The data transfer section 36 of the DMI 24 has two primary functions. The first function is to segment and reassemble data packets that pass between the terminal emulator 32 and the VTAM communication application 38. The second purpose of the data transfer section 36 is to control the flow of data between the terminal emulator 32 and the VTAM communication application 38, i.e., to control the rate at which data is passing through the data transfer section 36. The data transfer section 36 will be discussed in more detail in connection with FIGS. 3-22.

The circuit control section 34 establishes a circuit connection through the PBX 20, between the DMI 24 and the microcomputer 12. The circuit control section 34 also performs handshaking for initialization purposes with the microcomputer 12 and informs the data transfer section 36 that a connection has been established. In addition, the circuit control section 34 transfers data to the data transfer section 36 while performing error detection routines.

Referring now to FIG. 3a, the DMI 24 is illustrated. A T1 transmission line 26 connects to an adaptive digital network interface (ADNI) 62. The ADNI 62 is functionally divided into a physical interface 64, a receive processor 66, and a transmit processor 68. The ADNI 62 connects via CPU bus 70 to a first processor board 72 (hereinafter, the "layer 2" processor 72). The layer 2 processor board 72 connects to a processor bus (hereinafter "multibus") 74. A second processor board 76 (hereinafter, the "layer 3" processor 76) also connects to the multibus 74 and interfaces with a floppy disk I/O board 78 and a floppy disk 80. An IBM channel interface board set 82 is connected between the multibus 74 and the IBM System 370 channel 28. The IBM System 370 channel 28 is connected to the IBM System 370 mainframe 30.

Data is received by the ADNI 62 over the T1 transmission line 26 from the PBX DMI 22. Data is transmitted over the T1 line 26 in "frames" of 193 data bits. The structure of a frame 84 is shown in FIG. 3b. The first bit is a framing bit 86 used to delimit the frames and, in some framing formats, to convey maintenance information. The next 192 bits comprise twenty-four 8-bit time slots 88, each time slot corresponding to one of the 24 channels. Channels 1-23 comprise data communication channels, whereas channel 24 carries signalling information for the 23 data channels and is referred to as the "signalling" channel. A "superframe" comprises either 12 or 24 frames 84, depending upon the framing format (D4 or ESF) employed by the system. The start of a superframe can be detected by a predetermined bit pattern occurring in the framing bits 86.

In the preferred embodiment, data is transmitted using an inverted-HDLC protocol. Since this protocol "stuffs" bits into the data stream during transmission and removes the stuffed bits during reception, the eight bit data channels will not always contain integral (whole) bytes; rather, integral bytes will be split between frames.

The ADNI 62 provides bidirectional communications between the T1 line 26 and layer 2 processor board 72. The transmit processor 68 ("transmission" is used in the document to describe the flow of data from the ADNI 62 to the T1 line 26, while "reception" is used to describe the flow of data from the T1 line 26 to the ADNI 62) of the ADNI 62 multiplexes 8-bit data from the twenty-four available channels 88 and adds the framing bit 86 to produce one frame 84 of data for transmission. The receive processor 66 of the ADNI 62 receives a frame 84 of data, checks the framing bit 86, and demultiplexes the 192 data bits into twenty-four 8-bit data channels 88. As previously stated, twenty-three of the channels are used for the data communication, and the 24th channel is used for circuit "set-up" and "tear-down".

In the described embodiment, channel 24 performs bit oriented signalling (BOS) procedures. Importantly, channel 24 contains signalling state information from channels 1-23, namely, "on-hook", "off-hook", "wink" and "dial" pulse signal information. The transmit processor 68 of the ADNI 62 multiplexes signalling state information from channels 1-23 on to channel 24. Likewise, the receive processor 66 of the ADNI 62 demultiplexes signalling state information for channels 1-23 from channel 24.

The ADNI 62 also performs HDLC bit level procedures on channels 1-23, including flag generation and detection for delimiting HDLC frames, abort sequence detection, bit stuffing and removal (transparency), and CRC generation and checking. In addition, the ADNI 62 performs per channel inversion of the bit stream on channels 1-23 in order to ensure proper "ones density" on the T1 line 26.

The layer 2 processor board 72 performs additional signalling (call set-up and tear-down) and additional HDLC operations. With respect to signalling functions, the layer 2 processor board 72 establishes, maintains and clears circuit connections using the discrete BOS (bit oriented signalling) procedures provided by the ADNI 62. The layer 2 processor board 72 also performs additional HDLC functions by passing segments of data, with sequence numbering and control information added, to and from the ADNI 62. Based on the sequence numbering, detection of transmission errors and requests for retransmission are performed.

The layer 3 processor board 76 has three primary functions. First, the layer 3 processor board 76 segments large blocks of data received from the channel interface 82 into smaller packets for transmission to the layer 2 processor board 72. Likewise, the layer 3 processor board 76 combines segments received from the layer 2 processor board 72 into larger data blocks for transmission to the channel interface 82. Secondly, the layer 3 processor board 76 controls the flow of data, such that the flow of data may be reduced in response to control signals between the microcomputer 12 and the layer 3 processor 76. Thirdly, the layer 3 processor board 76 directs the channel interface 82 to output control sequences to enable data to be transferred on the channel 28.

The layer 3 processor board 76 also receives programs through the floppy disk 80, such programs being subsequently stored upon the layer 3 processor board 76, the layer 2 processor board 72 and the ADNI 62. These programs allow the communication system 10 to be adapted to different communication standards.

The channel interface board 82 provides the electrical interface to the channel 28 and provides discrete channel control functions under the control of the layer 3 processor board 76 for directing data flow on the IBM System 370 channel 28. A board set implementing the channel interface functions for a multibus system may be purchased from the Auscom Corporation of Austin, Tex.

Referring now to FIG. 4, the physical interface 64 of the ADNI 62 is shown in detailed block diagram form. The T1 line 26 is connected to a T1 connector 90 which is connected to a receive pulse transformer 92 and a transmit pulse transformer 94. The receive pulse transformer 92 is also connected to a receive converter 96, while the transmit pulse transformer 94 is connected to a transmit converter 98. Both the receive converter 96 and the transmit converter 98 receive signals from a timing generation circuit 100. A remote loopback path exists between the receive converter 96 and the transmit converter 98. A microprocessor 102 uses a storage ROM 103 for storing the program for the microprocessor 102. The microprocessor 102 is connected to a display panel 104 and a maintenance buffer 106 via a microprocessor bus 107. A framer 108 is connected to the receive converter 96, the transmit converter 98, the timing generation circuit 100 and the maintenance buffer 106. A local loopback data path exists between the receive converter 96 and the framer 108. The framer 108 is also connected to a transmit fifo 110 and a receive fifo 112 which act as buffers between the transmit processor 68 and the receive processor 66 of the ADNI 62. The transmit 68 and receive 66 processors of the ADNI 62 will be discussed in greater detail in relation to FIGS. 5 and 9. A feedback control register 114, a "read data" register 116, a "write data" register 118 and the storage ROM 103 are connected to the microprocessor bus 107. The read data register 116 and write data register 118 interface the microprocessor bus 107 with a CPU data bus 120 which is part of the CPU bus 70. The control register 114 is connected to the transmit 98 and receive 96 converters.

The T1 connector 90 connects the ADNI board 62 to the T1 line 26. In the preferred embodiment, the T1 connector is a 15 pin "D" connector which has a pair of pins for transmit purposes and a pair of pins for receive purposes. The receive and transmit pulse transformers 92 and 94 respectively are designed for impedance matching purposes, such that the transmit converter 98 can drive signals on the T1 line 26 and that receive converter 96 can receive signals from the T1 line 26. The display panel 104 is used to indicate status information of the physical interface 64 and the receive processor 66.

The primary function of the receive converter 96 is to extract clock and PCM (pulse-coded modulation) information from the incoming T1 bipolar digital line 26 and to regenerate unipolar clock and dual-rail PCM signals. The receive converter 96 converts the T1 bipolar signal to a dual-rail, 100% duty cycle, TTL-compatible signal. The dual-rail output is required to detect bipolar violations. The receive converter 96 extracts the clock from the line signal using a phase-locked loop. In order for the receive converter 96 to lock-on to the incoming signal, there must be a minimum ones density of at least one "1" per every sixteen bits, i.e., a maximum of fifteen 0s in a row. In the preferred embodiment, this is accomplished by using inverted HDLC coding; however, it may also be accomplished using a B8ZS line coding technique. The receive converter 96 also has two loopback modes. In the local loopback mode, data transmitted by the framer 108 is used by the receive converter 96 as receive input, rather than the T1 line 26. In the remote loopback mode, data received by the receive converter 96 is used as transmit data by the transmit converter 98, rather than transmit data from the framer 108. In the preferred embodiment, the receive converter 96 is implemented using an AT&T 63OAG receive converter hybrid integrated circuit.

The transmit converter 98 receives a dual-rail serial data stream from the framer 108 and drives the transmit pulse transformer 94. The transmit converter 98 is needed to provide power gain to the transmit pulse transformer 94 and is operable to equalize the outgoing signal to compensate for cables of different lengths between the DMI 24 and PBX DMI 22. The transmit converter 98 will generate an "all 1s" pattern upon a proper command. It also provides a loop-back function. In the preferred embodiment, the transmit converter is implemented by a AT&T 606HM transmit converter hybrid integrated circuit.

The control register 114 receives data from the microprocessor 102 regarding control modes. The control register 114 also receives data from the layer 2 processor 72, through the microprocessor 102, regarding the desired compensation of the signal transmitted from the transmit converter 98 for equalization purposes.

The framer 108 receives a dual-rail TDM data signal from the receive converter 96. The framer 108 detects boundaries and monitors the received data stream for facility trouble conditions and facility alarms. Detected trouble conditions and alarms are reported through the maintenance buffer 106. Receive data signals from the framer 108 are stored in the receive fifo 112 for access by the receive processor 66 of the ADNI 62.

The framer 108 also receives serial unipolar TDM data signals from the transmit fifo 110. The signals ar processed by the framer 108, including the addition of framing information, and the resultant dual-rail bipolar TDM signal is output to the transmit converter 98, and is subsequently output to the transmit pulse transformer 94. The framer 108 performs both line-format and frame-format conversions. The transmit line-format processing converts the frame-formatted TDM bit stream into a dual-rail bipolar or modified bipolar output signal.

In the preferred embodiment, the framer 108 is implemented using the AT&T 229CG framer integrated circuit. The AT&T 229CG framer has multiple line format capabilities (bipolar, B8ZS, AMI, and HDB3) and multiple frame-format capabilities (D2, D3, D4, ESF, and DDS).

The maintenance buffer 106 provides an interface between the framer 108 and the microprocessor 102. It also performs preprocessing of alarms from the framer 108, outputs framer control data to the framer 108, controls external devices through general purpose output latches, and monitors and reports external device status, specifically loss of signal and remote loopback requests. In the preferred embodiment, the maintenance buffer 106 is implemented with an AT&T 229FB maintenance buffer.

The microprocessor 102 communicates with the layer 2 processor 72 over the CPU bus 70.

The timing generation circuit 100 provides two basic clock circuits. A jumper option on the ADNI board 62 allows timing generation from the T1 connection or from an on board 4.096 MHZ oscillator. If the option is for timing from the T1 line, a crystal controlled phase lock loop circuit will provide a 4.096 MHZ signal that is phase locked to the recovered receive clock from the receive converter 96. In either case the 4.096 MHz clock will have divider circuitry and 6.176 MHz phase locked loop circuitry that will be used to generate the 1.544 MHz system clock and other timing signals.

The purpose of the fifos 110 and 112 is to provide synchronization and translation of different rates between the physical interface section 64 and the transmit 68 and receive 66 sections of the ADNI board 62. In the preferred embodiment, each fifo 110 and 112 comprises a 64 bit buffer. The purpose of the fifos 110 and 112 is to allow the receive 66 or transmit 68 processors to temporarily run at speeds faster or slower than the physical interface section 64 without loss of data. Thus, the receive processor 66 need not process each bit at the same rate as the physical interface section 64 so long as the average bit processing rate remains the same. If either the receive processor 66 or the transmit processor 68 process the data at a rate such that either the transmit fifo 110 is full or the receive fifo 112 is empty, the clock to the respective processor 68 or 66 will be stopped until the physical interface section 64 can recover.

Figure 5:
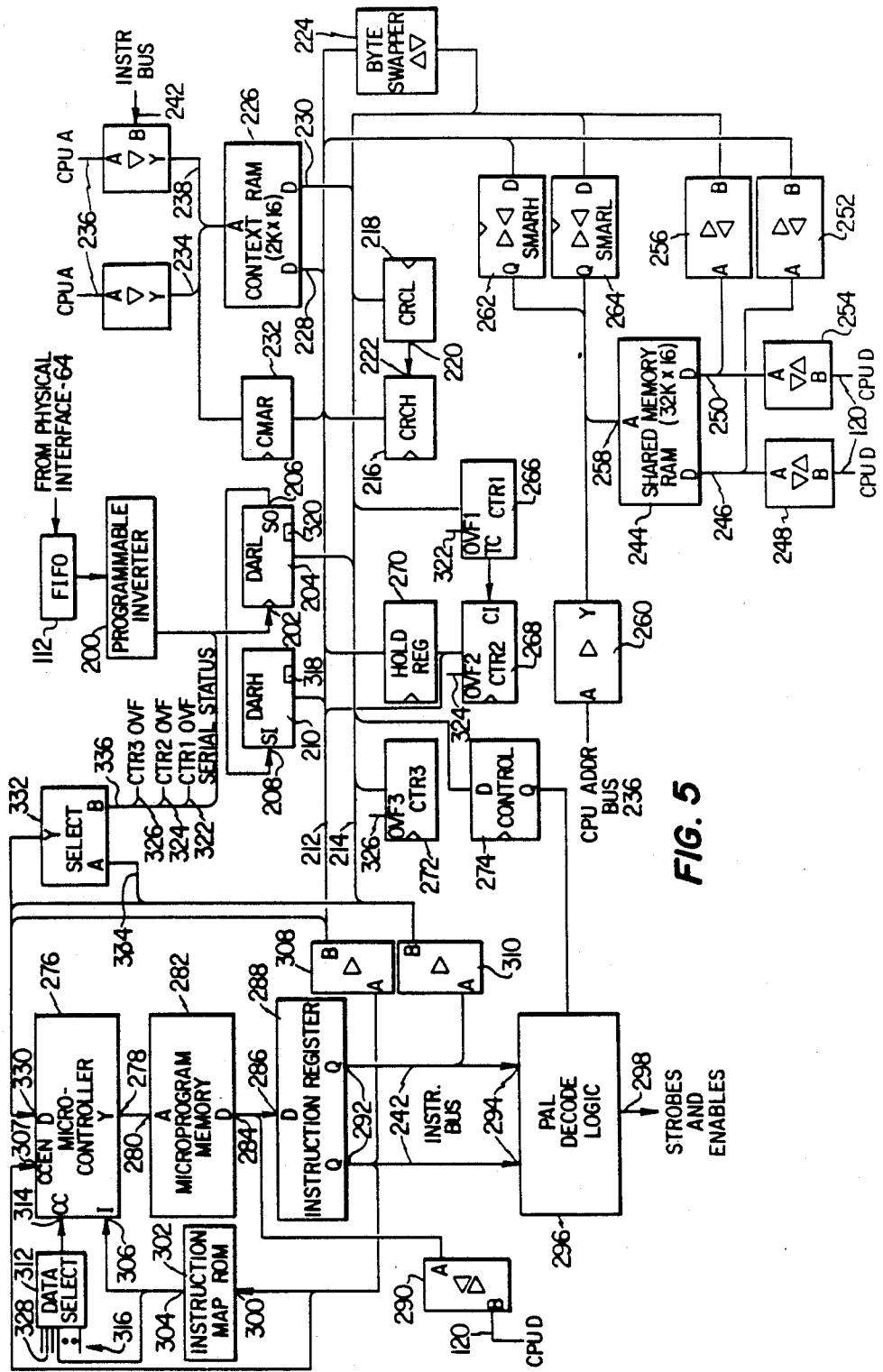
FIG. 5 illustrates the receive processor portion of an adaptive digital network interface.

Referring now to FIG. 5, the receive processor 66 is illustrated. As described above, the receive fifo 112 connect the physical interface section 64 with the receive processor 66. The receive fifo 112 is connected to a programmable inverter 200 which is connected to a shift-in port 202 of a low data register 204. A shift-out port 206 of the low data register 204 connects to a shift-in port 208 of a high data register 210. The high data register 210 is also connected to a first bus 212. The low data register 204 is connected to a second bus 14. A high CRC (Cyclic Redundancy Code) register 216 is connected to the first bus 212. A low CRC register 218 is connected to the second bus 214. A shift-out port 220 of the low CRC register 218 connects to a shift-in port 222 of the high CRC register 216. Data may be transferred between the first bus 212 and the second bus 214 through bus transceiver 224. A context memory 226 has a high order data output 228 and a low-order data output 230 connected to the first bus 212 and second bus 214 respectively. A context memory address register 232 is connected between the first bus 212 and the high order address input 234 of the context memory 226. A CPU address bus 236 may also access the high order address input 234. The low-order address input 238 is accessed by the CPU address bus 236 and an instruction bus 242.

A shared memory 244 has a high order data port 246 which connects to a CPU data bus 12 through data transceiver 248 and to the first bus 212 through data transceiver 252. A low-order data port 250 is connected to the CPU data bus 120 through data transceiver 254 and to the second bus 214 through data transceiver 256. The address port 258 of the shared memory 244 is connected to the CPU address bus 236 through address buffer 260 and to the first and second buses 212 and 214 through address registers/transceivers 262 and 264, respectively.

A first counter 266 is connected to the second bus 214. A second counter 268 is connected to the first bus 212 and to a holding register 270, which is connected to the first bus 212. A third counter 272 is connected to the second bus 214. The first counter 266 is connected to the second counter 268 to form a 16 bit counter when desired. The second bus 214 is also connected to the input of a control register 274.

A microcontroller 276 has an address output 278 which is connected to an address input 280 of a microprogram memory 282. The microprogram memory 282 has a data output 284 connected to an input port 286 of an instruction register 288, and through a transceiver 290 to the CPU data bus 120. Data from an output 292 of the instruction register 288 is placed on the instruction bus 242. The address port 294 of a logic array 296 is connected to the instruction bus 242. The logic array 296 has an output 298 which sends control signals which control the various elements of the receive processor 66. The instruction bus 242 is also connected to an address port 300 of an instruction ROM 302 having an output port 304 connected to the instruction port 306 of the microcontroller 276. One line of the instruction bus 242 is connected to the condition code enable (CCEN) port 307 of the microcontroller 276. Some of the high order lines of the instruction bus 242 output data to the first bus 212 through a first buffer 308; the low order lines of the instruction bus 242 output data to the second bus 214 through a second buffer 310. A first multiplexer/register (hereinafter "first multiplexer") 312 outputs a "true" (logical 1) or "false" (logical 0) signal to a condition code port 314 of the microcontroller 276. The input 316 of the first multiplexer 312 receives signals from the high data register compare port 318, the low data compare port 320, a first counter overflow pin 322 of the first counter 266, a second counter overflow pin 324 of the second counter 268, a third counter overflow pin 326 of the third counter 272, the inverter 200, a superframe status signal 328 from the framer 108, and the instruction ROM 302.

The microcontroller 276 has a direct input 330 which receives an eleven bit address. The direct input 330 receives three bits of the address from the first bus 212, four bits from the second bus 214 and four bits from a second multiplexer 332. The four bits of the second bus 214 directly available to the direct input 330 comprise the three highest order bits and the lowest order bit. The second multiplexer 332 selects from either a first group 334 of the four remaining intermediate bits from the second bus 214, or a second group 336 of four bits comprised of the first counter overflow signal 322, the second counter overflow signal 324, the third counter overflow signal 326 and the output of the inverter 200.

In the preferred embodiment, the high data register 210 and the low data register 204 are eight-bit shift registers which may be used together as a sixteen-bit shift register. Also, the data registers 210 and 204 may be used for comparing data stored in the data registers 210 and 204 with data present on the first and second buses 212 and 214, respectively. The data registers 210 and 204 have compare ports 318 and 320 which each comprises three pins: a gt (greater than) pin, a lt (less than) pin, and an eq (equal) pin. In response to a compare instruction, one of these pins outputs a true signal, while the other two output false signals. The signals from the compare ports 318 and 320 are connected to the first multiplexer 312. Fairchild 74F524 shift registers may be used to implement the functions of the high and low data registers 210 and 204.

The high and low CRC registers 216 and 218 are used to generate a CRC code which is used to verify that the data was not altered during transmission. In the preferred embodiment, the CRC registers may also be used as eight-bit shift registers which may be combined to create a single sixteen-bit shift register. The CRC registers may be implemented with a programmable logic array (PLA).

The first, second and third counters 266, 268 and 272 ar eight-bit counters. The first and second counters 266 and 268 may be combined to provide a sixteen-bit counter. The holding register 270 is provided to load a predetermined value into the second counter 268 for resetting the second counter 268 purposes, without accessing the first bus 212.

The context memory 226 is configured as a 2K x 16 RAM. The shared memory 244 is configured as 32K x 16 RAM. The microprogram memory 282 is implemented as a 2K x 16 RAM.

The control register 274 is an eight-bit register used to control programmable functions of the hardware. In the receive processor the control register 274 stores six control bits as shown in Table 1.

TABLE 1

| | Allocation of Bits of the Control Register Receive Processor | |
|---|---|---|
| Bit | Name | Operation |
| 0 | INV | 0 - Don't invert data shifted out of FIFO |
| | | 1 - invert data shifted out of FIFO |
| 1 | CRCEN | 0 - Use CRC registers as a shift register |
| | | 1 - Use CRC registers as CRC registers |
| 2 | SHFTL | 0 - Shift CRC right |
| | | 1 - Shift CRC left |
| 3 | not used | |
| 4 | CTR21 | 0 - Use first and second counters |

TABLE 1-continued
Allocation of Bits of the Control Register
Receive Processor

| Bit | Name | Operation |
|---|---|---|
| | | separately |
| | | 1 - Use first and second counters together as a sixteen bit counter |
| 5 | not used | |
| 6 | CTR2U | 0 - second counter counts up |
| | | 1 - second counter counts down |
| 7 | CTR1U | 0 - first counter counts up |
| | | 1 - first counter counts down |

The first multiplexer reg 312 contains the internal logic necessary to perform the logic operations discussed in connection with the CMP (Compare) SCC (Set Condition Code and TST (Test) instructions discussed below. The first multiplexer 312 is preferably designed from a programmable logic array (PLA).

An Advanced Micro Devices AM2910A microprogram controllor may be used to implement the microcontroller 276. The purpose of the microcontroller 276 is to control the sequence of execution of microinstructions stored in the microprogram memory 282. For each microinstruction time period, the microcontroller 276 provides an 11-bit address from one of four sources: (1) an internal microprogram address register (AR), which usually contains an address one greater than the previous address; (2) an address provided at the direct input 330; (3) an internal address/counter register (ACR), retaining data loaded during a previous microinstruction; or (4) an internal 9-deep last-in, first-out (LIFO) stack.

The microcontroller 276 responds to sixteen control instructions, which are presented at the 4-bit instruction port 306. Additionally, the effect of some of the control instructions depends upon the signals present at the condition code port (CC Port) 314, and condition code enable port (CCEN) 307.

The microinstructions, stored in the microprogram memory 282, are sixteen bits long. Generally, five bits of the microinstruction (the "instruction bits") indicate the action to be taken, and the remaining 11 bits are used as parameters. Four of the instruction bits address the instruction ROM 302, which interprets the instruction bits and outputs a control instruction to the instruction port 306 of the microcontroller 276. For example, in a "move" instruction, the first four bits indicate that the effect of the instruction is to move data from one register to another and the remaining 12 bits specify the source and destination registers. In response to the instruction bits, the instruction ROM 302 will output a control instruction to the microcontroller 276 to output the contents of address register (AR) as the next address, to increment the address presently at the output 278 of the microcontroller 276. In order to facilitate understanding the operation of the receive processor 66, the microinstructions will be described in detail hereinbelow.

Figure 6A:
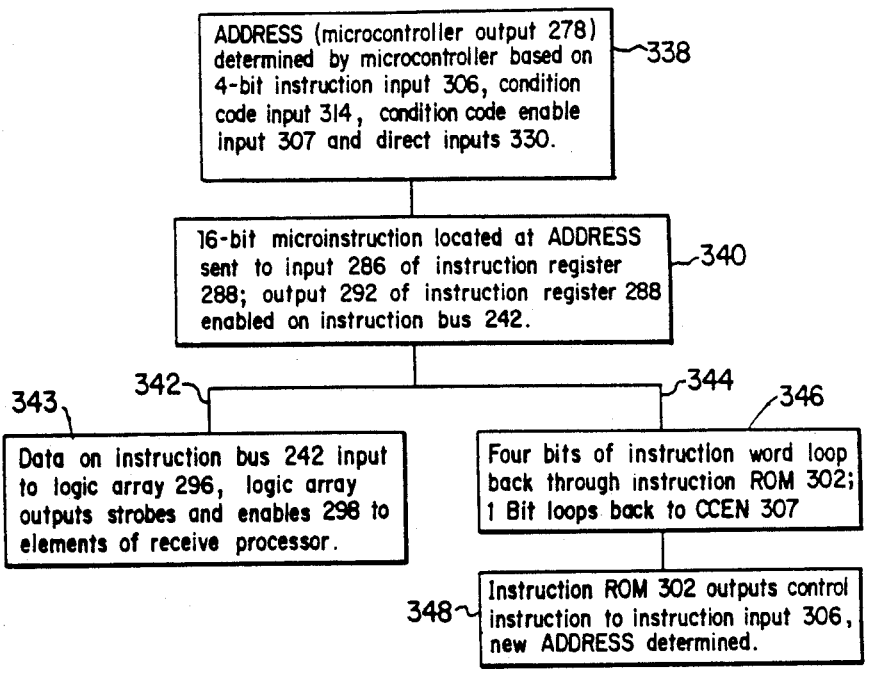
FIG. 6a illustrates the operation of a system microinstruction.
Figure 6B:
FIG. 6b illustrates the general format of the system microinstruction.

Referring now to FIGS. 6a-b, the format and operation of the microinstructions stored in the microprogram memory 282 is given. In block 338, the microcontroller output 278 (hereinafter "ADDRESS") is determined by the microcontroller 276. The determination of ADDRESS is based on the data presented at the instruction port 306, the data at the condition code port 314, and the data at condition code enable port 307. The data at the condition code port 314, instruction port 306, and condition code enable port 307 determines the source of the next ADDRESS; the source will be either the data at the direct inputs 330, the data in the internal address register (AR) containing the next sequential address, the data stored in the internal counter/register (ACR), or the data in the internal LIFO stack. In block 340, the microprogram memory outputs the sixteen-bit instruction stored at ADDRESS; the instruction is subsequently stored in the instruction register 288. The output 292 of instruction register 288 is available to the instruction bus 242.

After the instruction is available on the instruction bus 242, simultaneous actions take place as indicated by flow lines 342 and 344. Following flow line 342 to block 343, the data present on the instruction bus 242 is received by the input 294 of the logic array 296 along with the output of the control register 274. In response to the data from the instruction bus 242 and the control register 274, the logic array outputs strobes and enables 298 to the constituent elements of the receive processor (the counters, buffers, transceivers, data registers and memories). For example, a STRB (strobe) instruction may be structured to increment first counter 266 and second counter 268. This instruction, once available on the instruction bus 242, would be decoded by the logic array 296, which would issue the correct control signals to the first counter 266 and the second counter 268 to implement the instruction.

Some instruction words may include data as part of the instruction. For instance, an instruction word may include a number to be loaded into one of the counters 266, 268, 272 or into the direct input 330 of the microcontroller 276. This data is available to the first and second bus 212 and 214 through first and second buffers 308 and 310. Thus, in order to load data provided by the instruction word into a device on either bus, the logic array 296 must enable the buffers 308 and 310 in order to provide communications between the buses.

In blocks 346 and 348, following flow line 344, the flow of the instruction from the instruction register 288 through the instruction ROM 302 is shown. In block 346, four bits from the instruction word are used as an input to the instruction ROM 302. In response, the instruction ROM 302 outputs a control instruction to the microcontroller 276 which, along with the condition code input 314 and condition code enable port 307, determines the next ADDRESS, as indicated in block 348. The condition code enable port 307 is used to determine whether the data at the condition code port 314 is used to modify the ADDRESS. For example, the output of the instruction ROM 302 may instruct the microcontroller 276 to use the address register AR (containing the next sequential address) as the new ADDRESS, or it may instruct the microcontroller 276 to jump to a new ADDRESS as indicated by the direct inputs 330, depending upon the data present at the condition code port 314.

In FIG. 6b, the general format of an instruction word is illustrated. Each instruction word 350 is sixteen-bits wide, using either four or five of the most significant bits to indicate the instruction code by "I" in FIG. 6b) for the particular instruction. The remaining eleven or twelve bits of the instruction word are used as "parameters" (P). The designations of possible parameters are: (1) "A"—(address) an address indicating the location of the next instruction, i.e., the next value of the ADDRESS, (2) "B" (base)—the base address of a jump vector table, located on an even sixteen word boundary in program memory 282, (3) "C" (count)—a number indicating the number of loops which will be executed before normal completion of a routine, (4) "D" (destination)—an element of the processor into which data will be written, (5) "I"(index)—a number from 0 to 15 offsetting a base memory address in context memory 226, (6) "R" (register)—a number corresponding to a particular register, counter, or memory device, (7) "S" (source)—a data register from which data is read, (8) "V" (value)—data contained in the instruction word for use by the elements of the receive processor, (9) "L" (logic)—a desired logic function, (10) "U"—a data register configuration field indicating a combination of high and low data registers used in a CMP (compare) instruction, and (11) "E" (element-)—each bit in an element field corresponds to an element in the receive or transmit processors.

TABLE 2 provides a summary of the instructions used in the ADNI board 62. The letters from the preceding description of possible parameters are used to denote the parameters used in the individual instructions. The values "1" and "0" are instruction code bits.

manded by the logic array 296 to allow data to pass from the instruction bus 242 onto the first and second buses 212 and 214. The low order three bits of the first bus 212 are directly available to the direct input 330. The high order three bits and the lowest order bit of the second bus 214 are also directly available to the direct input 330, and the remaining intermediate four bits of the second bus 214 may be made available to the direct input 330 by enabling the first group of inputs 334 of the second multiplexer 332.

The STLPT (Start loop if True) instruction is identical to the STLP instruction if the value at the condition code port 314 of the microcontroller 276 is true. If the value at the condition code 314 of the microcontroller 276 is false, then the next sequential instruction is executed.

The DLPNZ (Decrement and loop if non-zero) instruction has no parameter field. If the value in the internal ACR register is non-zero, the ACR is decremented and a jump to the location specified by the address on the top of the stack is performed. The stack pointer remains unchanged. If the value in the ACR equals zero, a POP is performed on the stack, and the

TABLE 2

INSTRUCTION SUMMARY

Program control:

| | | |
|---|---|---|
| STLP | (Start Loop) | 01001 CCCCCCCCCCC |
| STLPT | (Start Loop if True) | 01000 CCCCCCCCCCC |
| DLPNZ | (Decrement and Loop, Non-Zero) | 1000000000000000 |
| ELPT | (End Loop if True) | 1101000000000000 |
| DLPJT | (Decrement and Loop, Jump, or Continue if True) | 11110 AAAAAAAAAAA |
| LDAR | (Load ACR with Address) | 11001 AAAAAAAAAAA |
| LDAC | (Load ACR with Count) | 11001 CCCCCCCCCCC |
| JMP | (Unconditional Jump) | 00111 AAAAAAAAAAA |
| JMPT | (Jump if True) | 00110 AAAAAAAAAAA |
| DJPNZ | (Decrement, Jump Non-Zero) | 10011 AAAAAAAAAAA |
| CJPRA | (Conditional Jump, Register or Absolute) | 01110 AAAAAAAAAAA |
| JVEC | (Jump Vector) | 01101 BBBBBBEEEE0 |
| JVECT | (Jump Vector if True) | 01100 BBBBBBEEEE0 |
| CALL | (Call) | 00011 AAAAAAAAAAA |
| CALLT | (Call if True) | 00010 AAAAAAAAAAA |
| CJSRA | (Conditional Jump to Subroutine, Register or Absolute) | 01010 AAAAAAAAAAA |
| RET | (Return) | 1010100000000000 |
| RETT | (Return from Subroutine if True) | 1010000000000000 |
| POP | (Pop the Stack) | 1101100000000000 |

Data Manipulation:

| | | |
|---|---|---|
| MOVE | (Move data between elements) | 0010 DDDDSSSSIIII |
| MVI | (Move immediate) | 1011 DDDDVVVVVVVV |
| CMP | (Compare) | 11100 LLLRRRR00UU |
| TST | (Test) | 1110100 L0EEE0000 |
| SCC | (Set Condition Bit) | 1110001 L10010000 |
| STRB | (Strobe) | 0000 EEEEEEEEEEEE |
| NOP | (No Operation) | 1110000000000011 |

PROGRAM CONTROL INSTRUCTIONS

Program control instructions affect the flow of the program, rather than a manipulation of data by the elements of the receive processor 66.

The STLP (Start Loop) instruction has an eleven-bit count field. The effect of the STLP instruction is to push the address of the next sequential instruction (held in the AR register of the microcontroller 276) onto the internal stack and to load the ACR with the immediate data specified in the count field. In order to transfer the value of the count field from the instruction register 288 to the direct input 330 of the microcontroller 276, the first and second buffers 308 and 310 must be comnext sequential instruction is executed.

The ELPT (End loop if true) instruction has a five-bit instruction code, and the remaining bits are unused. If the signal at the condition code input 314 of the microcontroller 276 is true, then a POP is performed on the stack. If the signal at the condition code input 314 is false, then a JUMP to the location specified by the address on the top of the stack is performed, and the stack pointer remains unchanged.

The DLPJT (Decrement and loop, jump or continue if true) instruction has an eleven-bit address field. The operation of the DLPJT instruction is illustrated in TABLE 3 below.

TABLE 3

| | DLPJT Command Operation | |
|---|---|---|
| ACR | CC | OPERATION |
| non-zero | T | Decrement ACR, POP the stack |
| non-zero | F | Decrement ACR, JUMP to address at top of stack |
| zero | T | POP the stack |
| zero | F | POP the stack, JUMP to location specified by the address field |

If the value contained in the ACR of the microcontroller is non-zero, then the ACR is decremented. If the signal at the condition code input 314 is true, then a POP is performed on the stack, or if the signal at the condition code input 314 is false, a jump (see the JMP instruction below) is performed to the location specified by the address on top of the stack, with the stack pointer remaining unchanged. If the value contained in the ACR is equal to zero, and if the signal at the condition code input 314 is true, then a POP is performed on the stack ; if the signal at the condition code input 314 is false, then a POP is performed on the stack, and a jump to the location specified by the value in the address field is performed.

The LDAR (Load Address/Counter Register with Address) instruction and LDAC (Load Address/Counter Register with Count) instruction are used to load the ACR with a predetermined value. The LDAR instruction and LDAC instruction are identical in operation, but are given different mnemonics for programming purposes so that the programmer can easily identify whether the register was loaded with an address or with a count. Thus, both the LDAR and LDAC instructions have an identical instruction field. In either instruction, the value contained in the eleven bit address (for the LDAR) or count (for the LDAC) is loaded into the internal ACR of the microcontroller 276 through the direct inputs 330.

The JMP (Jump) instruction results in the eleven-bit address field being used as the new ADDRESS. As a result the program execution continues at the address specified in the address field. In contrast to the CALL instruction, the JMP instruction does not have an associated return instruction.

The JMPT (Jump If True) instruction performs a JMP if the signal present at the condition code input 314 is true. The eleven-bit address field is loaded as the new ADDRESS if the data at the condition code input 314 is true. Whether the condition code is true or false, depends on the result of the last CMP, SCC, or TST instruction. If the signal at the condition code input 314 is false, the next sequential instruction is executed.

The DJPNZ (Decrement and Jump if Non-Zero) instruction instructs the microcontroller 276 to determine whether the value in the address/counter register (ACR) is non-zero. If the value is non-zero, then the address/counter register (ACR) is decremented and the new ADDRESS is the address given in the DJPNZ address field. If the value contained in the address-/counter register is equal to zero, then the contents of address register (AR) is used as the next ADDRESS, resulting in execution of the next sequential instruction.

The CJPRA (Conditional jump, register or absolute) instruction performs a jump to the location specified by the address field if the signal at the condition code input 314 is true; otherwise, if the signal at the condition code input 314 is false, a jump to the location specified by the contents of the ACR is performed.

The JVEC ("jump vector") instruction is illustrated in FIG. 7. The parameters of the JVEC instruction include a six-bit base address field indicating the base location of a vector table, and an element field indicating a location within the vector table to which program control should be transferred. The base address is determined during assembly (i.e. at creation of the program) while the element field is determined by the status of the specific elements of the second group 336 present at the second multiplexer 332 at execution of the instruction. Specifically, the element field is set according to the status of the serial-in bit from the inverter 200, the overflow bit 322 of the first counter 266, the overflow bit 324 of the second counter 268, and the overflow bit 326 of the third counter 272. The last bit of the JVEC instruction word is set to zero.

The operation of the JVEC instruction is shown in greater detail in FIG. 7. The base address of the vector table is specified in the base address field of the instruction word (block 353). A vector table is a thirty-two word (32×16 bit) area within the microprogram memory 282, which begins at an address evenly divisible by 32. Within each vector table, there are sixteen pairs of instructions, each pair beginning on an even word address. As shown in block 353, the element field forms a vector address which is determined by the run time values of four elements in the receive processor 66, namely the value of the bit next in line to be output from the programmable inverter 200, the overflow bit of the first counter 322, the overflow bit of the second counter 324, and the overflow bit of the third counter 326. The lowest order bit of the address is always set to zero in the instruction. Referring to block 354, the vector address is loaded into the lower four bits of the direct input 330 of the microcontroller 276 through the second multiplexer 332. Hence, upon receiving a JVEC command, the logic array 296 must enable the second multiplexer 332 to pass the second group 336. The base address is received by the six most significant bits of the direct input 330 from the instruction bus 242, via the first and second buses 212 and 214. The low order zero bit of the instruction is passed as the low order bit of the direct input 330. In block 355, the microcontroller 276 sets the new ADDRESS to the address present at the direct input 330.

As an example of the JVEC instruction, it is assumed that a vector table has been defined at hexadecimal base address 0020 in the microprogram memory 282. A JVEC instruction, specifying hexadecimal location 0020 as the base address of the vector table would be assembled as 01101 000001 00000. If at run time, a "1" is the next bit to be shifted from the inverter 200, and the second counter 268 contains all "1"s, while the first and third counters 266 and 272 do not contain all "1"s , then program control would be shifted to address 00000101010, i.e., hexidemical location 002A, the tenth location in the vector table.

The JVECT ("jump vector if true") instruction contains a base address field and a vector address field. The base address field and the vector address field are defined as given in connection with the JVEC instruction. The operation of the JVECT instruction depends upon the signal present at the condition code input 314. If the result of the last CMP, SCC, or TST was "true", then the microcontroller 276 proceeds as if the instruction were a JVEC instruction, i.e., the ADDRESS is set to the address given by the base address and the element field as described in connection with FIG. 7. If the result of the last CMP, SCC, or TST instruction was "false", then ADDRESS is set to the next sequential instruction address.

The CALL instruction direct the microcontroller 276 to push the contents of the address register (holding the value of the next sequential instruction) onto its internal stack and to increment the address of the stack pointer. ADDRESS is set to the subroutine address given by the eleven address bits in the address field through the direct input 330. In order to communicate the address field to the direct input 330 of the microcontroller 276, the logic array 296 must enable the first and second buffers 308 and 310 to allow passage of the address onto the first and second buses 212 and 214, and the second multiplexer 332 must be enabled to pass the first group 334 of four bits from the second bus 214.

The CALLT ("Call If True") instruction transfers control to a subroutine whose address is specified in the address field if the result of the last CMP, SCC, or TST instruction is true. If the result of the last CMP, SCC, or TST is false, then the next sequential address (stored in the internal address register) is executed. The result of the CMP, SCC, or TST instruction is available at the condition code input 314. If the result of the last CMP, SCC, or TST was true, then the CALLT instruction acts identically to the CALL instruction; otherwise, it acts as a NOP instruction.

The CJSRA ("Conditional Jump to Subroutine, Register or Absolute") has an address field as its sole parameter. The CJSRA instruction transfers control to a subroutine whose address is specified in the address field if the result of the last CMP, SCC, or TST instruction was true. If the results of the last CMP, SCC, or TST instruction was false, then the CJSRA instruction transfers control to an alternate subroutine specified in the internal address/counter register (ACR) of the microcontroller 276. The address/counter register may be loaded using the LDAC, LDAR, or MOVE instruction. A flow chart describing operation of the CJSRA instruction is illustrated in FIG. 8. In block 356, the value of the address register is loaded onto the stack, and the stack pointer is incremented. In decision block 358, the microcontroller 276 tests the condition code input 314 to determine whether the result of the last CMP, SCC, or TST instruction was true. If so, the address field contained within the CJSRA instruction is loaded into the direct inputs 330 of the microcontroller 276. In block 360, the logic array 296 enables the first and second buffers 308 and 310 to transfer the data from the instruction register 288 onto the first and second buses 212 and 214. In block 362, the logic array 296 enables the second multiplexer 332 to pass data from four bits of the second bus 214, thus the address field is input to the direct inputs 330. In block 364, the data given at the direct inputs 330 is used as the new ADDRESS. Referring to block 365 and to decision block 358, if the result of the CMP, SCC, or TST was not true, then ADDRESS is set to the value contained in the internal address/counter register (ACR) of the microcontroller 276.

The RET ("Return") instruction is used to terminate a subroutine and return control to the instruction following the subroutine call. The return location is removed from the internal stack of the microcontroller 276 at the point it was saved during the last CALL, CALLT, or CJSRA instruction.

The RETT ("Return If True") instruction is used to terminate a subroutine if and only if the signal at the CC input 314 is true. If the condition code input 314 is true, the microcontroller 276 returns from the subroutine by setting ADDRESS to the value at the top of the internal stack. If the condition code 314 is not true, then the microcontroller 276 sets ADDRESS equal to the contents of the address register resulting in execution of the next sequential instruction in the microprogram memory 282. Whether or not the condition code 314 is true, depends upon the result of the last CMP, SCC, or TST instruction.

The POP instruction performs a POP on the internal stack of the microcontroller 276.

DATA MANIPULATION

Data Manipulation commands affect the data stored in various elements of the receive processor 66.

The MOVE instruction has a four-bit destination field, a four-bit source field and a four-bit index field. The source field corresponds to one of the following values:

| | |
|---|---|
| 0000: | first counter 266 |
| 0001: | second counter 268 |
| 0010: | third counter 272 |
| 0011: | context memory address register 232 |
| 0100: | low data register 204 |
| 0101: | high data register 210 |
| 0110: | low context memory 230 |
| 0111: | high context memory 228 |
| 1000: | first and second counters 266 and 268 combined as a sixteen-bit counter |
| 1001: | high and low data registers 210 and 204 combined as a single sixteen-bit shift register |
| 1010: | CRC registers 216 and 218 |
| 1011: | shared memory 244 (sixteen-bit) |
| 1100: | shared memory address registers 262 and 264 (sixteen-bit) |
| 1101: | context memory 226 (sixteen-bit) |
| 1110: | not used |
| 1111: | not used |
| The destination field may take the same values as the source field described above, and additionally may use: | |
| 1110: | control register 274 |
| 1111: | ACR of the microcontroller 276 |

The index field may be used when either the source field or the destination specifies context memory 226, either the high order eight-bits (0111), low order eight-bits (0110) or full sixteen-bits (1101). The index parameter provides an offset within the context memory page addressed by the contents of the context memory address register 232.

The effect of the MOVE instruction is to move data from the register specified by the source field to the register specified by the destination field. If the source register is an eight-bit register and the destination register is a sixteen-bit register, then the eight-bit data is written into each half of the destination register. If the source register is sixteen-bits and the destination register is eight-bits, then the data written into the destination is that which shares a common bus, either the first bus 212 or the second bus 214. When the ACR is used as the destination register, the low order eleven bits of the source register are moved.

The MVI (Move Immediate) instruction stores the data specified in the Value field in the element specified by the destination field. The destination field specifies registers as described below:

| | |
|---|---|
| 0000: | first counter 266 |
| 0001: | second counter 268 |
| 0010: | third counter 272 |
| 0011: | context memory address register 232 |
| 0100: | low data register 204 |
| 0101: | high data register 210 |
| 1000: | first counter 266 and second counters 268 used as a 16-bit counter |
| 1001: | high and low data registers 210 and 204 used as a 16-bit shift register |
| 1010: | CRC registers 216 and 218 |
| 1011: | shared memory 244 (16-bit) |
| 1100: | shared memory address registers 262 and 264 |
| 1110: | control register 274 |
| 1111: | holding register 270 |

The CMP ("Compare") instruction has three fields definable at assembly: a logic field, a register field and a data register configuration ("U") field. The logic field specifies one of six compare operations which may be performed: "less than" (<), "greater than or equal to" (>=), "equal to" (=), "not equal to" (<>), "greater than" (>), or "less than or equal to" (<=). The register field specifies one of fourteen registers which may be compared to data stored in one or both of the data registers 210 and 204. The registers which may be specified in the register field include the first counter 266, the second counter 268, the third counter 272, the context memory address register 232, the low data register 204, the high data register 210, the low order 8-bits of a 16-bit word from context memory 226, the high order 8-bits of a word from context memory 226, a 16-bit word from a combination of the first and second counters 266 and 268, a 16-bit word from the combination of the high data register 210 and the low data register 204, a 16-bit word from the combination of the high CRC register 216 and the low CRC register 218, a 16-bit word from the shared memory 244, a 16-bit word from the shared memory address registers 262 and 264, and a 16-bit word from the context memory 226. The data register configuration field specifies the configuration of the data registers with which the data specified by the register field will be compared. Three possibilities are supported: a word comprising the high and low data registers 210 and 204, the low data register 204 by itself, or the high data register 210 by itself.

In operation, the CMP instruction compares the data stored in the register or memory indicated by the register field with data stored in either the high data register 210 or the low data register 204, or a combination of the two. Both eight-bit and sixteen-bit compares are supported. The Fairchild 74F524, used in the preferred embodiment, has three pins which indicate the result of the CMP instruction: a "less than" (LT) pin, a "greater than" GT pin, and an "equal" (EQ) pin. In response to a COMPARE instruction, one of these pins will be set "true" while the other two pins will be set "false". From these three pins, the operation specified in the logic field may be determined. The data from the LT, GT, and EQ pins from the high and low data register compare parts 318 and 320 is available to the first multiplexer 312, which has internal logic for outputting the proper result. The first multiplexer 312 also receives data from the logic field and the configuration field from the instruction bus 242 to determine which data registers are being used in the COMPARE instruction.

The first multiplexer 312 also receives data from the data register configuration field in order to determine which data registers are being used in the CMP instruction.

In order to implement the CMP instruction, data from the register specified by the register field must be enabled on the first or second buses 212 and 214, depending upon whether the CMP is a sixteen-bit compare or an eight-bit compare. For example, if the data in the second counter 268 is to be compared to data in the high data register 210, then the data stored in the second counter 268 would be output to the first bus 212, where it could be compared to the data stored in high data register 210. In some circumstances, it will be necessary to transfer data from one bus to another before making the compare. For example, if data from the first counter 266 is to be compared to the data in the high data register 210, it is necessary for the data to be output from the first counter 266 onto the second bus 214 and transferred through the transceiver 224 onto the first bus 212 before making the comparison with the high data register 210.

The first multiplexer 312 outputs the proper "true" or "false" signal to the condition code input 314 of the microcontroller 276 at the end of the instruction cycle. The signal remains present at the condition code input 314 until another CMP, SCC, or TST instruction is executed.

The TST ("Test") instruction has a logic field and an element field as parameters. The logic field specifies whether the instruction will test for a "true" condition or for a "false" condition. The element field specifies up to eight elements of the processor which may be tested, including: a start of superframe status bit (SSFST), the bit currently present at the output of the programmable inverter 200 (SID), the first counter overflow pin 322 (OVF1), the second counter overflow pin 324 (which also determines overflow of the 16-bit combination of the first and second counters 266 and 268) (OVF2/OVF21) and the third counter 272 overflow pin 326 (OVF3). The SSFST element is true if the data bit most recently shifted in from the fifo 112 is the first bit in the last frame of the current superframe. The SID element is true if the bit present at the output of the programmable inverter 200 is a 1. The OVF1 element is true if the first counter 266 contains all 1s. The OVF2/OVF21 overflow element is true if the second counter 268 contains all 1s when the second counter 268 is being used as an eight-bit counter, or when the first and second counters 266 and 268 both contain all 1s when the two counters are being used as a single sixteen-bit counter. The OVF3 element is true when the third counter 272 contains all 1s.

The elements specified in the element field are directly connected to the first multiplexer 312. The operation of the first multiplexer 312 depends on whether the logic field specifies testing of either a true or a false condition. If the desired test condition is a true condition, then the value of the specific element is enabled to a storage register at the condition code input 314 of the microcontroller 276. On the other hand, if the desired test condition in the logic field is a false condition, then the output of the element is inverted before being enabled on the condition code input 314 of microcontroller 276. For example, if the logic field specifies a "test true" and the register field specifies the third counter overflow element (OVF3), then the signal input to the condition code input 314 at the end of the instruction execution of the microcontroller 276 will be true if the third counter 272 contains all 1s, or false if the third counter 272 does not contain all 1s. On the other hand, if the logic field specified a "test false", then the input to the condition code input 314 of the microcontroller 276 would be false if the third counter 272 contained all 1s, and true if the third counter 272 did not contain all 1s. The inversion or non-inversion of the element may be performed by external logic to the first multiplexer 312 or by logic internal to the first multiplexer 312. As with the CMP instruction, the output of the first multiplexer 312 to the condition code input 314 of the microcontroller 276 does not change until the next CMP, SCC, or TST instruction is executed. After the TST instruction is executed, the ADDRESS is set to the address contained in the address register to access the next sequential instruction in the microprogram memory 282.

The set condition code (SCC) instruction forces the signal to the condition code input 314 of the microcontroller 276 to either a true or false value as indicated in the logic field of the instruction.

The STRB (Strobe) instruction has a twelve-bit element field. Each of the twelve-bits of the element field correspond to a register or function as described below:

| | |
|---|---|
| -----------1: | first counter 266 |
| ----------1-: | second counter 268 |
| ---------1--: | third counter 272 |
| --------1---: | low data register 204 |
| -------1----: | high data register 210 |
| ------1-----: | CRC registers 216 and 218 |
| -----1------: | not used |
| ----1-------: | not used |
| ---1--------: | holding register 270 |
| --1---------: | fifo 112 |
| -1----------: | stuffing element 541 (transmit only) |
| 1-----------: | not used |

A STRB instruction may be used to simultaneously "strobe" any of the elements specified in the element field. For example, a strobe instruction "000000000000111" would result in the first, second and third counters 266, 268 and 272 all being strobed. The effect of a STRB instruction may vary depending upon the element strobed.

Strobing the counters, 266, 268 and 272, results in the counters being incremented either up or down, depending upon the contents of the control register 274. If the first and second counter 266 and 268 are being used as a single sixteen-bit counter, then the control register 274 must specify that the first and second counters 266 and 268 are combined, and that both count in the same direction (up or down). Furthermore, the bits corresponding to the first and second counters 266 and 268 in the element field must be set in the strobe instruction.

Strobing the low data register 204 results in the data in the register being right shifted and the output of programmable inverter 200 from the fifo 112 placed in the highest bit position. Strobing the high data register 210 results in the lowest bit output of the low data register 204 being shifted into the highest bit of the high data register 210 with the data resident in the register being shifted over one bit position.

Strobing the CRC registers causes the output of the low data register 204 to be input to the CRC registers 216 and 218 and the CRC calculation to be performed. If the control register specifies that the CRC registers 216 and 218 are to be used as a 16-bit shift register, then the bits in the CRC registers 216 and 218 are shifted within the register without a CRC calculation.

Strobing the holding register 270 causes the value stored in the holding register 270 to be placed in the second counter 268.

Strobing the fifo 112 causes data to be shifted out of the receive fifo 112 (for the receive processor 66) or shifted out of the transmit fifo 110 (for the transmit processor 68). The stuffing element 541 (see FIG. 9) is strobed only in the transmit processor; the effect is to preset a 0 to the transmit fifo 110.

The STRB command is a very important command in processing the data stream since a single instruction can be used to operate any or all of the elements listed above, thus increasing processing speed.

The NOP ("No Operation") instruction results in no operation being performed during the clock cycle, thus resulting in a 100 nanosecond time delay.

Using the instruction set described above, "processes" are developed to process the information received by the receive processor 66. The data channel processes perform both BOS (Bit Oriented Signalling) functions and HDLC low-level functions. On the receive side, BOS signalling is supported by detecting incoming calls, answers to outgoing calls, wink start signals, and dialed digits. These functions are performed by monitoring a signalling status location in context memory, updated by the signalling process.

HDLC processing is supported by detecting opening and closing flags and abort sequences, removing stuffed zeros from the data stream, performing serial to parallel conversion, checking the received CRC and either discarding the frame, in the case of a bad CRC or abort sequence, or passing it to the layer 2 processor 72.

The context memory is functionally divided into pages of sixteen 16-bits words. The allocation of these pages is given below in TABLE 4. Hereinafter, the suffix "H" will be used to denote a hexadecimal value.

TABLE 4

Receive Processor Context memory

| PAGE | FUNCTION |
|---|---|
| 0 | Framing bit routine |
| 1-23 | Data channel usage |
| 24 | Signalling channel usage |
| 20H-2BH | State address table |
| 40H-5FH | LMA indication table |
| 68H-7FH | Signalling channel supplementary usage |

TABLE 5 disclosed the use of context memory page 0 by the framing bit routines.

TABLE 5

Receive Processor Framing Bit Context Memory Allocation

| LOCATION | HIGH-ORDER BYTE | LOW-ORDER BYTE |
|---|---|---|
| 0 | State Address (word) | |
| 1 | Next Channel | |
| 2 | PRP Byte Storage | Bit Counter |
| 13 | Message Address (word) | |

The "state address" location indicates the location in the microprogram memory 282 at which the framing bit process will begin processing. This address will depend on where processing ceased during the previous processing interval. The "next channel" location stores a value indicating which process will be performed subsequent to completion of the framing bit process. Normally, the first data channel will be processed after the framing bit; thus, the "next channel" location stores a "1." The "PRP byte storage" location stores the last eight bits of the pseudo-random code received by the receive processor. The "bit counter" location is used for counting PRP bits. The "message address" location stores the address in shared memory 244 through which the framing bit process communicates with the layer 2 processor 72.

The allocation of the context memory for each of the data channels 1-23 is illustrated in TABLE 6. Each channels uses one page of context memory, i.e., channel 1 uses page 1, channel 2 uses page 2, and so on. The "state address" location stores the address of the location in the microprogram memory 282 at which processing will resume. The "next channel" storage location indicates the channel to be processed after completion of the present channel. The "next channel" location associated with channel 1 points to channel 2, channel 2 to channel 3, culminating with channel 24 pointing to the framing bit process (process 0). The "command parameter address" location points to an address in shared memory 244 storing a parameter passed along with a command sent by the layer 2 processor 72. The "call timer/current buffer address" location has two purposes. As a call timer, it contains a count used to time a period after which the receive processor 66 will report a timeout condition if there is no answer. As a current buffer address, the location points to an address in shared memory 244 to which received data is sent. The "partial bits" location stores an incomplete data byte partially received in the previous processing interval of this channel (note: since HDLC inserts data bits into the serial data stream, the eight-bits received in each frame do not correspond to a whole (integral) data byte). The "number of bytes counter" stores a count of how many bytes have been received. The "CRC expected value" location stores the CRC value expected at the end of the HDLC frame. The "CRTL byte" location stores the contents of the control register 274 used in this channel's processing. The "signalling status" location is updated by the signalling channel process and indicates to the data channel process the current signalling status (on-hook or off-hook) for this channel. The "timer count" location is used during BOS operations for various timing functions. The "32 ms timer" location contains a count used for a 32 millisecond timer. The "pulse counter" location stores a number of pulses received during dialing. The "command message address" location points to an address in shared memory 244 at which commands from the layer 2 processor 72 are located. The "CRC storage" location contains the contents of the CRC registers 216 and 218 at the end of processing the channel. The "response message address" location points to an address in shared memory 244 at which the receive processor 66 writes status messages to the layer 2 processor 72. The "number of ones count" location stores the number of consecutive ones counted as of the end of the prior processing interval of the channel, for HDLC purposes. The "partial bit count" location stores the number of bits of the last partial data byte received. The "parameter storage" location is used for temporary storage of a parameter received from the layer 2 processor 72.

TABLE 6
Receive Processor
Data Channel Context Memory Allocation

| LOCATION | HIGH-ORDER BYTE | LOW-ORDER BYTE |
|---|---|---|
| 0 | State Address (word) | |
| 1 | Next Channel | Scratch |
| 2 | Command Parameter Address (word) | |
| 3 | Call Timer/Current Buffer Address (word) | |
| 4 | Partial Bits (word) | |
| 5 | Number of Bytes Counter (word) | |
| 6 | CRC Expected Value (word) | |
| 7 | CTRL Byte | Signalling Status |
| 8 | Timer Count (word) | |
| 9 | 32 ms. Timer | Pulse Counter |
| 10 | Not Used | |
| 11 | Command Message Address (word) | |
| 12 | CRC Storage (word) | |
| 13 | Response Message Address (Word) | |
| 14 | Number of Ones Count | Partial Bit Count |
| 15 | Parameter Storage (word) | |

The allocation of the signalling channel's context memory page is illustrated in TABLE 7. The state address, next channel, 32 ms. timer, command message address, response message address, and control bytes locations have the same function as previously described in conjunction with the data channel context memory allocation table. In addition, the signalling channel has storage code locations for a "multiframe counter" which holds the number of multiframes received without error. The "frame counter" location stores the number of frames received within the current multiframe. The "LMA alarm indicator" location indicates whether the receive processor 66 is currently in an LMA condition. The "LMA alarm counter" location stores counts used for timing purposes in reporting the LMA alarm after multiframe alignment has been lost. The "MER status bits" location maintains five bits which indicate whether an error has occurred in any of the last five multiframes. The MER status bits are used in conjunction with the LMA indication table, discussed below. The "RMA alarm timer" stores counts used for timing purposes for reporting the RMA alarm.

TABLE 7
Receive Processor
Signalling Channel Context Memory Allocation

| LOCATION | HIGH-ORDER BYTE | LOW-ORDER BYTE |
|---|---|---|
| 0 | State Address (word) | |
| 1 | Next Channel | |
| 2 | Multiframe Counter | Frame Counter |
| 3 | 32 ms. Timer | LMA Alarm Indicator |
| 4 | LMA Alarm Counter (word) | |
| 5 | MER Status Bits | |
| 8 | | RMA Alarm Timer |
| 11 | Command Message Address (word) | |
| 13 | Response Message Address (word) | |
| 15 | CTRL Byte | |

The state address table occupies pages 2OH–2BH of the context memory 226. The state address table translates messages from the layer 2 processor 72 into state addresses. Location 0 of each page holds a sixteen-bit state address indicating the address in the microprogram memory 282 at which the routine associated with the message is located.

The LMA indication table is situated in context memory pages 4OH–5FH. The LMA indication table is used to test for an LMA condition, i.e., detect an error in three out of the last five multiframes. The 32 page addresses correspond to the pages addressable by the five-bit word stored in the MER status bits of the signalling channel context memory page. The low-order byte of location 0 of each page indicates whether the corresponding MER status bits indicate an LMA condition. The high-order byte of location 0 stores a bit pattern equal to the current MER bit pattern, left-shifted by one bit.

Context memory pages 68H–7FH, one page for each of the 24 frames in a signalling multiframe, are used by channel 24 routines to distribute signalling status received on channel 24. In location 0 of each of these pages, the high-order byte holds a primary channel pointer and the low-order byte holds a secondary channel pointer. The primary and secondary channel pointers specify two channels (of the 23 data channels) whose signalling status will be received on the signalling channel during a particular frame in the multiframe.

Figure 9:
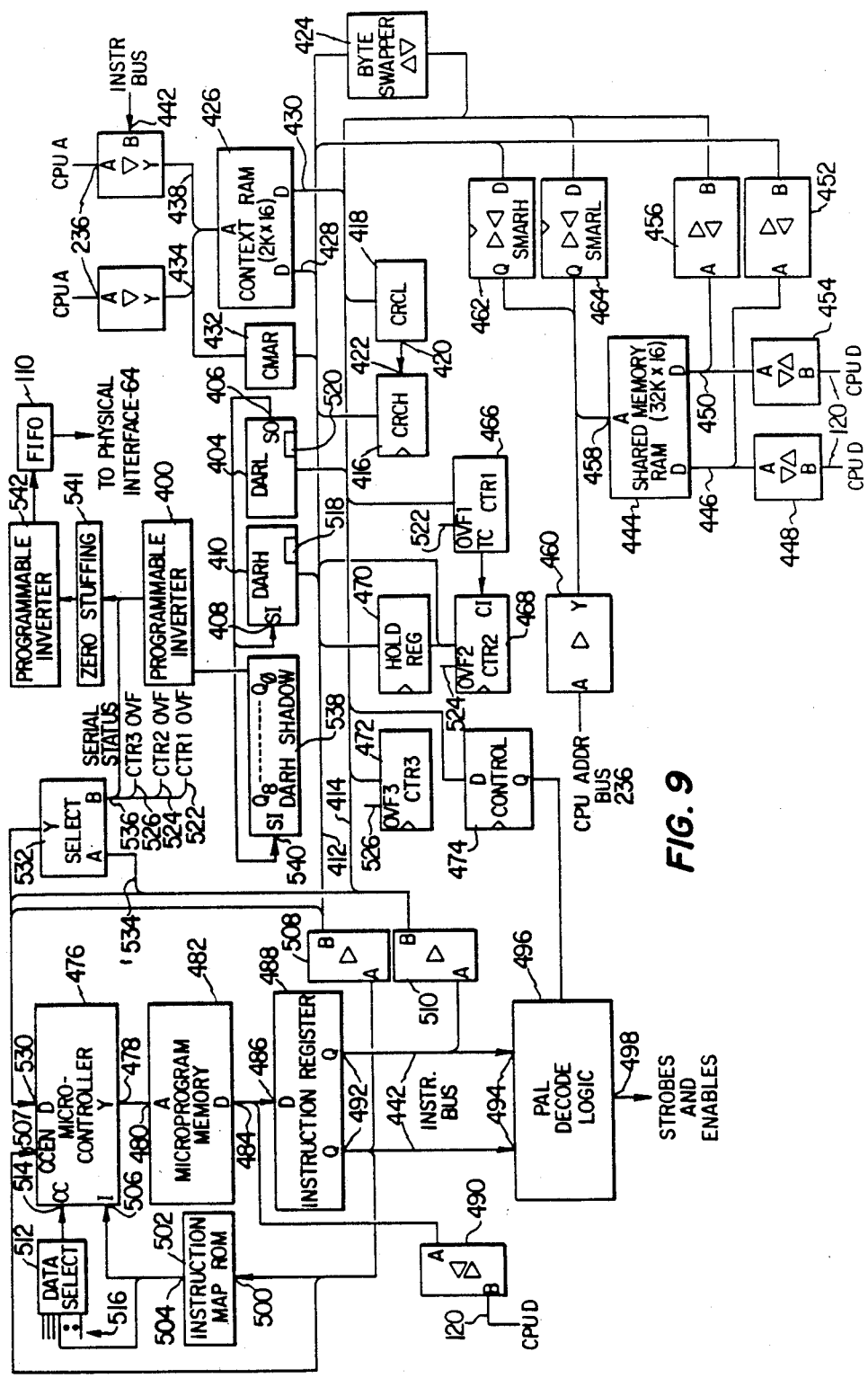
FIG. 9, illustrates a block diagram of the transmit processor portion of an adaptive digital network interface.

Referring now to FIG. 9, the transmit processor 68 is illustrated. The elements of the transmit processor 68 are substantially the same as the elements of the receive processor 66, and the connections between the elements of the transmit processor 68 are substantially the same as those described in connection with receive processor 66. The elements of the transmit processor 68 have been numbered in FIG. 9 to correspond with like elements in FIG. 5, starting with the reference numeral 400 used for the programmable inverter. In addition to the elements disclosed in FIG. 5, the transmit processor 68 includes a shadow register 538 having a shift-in port 540 connected to the shift-out port 406 of the low data register 404. The output of the shadow register 538 is connected to the programmable inverter 400. The contents of the shadow register 538 are always identical to the high data register 410. All loads and shifts of the high data register 410 also operate on the shadow register 538. The low data register 404 is not connected to the programmable inverter 400 as it is in the receive processor 66. The transmit processor 68 includes a zero stuffing element 541 and a second programmable inverter 542 between the first programmable inverter 400 and the transmit fifo 110. The transmit processor 68 does not have a superframe status bit connected to the first multiplexer 512. The remainder of the transmit processor 68 is connected as described in conjunction with the receive processor 66 in FIG. 5.

The transmit processor 68 uses the same instruction set as disclosed in connection with the receive processor Several instructions have a slightly different operation in the transmit processor 68 as described hereinbelow.

The STRB instruction described above, may also used to strobe the zero stuffing element 541. When the zero stuffing element 541 is strobed, a zero is output to the second programmable inverter 542. The zero stuffing element 541 and the high data register 410 may not be strobed simultaneously.

The STRB instruction also has a different operation when used on the high and low data registers 410 and 404 of the transmit processor 68. In the transmit processor 68, both the high data register 410 and the shadow register 538 receive a bit of data from the shift-out port 406 of the low data register 404 when the high data register 410 is strobed. Strobing the low data register 404 causes the data to be shifted and a zero placed in the highest bit position.

The STRB fifo 110 command is the transmit processor 68 corollary of the STRB fifo 112 command for the receive processor 66. The STRB fifo 110 instruction shifts a data bit into the transmit fifo 110 from the shadow register 538 (through the inverters 400 and 542).

The TST SOD command is operable to test the status of the bit present at the output of the programmable inverter 400; this command replaces the TST SID command used in the receive processor 66.

The JVEC and JVECT commands also function slightly differently in the transmit processor 68. In the transmit processor 68 the second group 536 comprises the overflow bits of the counters 466, 468 and 472, and the bit present at the output of the programmable inverter 400. These four bits form the element field of the JVEC and JVECT commands.

The contents of the control register 474 are also different from their counterparts in the receive processor 66. The contents of the transmit control register 474 are given in TABLE 7a.

TABLE 7A

Allocation of Bits of the Control Register Transmit Processor

| Bit | Name | Operation |
|---|---|---|
| 0 | INV2 | 0 - Invert data shifted into FIFO |
|   |      | 1 - Don't invert data shifted into FIFO |
| 1 | CRCEN | 0 - Use CRC registers as a shift register |
|   |       | 1 - Use CRC registers as CRC registers |
| 2 | INV1 | 0 - Don't invert data shifted out of the shadow register |
|   |      | 1 - Invert data shifted out of the shadow register. |
| 3 | TXEN | 0 - Disable output |
|   |      | 1 - Enable output |
| 4 | CTR21 | 0 - Use first and second counters separately |
|   |       | 1 - Use first and second counters together as a sixteen bit counter |
| 5 | not used | |
| 6 | not used | |
| 7 | not used | |

As with the receive processor 66, the transmit processor 68 performs 25 process, one for the framing bit channel plus one for each of the 24 eight-bit channels, linked together in a circular fashion. Each process processes and shifts the appropriate number of bits to the fifo 110, then passes control to the next process on the list. On the transmit side, the transmit processor 68 generates the correct pseudo-random code (PRP). If a transmission PRP error is reported by the framer 108 to the layer 2 processor 72, the layer 2 processor 72 may issue a command to the framing process requesting resynchronization with the framer. The framing bit process implements this command by: (1) enabling the transmit output, (2) waiting at least 3.5 milliseconds, (3) disabling the transmit output, (4) waiting at least 100 nanoseconds, (5) enabling the transmit output, (6) transmitting T1 frames, beginning with the framing bit of the first frame of the superframe.

The signalling channel process multiplexes signalling state information from the 23 data channel processes, and generates multiframe alignment signals and multiframe alignment alarms. On the transmit side, multiframe alignment signals are generated, and signalling status information is retrieved from the data channel's context memory and transmitted in the prescribed manner. The layer 2 processor 72 may issue commands instructing the signalling channel process to either begin or cease transmitting the RMA (remote multiframe alignment) alarm.

The data channel processes perform both BOS signalling functions and HDLC low-level functions. On the transmit side, BOS signalling is supported by generating outgoing calls, answers to incoming calls, wink start signals, and dialled digits. These functions are performed by updating a signalling status location in context memory for processing by the signalling channel process. HDLC processing is supported by generating opening and closing flags, serializing and bit-stuffing the data received from the layer 2 processor 72, calculating and transmitting the CRC, and transmitting flags when no data is available.

The allocation of the context memory between processes is shown in TABLE 8. As with the receive processor 66, the context memory 426 is functionally separated into pages of sixteen 16-bit words. Page 0 of context memory is used for the framing bit process. Pages 1-23 are used for the processes associated with data channels 1-23. Page 24 of context memory is used for the signalling channel. Pages 20H-37H are used by channel 24 routines to build signalling bytes for output on channel 24. Pages 40H-58H are used to translate messages from the layer 2 processor 72 into state addresses.

TABLE 8

| Transmit Context Memory Allocation | |
|---|---|
| PAGE | FUNCTION |
| 0 | Framing bit process |
| 1-23 | Data Channel processes |
| 24 | Signalling channel process |
| 20H-37H | Signalling channel supplementary usage |
| 40H-58H | State address table |

The allocation of the context memory page 0 for the framing bit routine is shown in TABLE 9. The "state address" location indicates the entry point at which processing will resume when the framing bit process becomes the active process. The "next channel" location points to the next channel to be processed. The "PRP pattern byte" location stores a eight-bit pseudo-random code pattern which the transmit routine generates to maintain synchronization. The "bit counter" location stores the number of the last bit of the PRP transmitted. The "message address" location stores the address in the shared memory 444 through which the framing process communicates with the layer 2 processor 72. The "CRTL byte" location stores the byte used in the control register 474 during the framing bit process.

TABLE 9

| Transmit Processor Framing Bit Context Memory Allocation | | |
|---|---|---|
| LOCATION | HIGH-ORDER BYTE | LOW-ORDER BYTE |
| 0 | State Address (word) | |
| 1 | Next Channel | |
| 2 | PRP Pattern Byte | Bit Counter |
| 13 | Message Address (word) | |
| 15 | CTRL Byte | |

The data channel allocation of the context memory is illustrated in TABLE 10. Each channel process (one process for each of the 23 data channels) uses one page of context memory. The "state address" location specifies the entry point of the particular process when it becomes active. The "next channel" points to the next channel to be processed. The "current buffer address" location specifies the current address of the word in shared memory 444 which is being transmitted on the particular channel. The "residual bit" location holds the part of the word being transmitted which was not sent on the last processing interval of the particular channel's process. The "on, off hook" location stores the current signalling status for the particular channel. The "timer count" location holds a count value used by various timers during the signalling process. The "pulse count" location is used for dialing digits. The "CRC storage" location contains the CRC calculation as of the end of the previous processing interval. The "current message address" location specifies the address currently used in shared memory 444 for talking to the layer 2 processor 72. The "number of ones count" location maintains a count of the number of ones consecutively sent as of the end of the last processing interval. The "residual bit count" specifies how many bits remain to be sent of the last word. The "primary CTRL byte" location holds the contents of the control register 474 for transmitting data, while the "secondary CTRL byte" location holds the contents of the control register 474 used during sending of the CRC code at the end of the data transmission.

TABLE 10

| Transmit Processor Data Channel Context Memory Allocation | | |
|---|---|---|
| LOCATION | HIGH-ORDER BYTE | LOW-ORDER BYTE |
| 0 | State Address (word) | |
| 1 | Next Channel | |
| 3 | Current Buffer Address (word) | |
| 4 | Residual Bits (word) | |
| 6 | Scratch | |
| 7 | | On, Off-hook |
| 8 | Timer Count (word) | |
| 9 | | Pulse Count |
| 12 | CRC Storage (word) | |
| 13 | Current Message Address (word) | |
| 14 | Number of Ones Count | Residual Bit Count |
| 15 | Primary CTRL Byte | Secondary CTRL Byte |

The allocation of page 24 of context memory for the signalling channel is given in TABLE 11. The "state address" location specifies the entry point into the microinstruction memory, as previously described. The next channel" location points to the next channel to be processed, i.e., the framing bit process, designated by 0 value. The "signalling entry address" specifies the page in the Signalling Channel Supplementary Allocation, described in TABLE 12, which is addressed in the current frame. The "fake off-hook" location contains a value of 1, used in the signaling channel process described in connection with FIGS. 20-22, in order to facilitate formation of the correct output necessary to indicate the end of a multiframe. The "message address" location specifies the location used r communicating with the layer 2 processor 72. And the "control byte" location holds the contents of the control register 474 used during processing of the signalling channel.

TABLE 11

Transmit Processor Signalling Channel Context Memory Allocation

| LOCATION | HIGH-ORDER BYTE | LOW-ORDER BYTE |
|---|---|---|
| 0 | State Address (word) | |
| 1 | Next Channel | |
| 3 | Signalling Entry Address | |
| 7 | | Fake Off-hook |
| 13 | Message Address (word) | |
| 15 | Control Byte | |

Context memory pages 20H-37H (corresponding to the 24 frames sent in a signalling multiframe) are used as supplementary memory by channel 24 to build the signalling bytes transmitting on channel 24. TABLE 12 illustrates the usage of these pages, one page used for each frame of a signalling multiframe. The "next signalling entry" location points to the next sequential page in memory, except in memory page 37H, where the location points back to memory page 20H. The "primary channel pointer" and "secondary channel pointer" point to data channels whose signalling status will be output during the frame corresponding to the particular memory page. The "Low Order 5 Bits" location specifies the five bits which will be sent along with the signalling status bits during the frame corresponding to the particular memory page.

TABLE 12

Transmit Processor Signalling Channel Supplementary Allocations

| LOCATION | HIGH-ORDER BYTE | LOW-ORDER BYTE |
|---|---|---|
| 0 | | Next Signalling Entry |
| 1 | Primary Channel Pointer | |
| 2 | Secondary Channel Pointer | |
| 3 | | Low-Order 5 bits |

Context memory pages 40H-58H are used to translate messages from the layer 2 processor 72 into state addresses. The messages are listed in TABLE 13. The coding of the message indicates the address of the context memory page holding the state address. The state address is held in location zero of the selected page.

TABLE 13

Transmit Messages

| CODING (Hex) | COMMAND |
|---|---|
| 40 | Initialize |
| 41 | Set RMA |
| 42 | Reset RMA |
| 43 | Off-hook |
| 44 | Send Wink |
| 45 | Send Digit 0 |
| 46 | Send Digit 1 |
| 47 | Send Digit 2 |
| 48 | Send Digit 3 |
| 49 | Send Digit 4 |
| 4A | Send Digit 5 |
| 4B | Send Digit 6 |
| 4C | Send Digit 7 |
| 4D | Send Digit 8 |
| 4E | Send Digit 9 |
| 4F | HDLC |
| 50 | HDLC INV |
| 51 | Send Frame |
| 52 | On-hook, Delay (Call Established) |
| 53 | On-hook (Call Established) |
| 54 | Idle (Call Established) |
| 55 | Sync |
| 56 | On-hook, Delay (Call Setup) |
| 57 | On-hook (Call Setup) |
| 58 | Idle (Call Setup) |

The INITIALIZE command initializes the program for 24 channel, BOS operation, and then indicates command completion. It should only be issued as the first command following a system reset. The SET RMA command is issued to channel 24. It causes the remote multiframe alignment (RMA) alarm to be transmitted. Command completion is indicated immediately. The RESET RMA command is also issued to channel 24. The RESET RMA causes transmission of the remote multiframe alarm to be discontinued. Command completion is indicated immediately.

The OFF-HOOK command can be issued to channels 1-23. The OFF-BOOK command sets the status of the particular channel to off-hook, then indicates command completion. The SEND WINK command can also be issued to channels 1-23. The SEND WINK waits 100 milliseconds, sets the status of the particular channel to off-hook, waits 150 milliseconds, sets the status of the particular channel to on-hook, then waits 30 milliseconds before indicating command completion. The SEND DIGIT commands, 0-9, can be issued to any of the data channels 1-23. The SEND DIGIT commands simulates dial pulses for the particular digit by repeating the sequence: set status to on-hook, wait 60 milliseconds, set status to off-hook, wait 40 milliseconds. The number of times the pulse is repeated determines the digit dialed. Digits 1-9 repeat the sequence by the digit dialed; digit 0 repeats the sequence 10 times. After the last "break" (on-hook) pulse, the SEND DIGIT commands waits 600 milliseconds rather than 40 milliseconds, and then indicates command completion.

The HDLC command can be issued to any of the data channels 1-23. The HDLC command prepares the particular channel for 64 kbps HDLC operation, starts transmission of the HDLC idle code (7EH), then indicates command completion. The HDLC INV command may also issued to data channels 1-23. The HDLC INV command prepares the particular channel for 64 kbps HDLC operation using inverted bit stream operation (for restricted channels), starts transmission of the HDLC idle code, then indicates command completion. The SEND FRAME command sends a buffer of data starting at the location specified with the command as an HDLC frame, then indicates command completion. The ON-HOOK, DELAY (call established) command may be issued to any of the data channels 1-23. The ON-HOOK, DELAY command sets the status to on-hook, waits 700 milliseconds, and then indicates command completion. This command is used after HDLC mode has been entered. The ON-HOOK (call established) command sets the particular channel status to on-hook, and then indicates command completion. This command is also used only after HDLC mode has been entered. The IDLE command (call established) is also issued to data channels 1-23. The IDLE command begins transmitting the channel idle code, FFH, waits 800 milliseconds, then indicates command completion. This too is used only after HDLC mode has been entered. The SYNC command is issued to location 00FEH of the shared memory 444. The purpose of the SYNC command is to re-establish synchronization with the framer, and then indicate command completion.

The ON-HOOK, DELAY (call set-up) command, sets the status of the particular channel to on-hook, waits 700 milliseconds, and then indicates command completion. This command is used only during call set-up. The ON-HOOK (call set-up) command is also issued to data channels 1-23, and sets the status to on-hook, then indicates command completion. This command is also used only during call set-up. The IDLE (call set-up) command is also issued to data channels 1-23. The IDLE (call set-up) command waits 800 milliseconds, then indicates command completion. This command is also used only during call setup.

Figure 10:
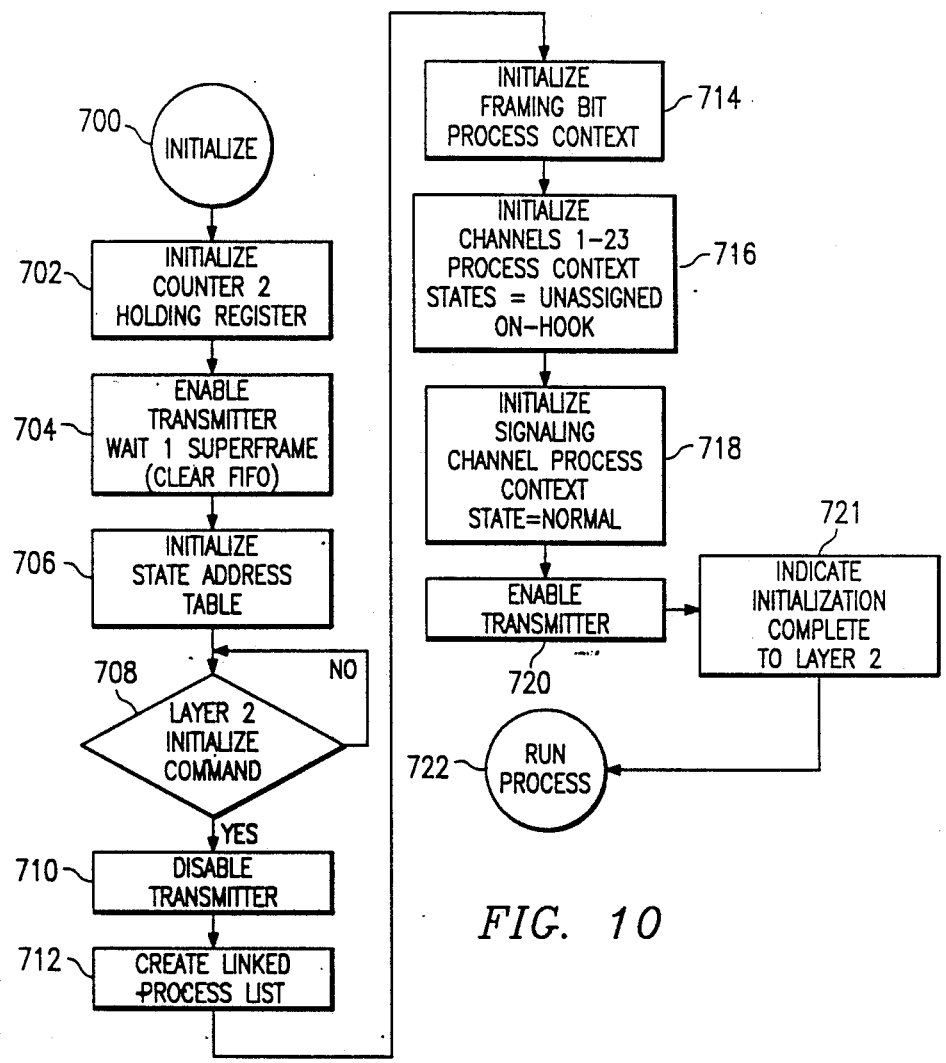

FIGS. 10-22 are flow diagrams of the operation of the transmit processor 68. FIG. 10 describes the initialization process used to prepare the transmit processor hardware prior to sending data. The holding register 470, is initialized in Block 702. Normally, the holding register 470 will be loaded with a value of -6 during initialization. The purpose of the holding register 470 is to allow the second counter 468 to be reset to a desired value using a single STRB instruction.

In block 704, the bit transmission is enabled for one superframe in order to clear the fifo 110. In block 706, the state address table stored in context memory, illustrated in TABLE 13, is initialized such that the state address table entries point to the correct entry points into the microprogram memory 482.

At this point, the transmit processor 68 waits until the layer 2 processor 72, issues an INITIALIZE command, as illustrated in decision Block 708. This allows the transmit processor 68 to get in synchronization with the framer 108. On issuance of the INITIALIZE command, the bit transmission is disabled as shown in block 710.

After disabling the bit transmission, a linked process list is created in the context memory pages associated with each of the 25 processes: one process for the framing bit and 24 for each of the eight-bit data channels, as shown in block 712. Hence, the value "1" is placed in the "next channel" location of the page of context memory associated with the framing bit process (page 0), the value "2" is placed in the "next address" location of the page associated with the first data channel, culminating in a value of zero being placed in the "next channel" location of the context memory page associated with the signalling channel (channel 24). The purpose of the linked processed list is to create a circular flow of command between the 25 processes.

In Block 714, the context memory page associated with the framing bit process is initialized by setting the "state address", "bit counter", "PRP Pattern Byte", "message address", and "control byte" locations of the Framing Bit Context Memory page. In 716, the pages of context memory associated with the data channel processes for channels 1-23 are initialized, assigning the channels an "unassigned, on-hook" state. Finally, the context memory page associated with the signalling channel process is initialized, shown in block 718, assigning the signalling channel a state of "normal", i.e., outputting an RMA inactive signal, as illustrated in FIG. 21.

After the linked processed list is created and the 25 processes are initialized, the bit transmission is enabled in Block 720. In Block 721, command completion is indicated to the layer 2 processor 72. In Block 722, control is relinquished to the "RUN PROCESSES" flow diagram illustrated in FIG. 11.

Figure 11:
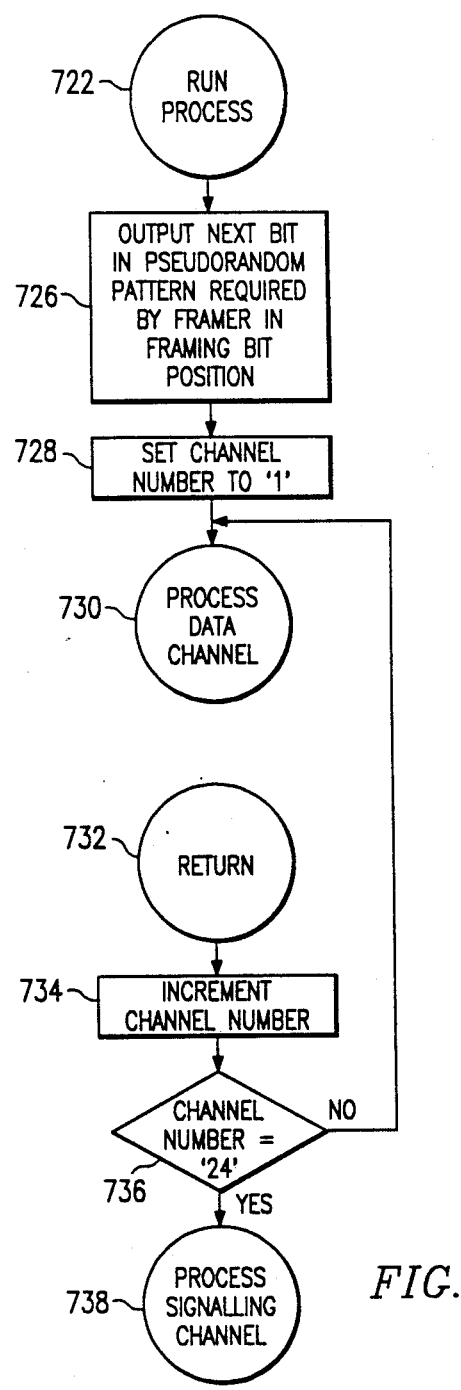

FIG. 11 illustrates the "RUN PROCESSES" flow diagram. The first process run by the transmit processor 68 is the framing bit process, shown in block 726. The purpose of the framing bit process is to output a pseudo-random pattern required by the framer 108 in order to identify correct synchronization with transmit processor 68.

As discussed in conjunction with FIG. 3b, each frame of data consists of one framing bit, 23 eight-bit data channels and one eight-bit signalling channel, for a total of 193 bits. Each frame is transmitted in 125 microseconds, resulting in data rates of 8k bits/sec (bps) for the framing bit channel and 64 kbps for each of the 23 data channels and the signalling channel. There are 25 processes in the microcode, one for the framing bit, plus one each of the twenty-four 8-bit channels. The processes are linked together in a circular fashion. Since all 25 processes must be completed in the 125 microsecond time, 5.1 microseconds is allotted for each of the 24 eight-bit data channel processes and 2.6 microseconds is allowed for the framing bit process. Each process performs necessary processing of information and shifts the appropriate number of bits (one for the framing bit process, eight for an eight-bit channel process) to the fifo 110. At the end of each process, data stored in various elements of the transmit processor 68 are stored in the context memory 426 for use by that process after the subsequent 24 processes have been completed. The details of context memory 426 are discussed above in relation to TABLES 8-13.

The framing bit process establishes and maintains synchronization with the framer 108. This is accomplished by outputting the pseudo-random pattern (PRP) in the framing bit position of the serial data stream going into the framer 108. The PRP is constantly monitored by the framer 108 for correctness. A PRP error is reported to the layer 2 processor 72 if an error is detected. Upon indication from the layer 2 processor 72 that the error report has been received, the framing bit process re-establishes synchronization with the framer 108, using the previously described procedure for establishing synchronization. The pseudo-random pattern is stored in the context memory page (page 0) associated with the framing bit process.

After the framing bit process is completed, processing continues with the data channel 1 process, as illustrated in block 728. In block 730, flow shifts to the "process data channel" flow diagram, illustrated in FIG. 12. Block 732 indicates the completion of a routine associated with the "process data channel" state 730; the "return" stat 732 is used in subsequent flow diagrams to represent a return to the RUN PROCESSES state at block 732. After returning in block 732, the number of the active process is incremented in Block 734 and the data channels are sequentially processed by the loop formed by Blocks 730, 732, 734 and decision block 736. When the channel number is equal to 24 in decision Block 736, the signalling channel is processed in 738 as described in FIG. 20. At the end of the signalling channel process, control returns to the "Run Processes" routine of FIG. 11, as illustrated in FIG. 21 and 22.

Figure 12:
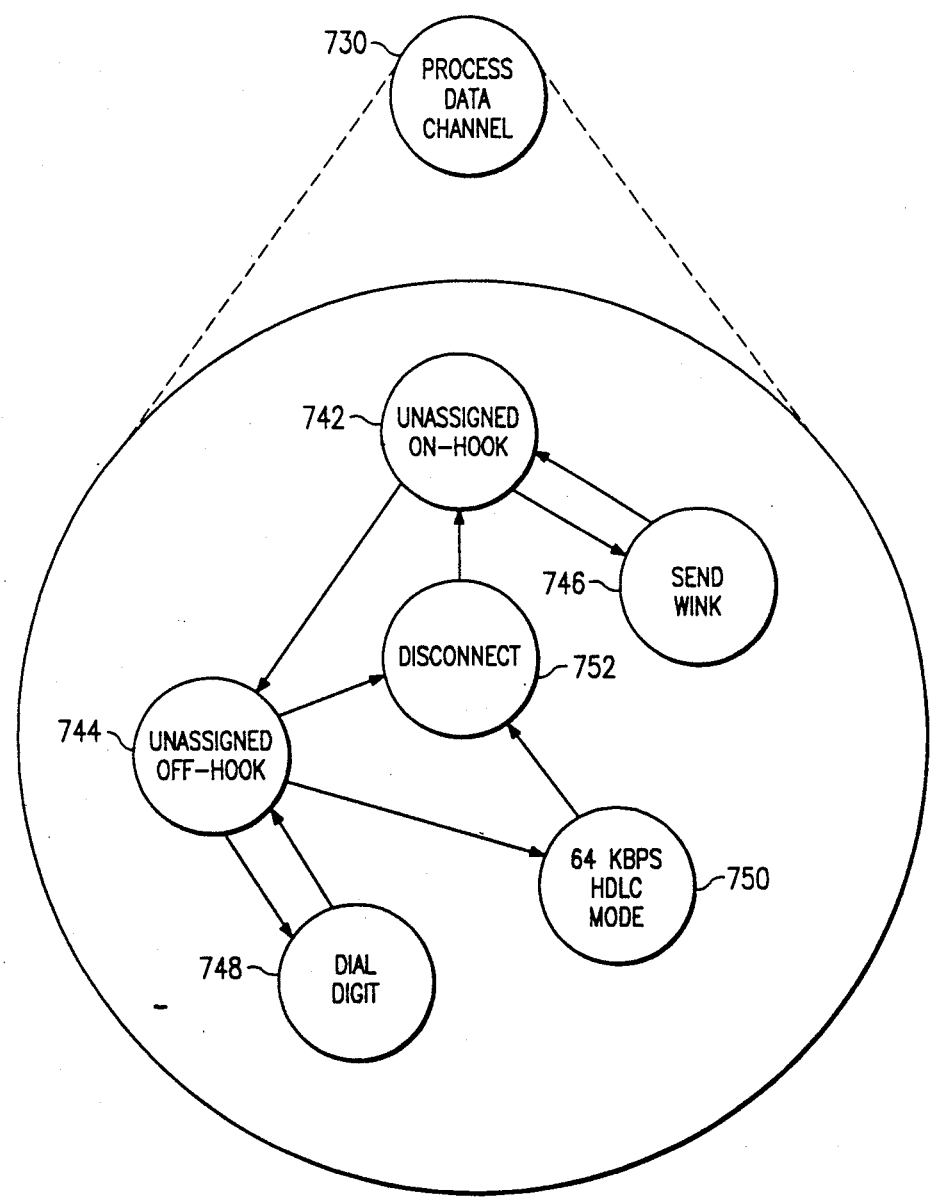

The "process data channel" state diagram is illustrated in FIG. 12. The process data channel state diagram illustrates the processing of several states of a data channel.

In the unassigned, on-hook state 742, the transmit processor 68 outputs data value FFH to the framer 108 until it undergoes a state change. From the unassigned on-hook state, the transmit processor 68 may be commanded by the layer 2 processor 72 to change to an unassigned off-hook state 744 or to a SEND WINK state 746. The output value of FFH indicates that the channel is in an unassigned state, while the "on, off-hook" location of the data channel context memory (TABLE 10) indicates whether the channel is on- or off-hook.

In the unassigned off-hook state 744, the transmit processor 68 sends the value FFH to the framer 108 during the particular channels processing interval. From the unassigned, off-hook state, the transmit processor 68 may be commanded by the layer 2 processor 72 to transfer to a dial digit state 748, a 64 Kbps HDLC mode state 750, or a disconnect state 752.

In a SEND WINK state 746, the transmit processor 68 sends an output of FFH to the framer 108 over a 100 millisecond time period, then switches to an off-hook state for 150 milliseconds, during which the transmit processor 68 continues to send the value FFH to the framer 108. After the 150 millisecond period has elapsed, the transmit processor 68 switches to an on-hook state for a 30 millisecond time period during which it continues to output the value FFH to the framer 108. At the end of the 30 millisecond period, the transmit processor 68 indicates to the layer 2 processor 72 that a wink was sent and the state returns to unassigned on-hook state 742. The dial digit state 748 outputs dialing pulses for connection purposes. The transmit processor 68 performs a dialing pulse by going on-hook for 60 milliseconds and off-hook for 40 milliseconds for each pulse in the digit. Therefore, dialing a '5' would result in 5 sixty millisecond on-hooks (or "breaks") interleaved with 5 forty millisecond off-hook states (or "makes"). After the final 40 millisecond make state, the transmit processor would go off-hook for 600 milliseconds before returning. The transmit processor 68 goes off-hook or on-hook by changing the "on, off-hook" location of the particular data channel. During the entire sequence described above, the process continues to output the channel unassigned code FFH.

In the DISCONNECT state 752, the transmit processor 68 sets the "on, off hook" location in the data channel's context memory to indicate a on-hook condition, optionally performs various timing, and begins to output the channel unassigned code FFH before returning to the "unassigned, on-hook" state 742.

Figure 13:
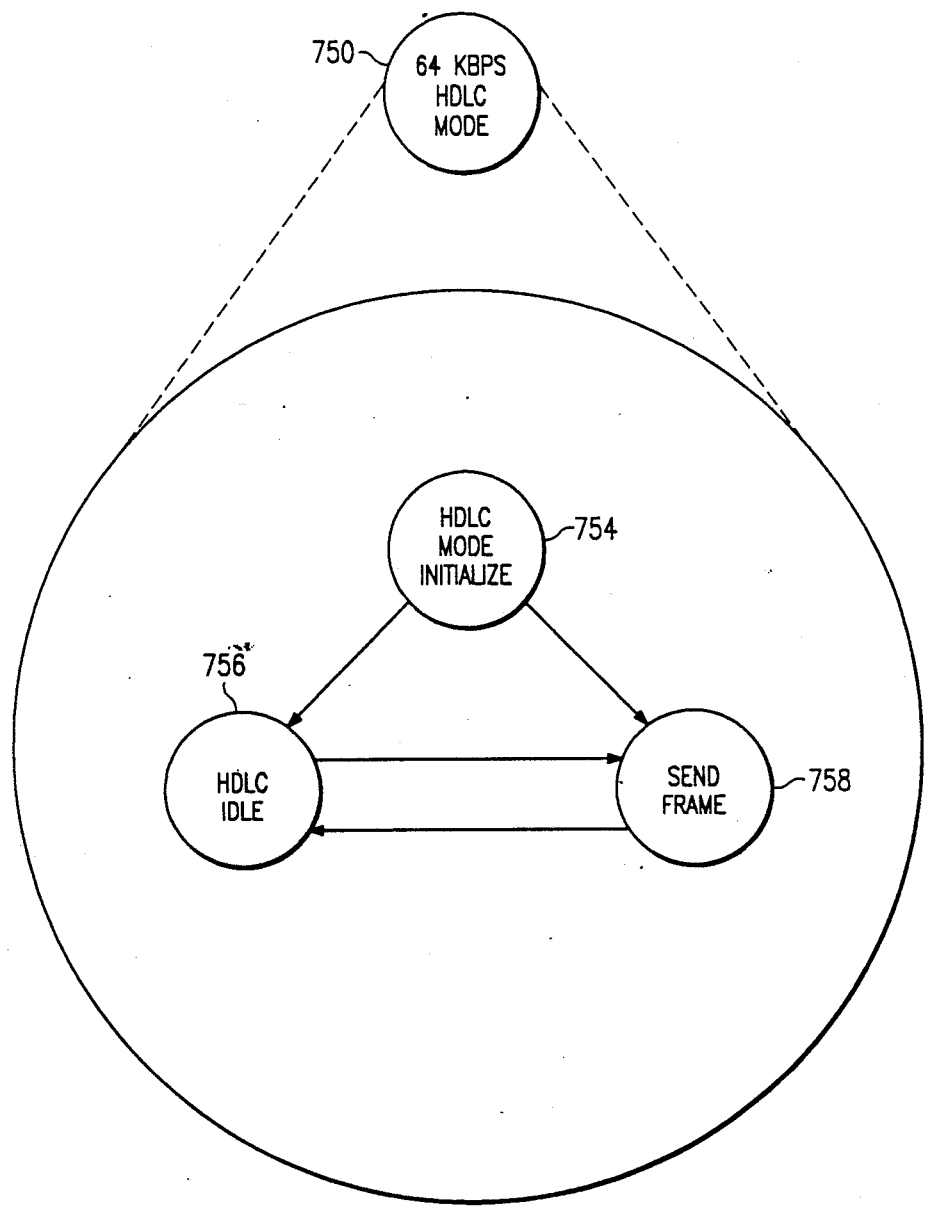

The 64 kbps HDLC mode 750 is further illustrated in FIG. 13. FIG. 13 illustrates state diagram for the 64 kbps HDLC mode 750. The 64 kbps HDLC mode has three states: a HDLC mode INITIALIZE state 754, a HDLC IDLE state 756, and a SEND FRAME state 758. The HDLC mode starts in the INITIALIZE state 754 and changes to an IDLE state 756 at the completion of initialization, unless commanded by the layer 2 processor 72 to change to the SEND FRAME state 758 or the DISCONNECT state 752. After completion of the SEND FRAME state 758, if no new command has been received from the layer 2 processor 72, the HDLC mode 750 returns to the IDLE state 756 and waits for a command from the the layer 2 processor 72 to change to either the SEND FRAME 758 or the DISCONNECT state 752. If upon completion of the SEND FRAME state 758, a new command has been received from the layer 2 processor 72 the HDLC mode 750 will change immediately to the DISCONNECT state 752 or will stay in the SEND FRAME state 758 (to begin sending a new frame).

Figure 14:
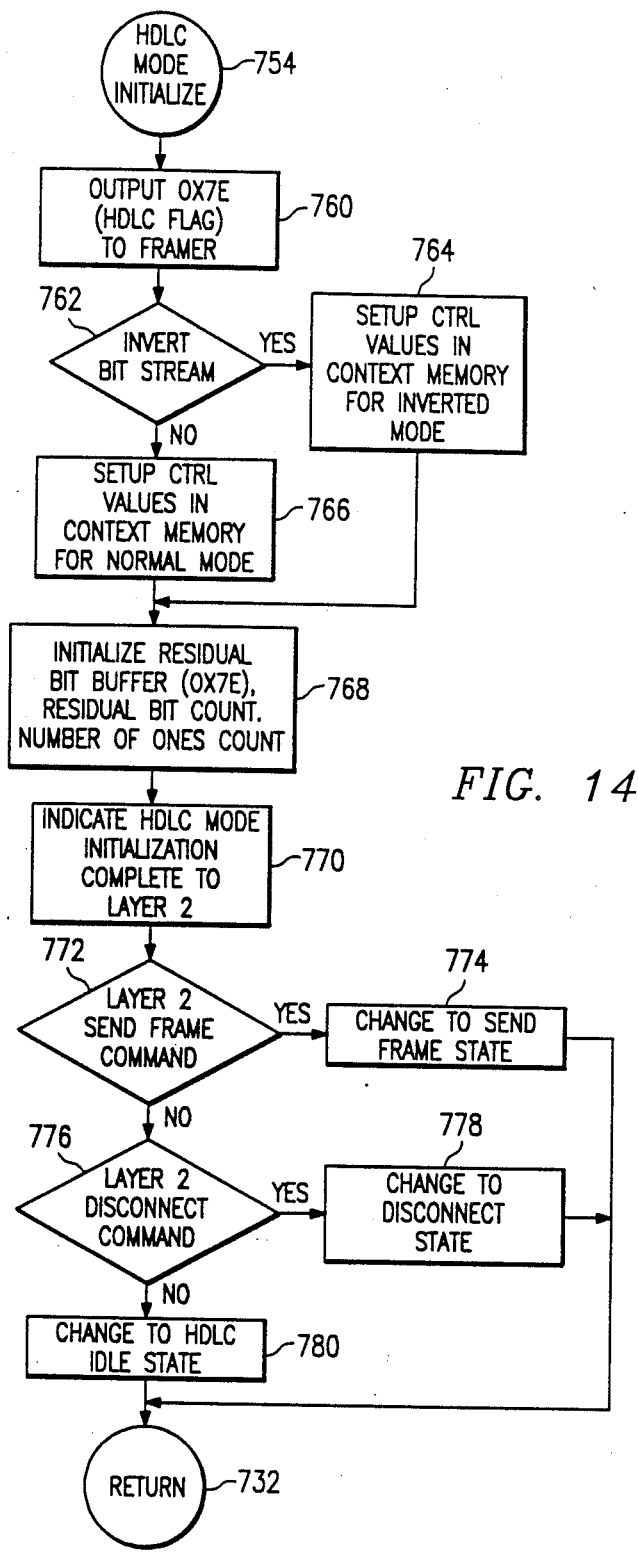

The HDLC mode INITIALIZE state 754 is illustrated in FIG. 14. In block 760, the transmit processor 68 outputs the hexadecimal value 7EH to the framer to indicate that the particular channel is no longer unassigned. The value 7EH is known as the "HDLC flag." In decision block 762, the decision is made whether the data bit stream will be inverted during transmission. If the layer 2 processor 72 commands that data will be inverted, then the value stored in the "primary CTRL byte" location and "secondary CTRL byte" location of the context memory page associated with the particular data channel will be that required to invert data going through programmable inverter 542 during transmission, as shown in block 764. If the layer 2 processor 72 commands that the bit stream will not be inverted, then the value stored in the "primary CTRL byte" location and "secondary CTRL byte" will be such that data going through the programmable inverter 542 will not be inverted during transmission, as shown in block 766.

In block 768, the high-order byte of the "residual bit" location of the data channel context memory page is loaded with the hexadecimal value 7E, the "residual bit count" location of the data channel context memory page is loaded with the value −8, and the "number of ones count" location is loaded with the value −6. The value 7E corresponds to the HDLC flag to be output, the −8 corresponds to the number of bits remaining to be output for the bytes stored in the "residual bits" location, and the −6 is used to count the number of consecutive ones Which may be output before HDLC 0 stuffing is required.

In Block 770, the layer 2 processor 72 is informed that the HDLC initialization has been completed. In decision blocks 772 and 776, the transmit processor 68 checks the appropriate locations in the shared memory 444 to see if the layer 2 processor 72 has issued either a send frame command or a disconnect command. If so, the HDLC mode transfers control to the SEND FRAME state 758 in block 774 or to the DISCONNECT state 752 in Block 778. If neither command has been sent, then the HDLC mode transfers control to the HDLC IDLE state 756 in Block 780.

Figure 15:
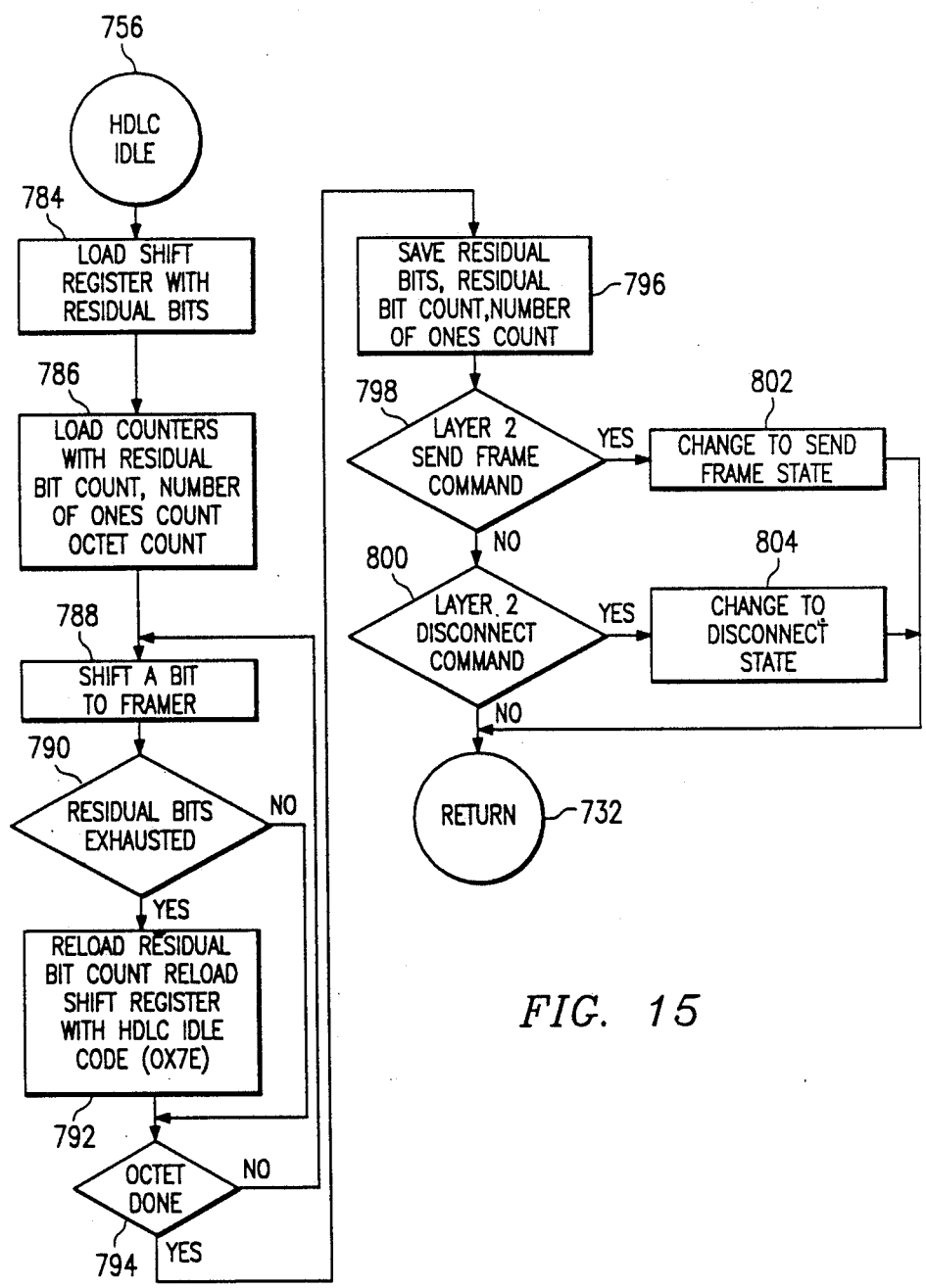

The HDLC IDLE state is illustrated in FIG. 15. The high data register 410 and shadow register 538 are loaded with the part of the HDLC flag stored in the "residual bits" location of the data channel's context memory page, as shown in block 784. In block 786, the first counter 466 is loaded with the value held in the "residual bit count" location of the data channel context memory page, the second counter 468 is loaded with value held in the "number of ones count" location of the data channel's context memory page and the third counter 472 is loaded with the value −8, i.e., the octet count. The value in the third counter 472 tracks the number of bits shifted to the framer 108 during the current processing interval; after the required number of bits have been shifted, the relevant data is returned to context memory and the next process on the linked process list takes control.

Blocks 788, 780, 792, and 794 create a loop in which eight bits of the HDLC flag (7EH) are output to the framer 108. In Block 788, a bit is shifted from the shadow register 538 through the programmable inverter 400, programmable inverter 542, fifo 110, and eventually to the framer 108. The high data register is also shifted right by one position. Upon shifting a bit in block 788, the first and third counters 466 and 472 are incremented. In decision block 790, the residual bit count held in the first counter 466 is checked to determined whether the residual bits have been exhausted. If so, the residual bit count is reset and the high data register 410 and shadow register 538 are reloaded with the HDLC flag 7EH. If the residual bit count is not exhausted in decision block 790, program control shifts directly to decision block 794. In block 794, the third counter 472 is checked to determined whether the octet count has finished, indicating that the eight bits for the particular channel have been transmitted. If the octet count is not finished, the program control returns to block 788 and another bit is shifted out of the shadow register 538, and the high data register 410 is shifted right by one. If the octet is done, the relevant current data in the counters 466 and 468 and the high data register 410 is stored in the data channel's context memory page in block 796.

In the preferred embodiment, the counters 466, 468, and 472 are loaded with a negative value of the desired count. For example, since eight bits should sent on each processing interval for a data channel, the value −8 is stored in the third counter 472. As each bit is shifted out of the shadow register 538, the third counter 472 is incremented. Hence, when one bit is left to be shifted, the overflow pin 526 of the third counter 472 will indicate that the octet will be finished on the next shift. The overflow pins 522, 524 and 526 of the counters may be used to control program flow with the JVEC and JVECT commands previously described. The overflow pins can be used to identify important points in the processing, such as when an octet has been completed, when a word or byte has been transmitted, or when a bit should be stuffed in the data stream. By using the status of the counting elements to direct program flow, fast and efficient processing of the information is achieved. This is necessary since each channel must be processed within 5.1 microseconds.

In block 796, the residual bits from the high data register 410, the residual bit count stored in the first counter 466, and the number of ones count stored in the second counter 468 are stored in the data channel's context memory page in the locations specified in TABLE 10.

After storing the data in block 796, the transmit processor 68 checks the shared memory 444 to determine whether there is a SEND FRAME command in decision block 798 or a DISCONNECT command in decision block 800. If so, the data channel is changed to the desired state by writing the applicable address into the "State Address" location of the data channel's context memory page in blocks 802 and 804. In block 732, the HDLC idle process is complete, and the next process on the process linked list is undertaken.

Figure 16:
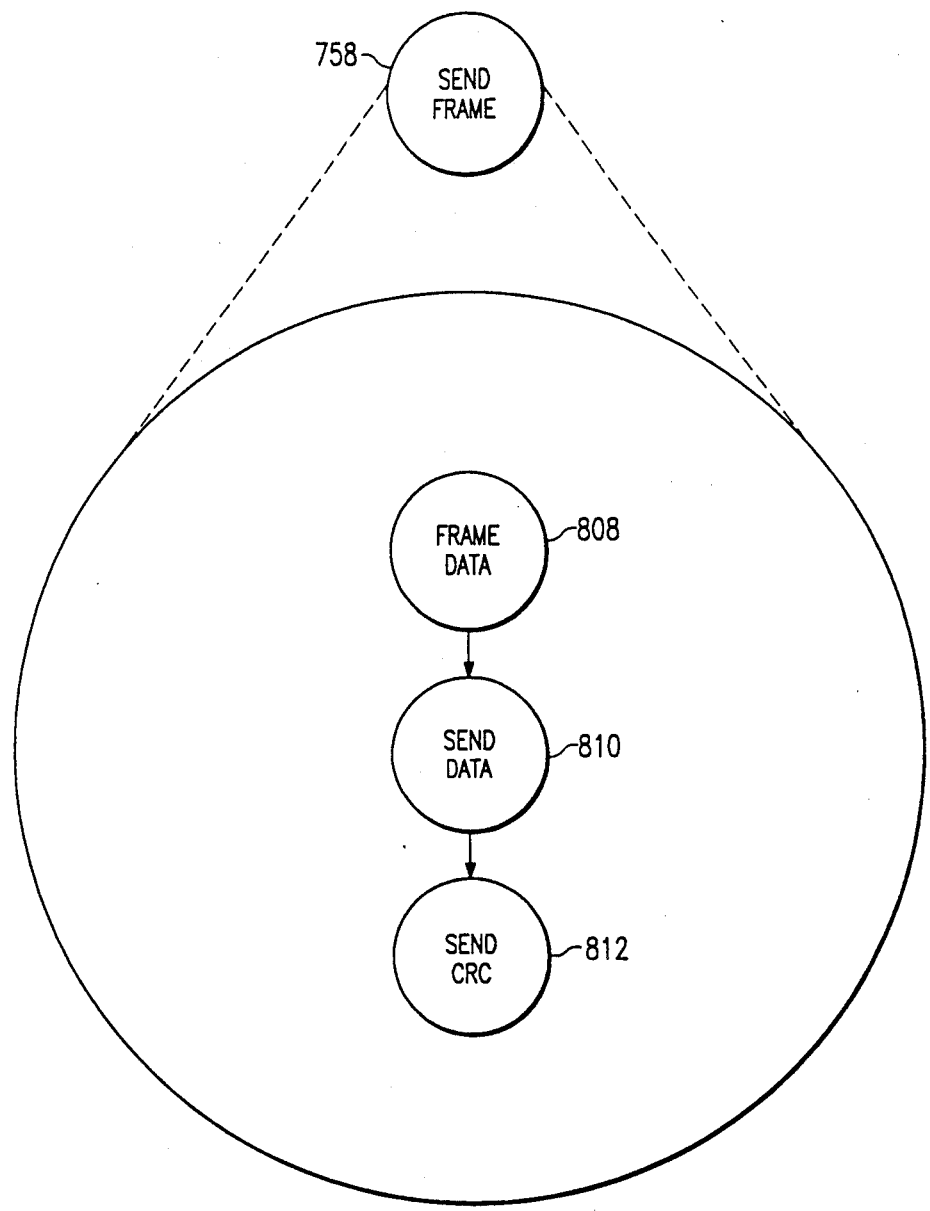

The SEND FRAME state 758 is illustrated in the state diagram of FIG. 16. The SEND FRAME state comprises three states: a FRAME DATA state 808, a SEND DATA state 810 and a SEND CRC state 812.

Figure 17:
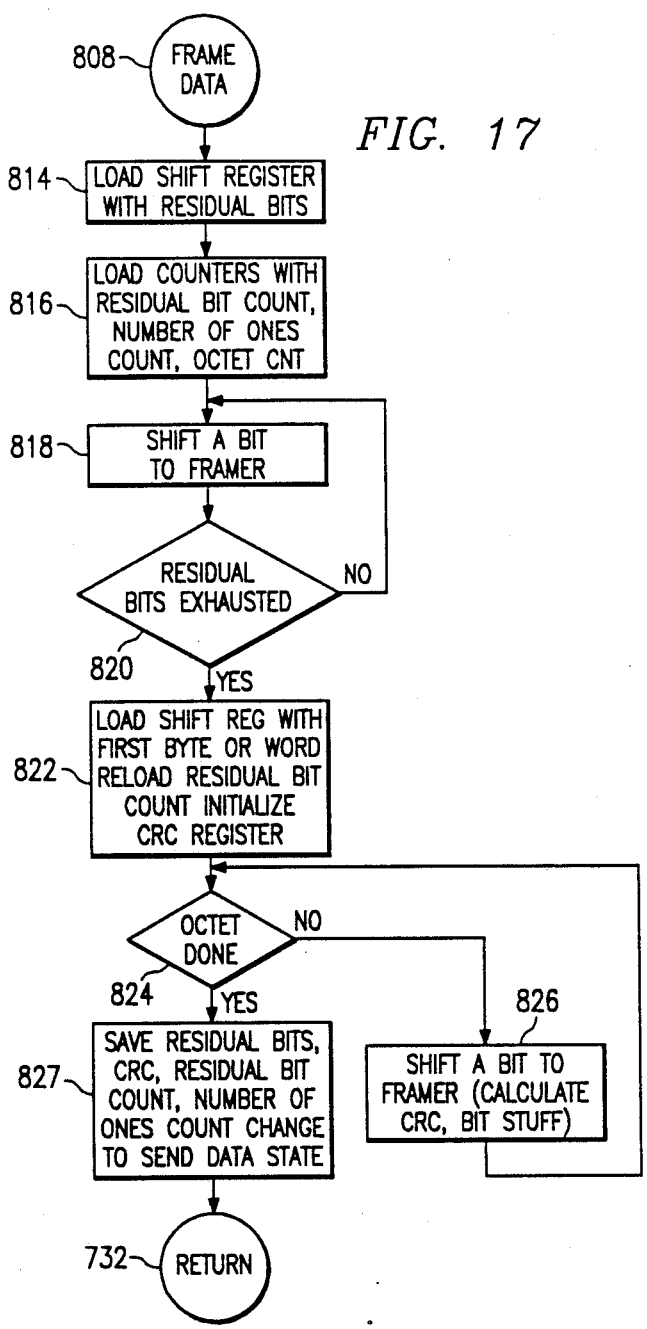

In FIG. 17, the process associated with the FRAME DATA state 808 is illustrated. In block 814, the high data register 410 and shadow register 538 are loaded with the residual bits as previously described in conjunction with FIG. 15. In block 816, the first counter 466 is loaded with a residual bit count and the second counter 468 is loaded with the number of ones count from context memory, and the third counter 472 is loaded with −8, as described in conjunction with FIG. 15. In blocks 818 and 820, the bits stored in the shadow register 538 are shifted out to the framer 108 as previously described, until the residual bits are exhausted.

In block 822, the high and low data registers 410 and 404, and the shadow register 538, are loaded with the first data word of the frame. If there are an odd number of words in the data frame, then the high data and shadow registers 410 and 538, are loaded with the first byte of the frame. If there are an even number of words in the data frame, then the data and shadow registers 410, 404 and 538 are loaded with a full sixteen-bit word. Also, the residual bit count is reloaded in the first counter 466 to reflect either a eight-bit byte or a sixteen-bit word. The CRC registers 416 and 418 are initialized to begin the start of a frame.

In blocks 824 and 826, a loop is formed wherein bits of the data frame are shifted out to the framer 108 until the octet is finished. As each bit is shifted from the shadow register 538, the CRC is calculated and the HDLC bit stuffing is performed, and the high and low data registers 410 and 404 are shifted.

After the octet is completed, the residual bit count, CRC, residual bits, and number ones count are stored in the data channel's context memory page in block 827 as described in conjunction with TABLE 10. The state of the SEND FRAME state 758 is changed to a "SEND DATA" state 810. Block 732 indicates that the FRAME DATA process is completed and the next process on the linked process list is performed as described in FIG. 11.

Figure 18:
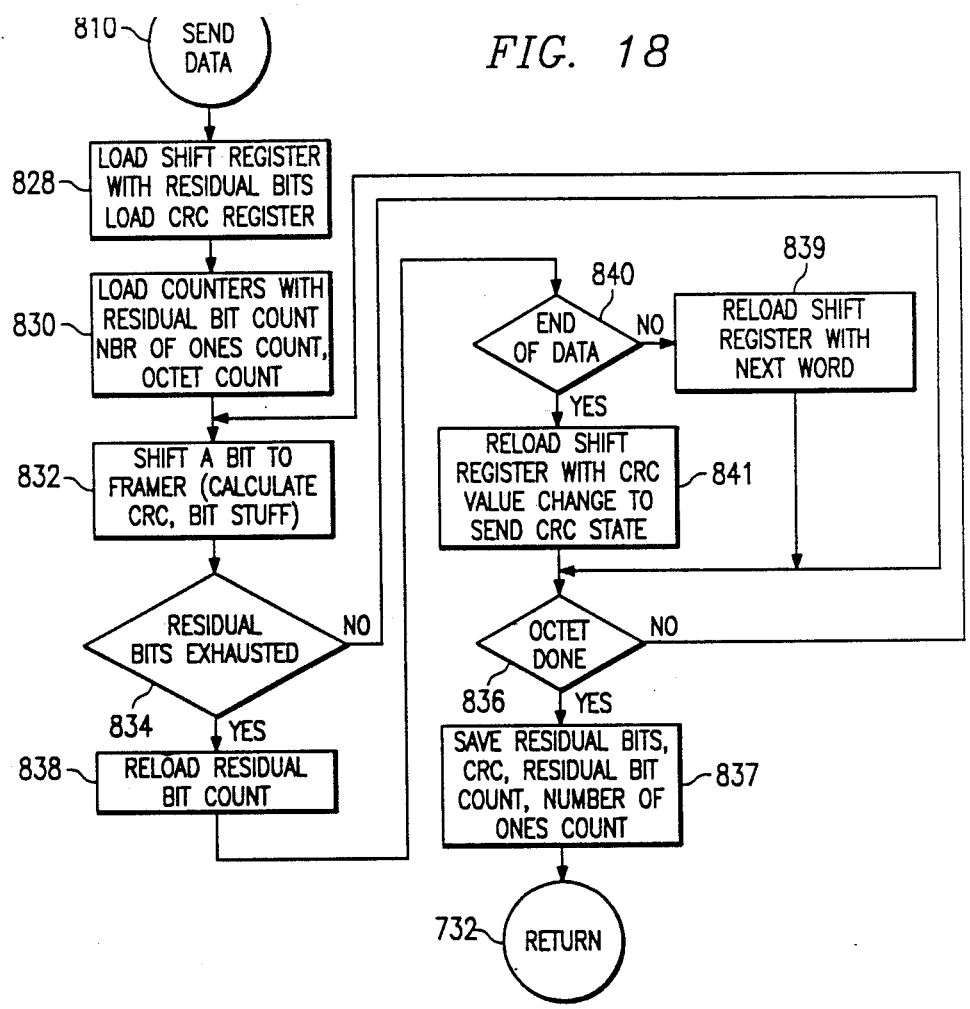

The process associated with the SEND DATA state 810 is illustrated in the flow chart of FIG. 18. The purpose of the SEND DATA process is to send a frame of data stored in a block of shared memory 444. The address defining the bottom of the block of memory are given by the layer 2 processor 72. The current buffer address location in the data channel context memory page indicates the address of the word currently being transmitted.

In block 828, the shadow register 538, high data register 410, and low data register 404, are loaded with the residual bits from the data channel's context memory page. Also, the CRC bits stored in the context memory page are loaded into the CRC registers 416 and 418.

In block 830, the counters 466, 468, and 472 are loaded with the residual bit count, number of ones count, and octet count as described in conjunction with FIG. 15.

In block 832, a bit is shifted from the shadow register 538, to the framer 108 through the intermediate registers as previously described. Concurrently, the CRC is calculated and HDLC bit stuffing is performed. In decision Block 834, the residual bit count is tested to determine whether the entire word has been shifted through the shadow register 538. If not, the octet count is tested to determine whether any more bits can be shifted during this processing interval in decision block 836. If the octet is not complete, another bit is shifted from the shadow register 538. The loop between blocks 832, 834 and 836 continues until either the residual bits are exhausted or the octet is complete. When the residual bits have exhausted in decision block 834, the residual bit count is reloaded to an initial value in block 838. In block 840, the current address is tested to determine whether all of the data in the frame has been sent. If not, the next word from the block of shared memory 444 is loaded into the shadow register 538 and the data registers 410 and 404. If the octet is not complete, the loop between the Blocks 832, 834 and 836 is continued until the octet is complete. If the last word in the block of data has been sent in decision block 840, the value in the CRC registers 416 and 418 are transferred to the data registers 410 and 404 in block 841, and the shadow register 538 and the state is changed to the SEND CRC state illustrated in FIG. 19. Else, the shift register is loaded with the next word in block 839.

If the octet is completed in decision block 836 before the residual bits are exhausted in decision block 834, then the residual bits, CRC, residual bit count, and number of ones count are stored in the locations of the data channel's context memory page as described in TABLE 10. Upon saving the context memory information, the next process on the linked process list is performed.

Figure 19:
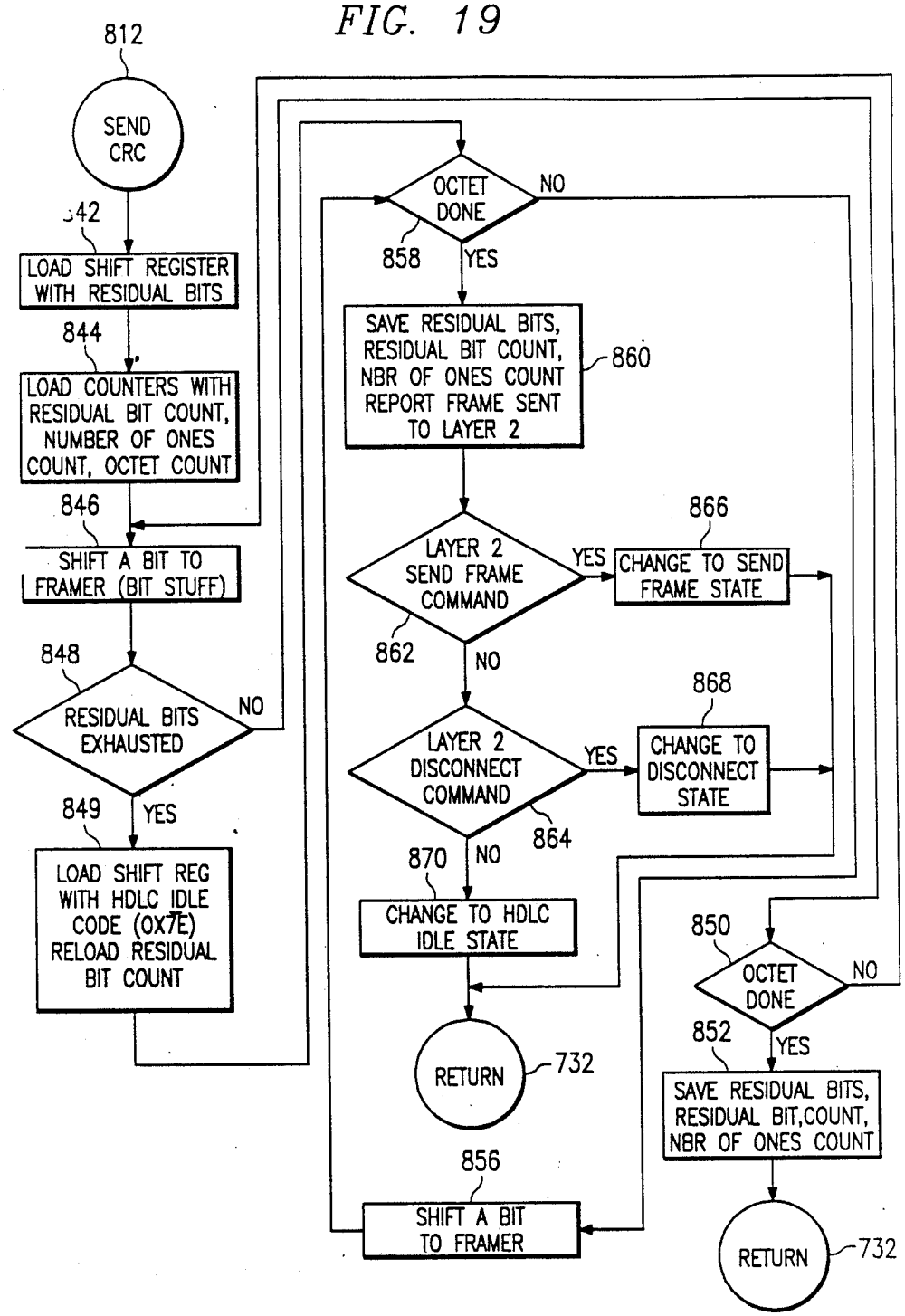

The process associated with the SEND CRC state 812 is illustrated in the flow diagram of FIG. 19. The SEND CRC process outputs the remaining bits of the CRC, and then begins the output of the HDLC flag (7EH) and shifts to the IDLE state, unless the layer 2 processor 72 has commanded a shift to the SEND FRAME state or the DISCONNECT state.

In block 842, the data registers 510 and 514 and the shadow register 538 are loaded with the residual bits from the data channel's context memory page. As illustrated in FIG. 18, the residual bit location of the context memory page will hold the CRC word after all the data from the shared memory block has been sent. In block 844, the first and second counters 466 and 468 are loaded with the residual bit count and the number of ones count from the context memory page and the third counter 72 is loaded with the octet count.

Blocks 846, 848 and 850 form a loop in which bits are shifted from the shadow register 538 to the framer 108 until either the residual bits are exhausted in decision block 848 or the octet is complete in decision block 850.

Once the residual bits are exhausted in block 848, the shift registers are loaded with the HDLC idle code (7EH) and the residual bit count of the first counter 466 is reset to indicate a new byte. If the octet is completed in decision block 850 before the CRC has been fully output, the residual bits, residual bit count, and number of ones count is stored in the channel's context memory page in block 852 for output on the next processing interval. Processing continues in block 732 (see FIG. 11) with the next channel on the linked process list.

If the residual bits of the CRC word are exhausted in decision block 848 before the octet is completed in decision block 850, the HDLC idle code will be output in block 856 until the octet is complete in decision block 858. When the octet is complete in block 858, the residual bits, residual bit count and number of ones count relating to the HDLC idle code is stored in the data channel's context memory page, and the transmit processor 68 notifies the layer 2 processor 72 that the data frame has been sent. In decision blocks 862 and 864, the transmit processor 68 checks to see whether the layer 2 processor 72 has sent either a SEND FRAME command or a DISCONNECT command; if so, the data channel will be changed to the appropriate state, as shown in blocks 866 and 868. Otherwise, the data channel will change to a HDLC idle state in block 870 as described in FIG. 15. In block 732, the transmit processor 68 begins processing the next data channel on the linked process list.

Figure 20:
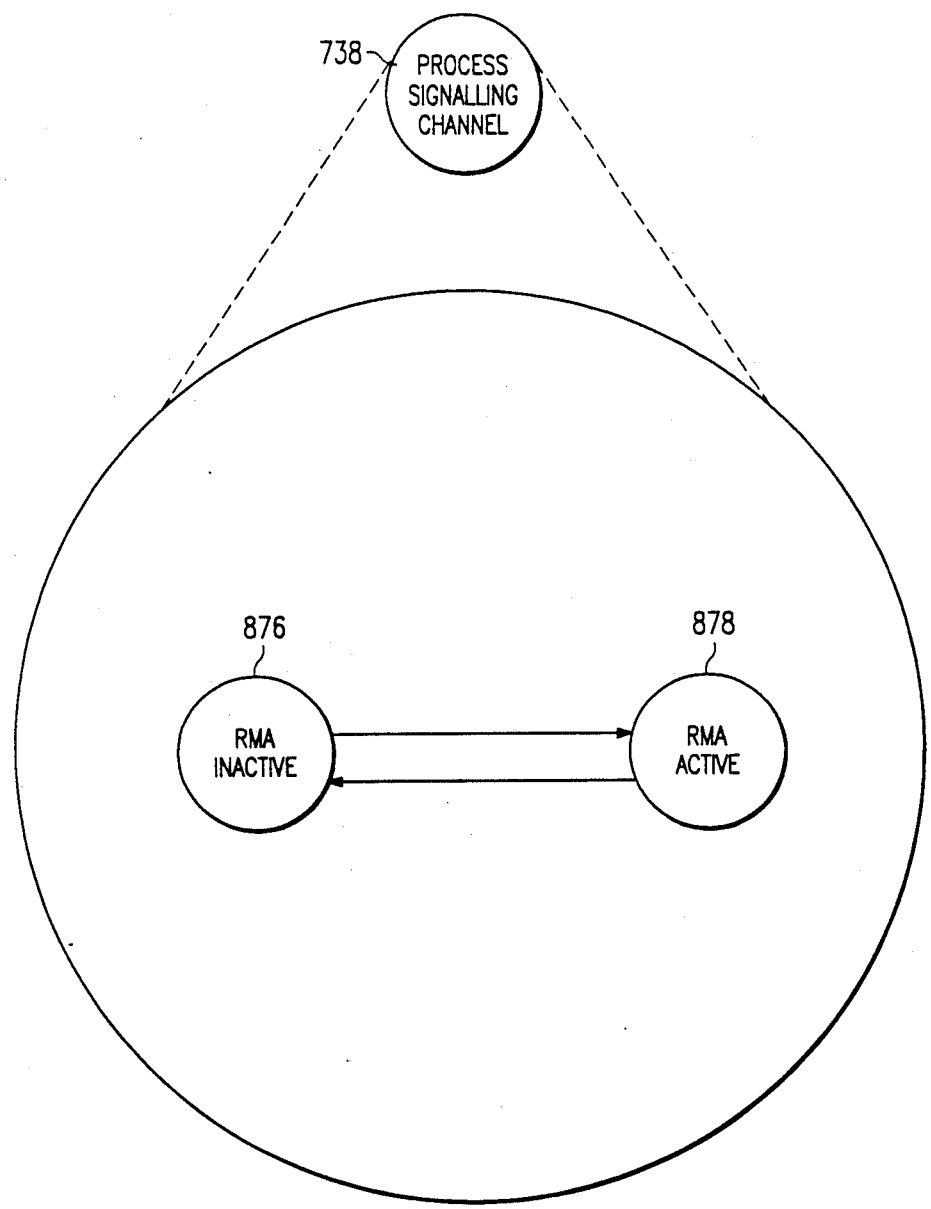

The PROCESS SIGNALLING CHANNEL state 738 diagram is illustrated in FIG. 20. The PROCESS SIGNALLING CHANNEL state 738 may be in one of two states: an RMA INACTIVE state 876 or a RMA ACTIVE state 878. The transmit processor 68 is in RMA ACTIVE state 878 whenever the receive processor is detecting an LMA alarm condition.

The process associated with the RMA INACTIVE state 876 is illustrated in the flow chart of FIG. 21. In block 880, the signalling states for two data channels are shifted to the framer 108. The signalling states indicate whether the reference data channels are on-hook or off-hook. For each frame of a signalling multiframe the referenced data channels change in accordance with the channel specified by the "primary channel pointer" and "secondary channel pointer" locations in the transmit signalling channel's supplementary context memory (pages 20H–37H). Also in block 880, the channel pointers are updated to specify the two data channels whose signalling states will be sent on the next signalling channel's time period. In decision block 882, the RMA inactive process 876 tests whether the frame currently being transmitted is the twenty-fourth frame in the multiframe. If the current frame is not the twenty-fourth frame, then the reserved bits, stored in the "low-order five bits" location of the transmit signalling channel's supplementary context memory, are output to the framer 108. In the current DMI specification, the five reserved bits have a binary value of "00010." However, if the current frame is the twenty-fourth frame in the multiframe, then the multiframe alignment signal is output in place of the reserved bits. Since the RMA is inactive, the multiframe alignment signal has a binary value of "10101." In decision block 888, the RMA inactive process 876 accesses its message address location to determine whether the layer 2 processor 72 has issued a SET RMA command. If so, the signalling channel switches to an RMA ACTIVE state in block 890. Otherwise, the signalling channel remains in an RMA inactive state, and returns to the RUN PROCESSES state 722.

The process associated with the RMA ACTIVE state 878 is illustrated in FIG. 22. The process associated with the RMA active state 878 is identical to the process associated with the RMA inactive state 876, illustrated in FIG. 21, except for blocks 900, 902, and 904. In the RMA active state 878, the process outputs a multiframe alignment signal indicating that the RMA alarm is on, a binary value of "10001." In decision block 902, the process determines whether the layer 2 processor 72 has issued a RESET RMA command. If so, the signalling channels reverts to a RMA INACTIVE state 876. Otherwise, control returns to the RUN PROCESSES state 722.

The receive processor 66 uses status messages to inform the layer 2 processor 72 of the call status. The six status messages used by the receiver processor 66, and the preferred coding, are: RING RECEIVED (FAH), DISCONNECT RECEIVED (F9H), TIME OUT (F8H), DIGIT RECEIVED (F7H), WINK RECEIVED (F6H), and ANSWER RECEIVED (F5H). The layer 2 processor 72 acknowledges receipt of these messages by writing a STATUS RECEIVED, coded as FFH, to the same location on which the status was received. Once microcode has written a call status message, it will not process any further command until acknowledgment is received.

The signalling channel uses four status messages to communicate with the layer 2 processor 72. The signalling status messages are: LMA DECLARED (FEH), LMA TERMINATED (FDH), RMA DECLARED (FCH), and RMA TERMINATED (FBH).

TABLE 14 lists the commands used by the layer 2 processor 72 to direct the operation of the receive processor 66. Whenever the command has an associated parameter, the parameter must be written in the shared memory 444 before the command.

TABLE 14

| CODING (Hex) | Receive Commands COMMAND |
|---|---|
| 00: | FREEZE SIGNALLING |
| 20: | T1-BOS |
| 21: | WAIT WINK START IN |
| 22: | WAIT AUTO START IN |
| 23: | WAIT WINK START OUT |
| 24: | WAIT AUTO START OUT |
| 25: | IDLE |
| 26: | WAIT DISCONNECT |
| 27: | WAIT DIGIT |
| 28: | WAIT ANSWER |
| 29: | HDLC |
| 2A: | HDLC INV |
| 2B: | GET FRAME |
| FF: | UPDATE SIGNALLING |

The FREEZE SIGNALLING command is issued to channel twenty-four to discontinue the update of signalling status for the 23 data channels. The T1-BOS command initializes the program for 24 channel, BOS operation. It should only be issued as the first command following a system reset.

The WAIT WINK START IN command is issued to channels 1-23. After receiving the command, the channel waits for an off-hook signal, then reports RING RECEIVED to the layer 2 processor 72. The WAIT AUTO START IN command is issued to channels 1-23. After receiving the command, the channel waits for an off-hook signal lasting 150 milliseconds, then reports RING RECEIVED. The WAIT WINK START OUT command is issued to channels 1-23. After receiving the command, the channel waits for an off-hook signal lasting between 100 and 350 milliseconds, then waits for 70 milliseconds before reporting a WINK RECEIVED If the off-hook signal lasts longer than 350 milliseconds, RING RECEIVED is reported. When the layer 2 processor 72 issues this command, it must include a call time out value, passed through a parameter location. The time out value is expressed as an number of 32 millisecond periods. If the off-hook signal does not occur within the time out period, a TIME OUT is reported. The WAIT AUTO START OUT command is issued to channels 1-23. After receiving the command, the channel waits for an on-hook signal lasting for 100 milliseconds followed by an off-hook signal, after which it reports an ANSWER RECEIVED. If an off-hook signal is detected earlier than 100 milliseconds RING RECEIVED is reported. When the layer 2 processor 72 issues this command, it must include a call time out value, passed through a parameter location as described in the previous command.

The IDLE command is issued to channels 1-23. After receiving this command, the channel does nothing but shift in bits from the framer 108. All signalling status updates are ignored. This state is also entered when a call status message has been reported to the layer 2 processor 72, but no new command has been issued. The WAIT DISCONNECT is issued to channels 1-23. The channel waits for an on-hook signal lasting 150 milliseconds then reports DISCONNECT RECEIVED. The WAIT DIGIT command is issued to channels 1-23. The WAIT DIGIT command instructs the channel to wait for an on-hook signal followed by an off-hook signal, which it counts as a pulse. The sequence is repeated until an off-hook signal lasting longer than 150 milliseconds is detected. DIGIT RECEIVED is reported to the layer 2 processor 72, and the number of pulses received is passed in the high-order half of the call status location. If a pulse is not received within 10 seconds, a TIME OUT is reported. If an on-hook signal lasting longer than 150 milliseconds is detected, a DISCONNECT RECEIVED is reported. The WAIT ANSWER command is issued subsequent to receiving a WINK RECEIVED in response to a WAIT WINK START OUT command, the command instructs the channel to wait for an answer to a dialed out call. The channel waits for an off-hook signal before reporting ANSWER RECEIVED. The remainder of the time out value passed with the WAIT WINK START OUT command is used to detect a time out condition. If an off-hook signal is not received before the timer expires, a TIME OUT is reported.

The HDLC command prepares the channel for 64 kbps HDLC operation. The channel waits for an HDLC frame of data, which is stored in consecutive locations in shared memory 444, beginning at an address passed in a parameter location with the HDLC command, as it is received. The flags and CRC are not stored. The beginning address must be written before the command and must be specified as it appears from the microcode's point of view, i.e., a word address based on memory starting at address 0000. When a valid frame is received, a FRAME RECEIVED is reported by writing to the parameter location a sixteen-bit binary value, with the high-order bit set and the low-order fifteen-bits representing the number of bytes being passed. If a frame is less than one byte or longer than 508 bytes, or the frame is aborted, or a bad CRC is detected, the frame is discarded and the process continues waiting for a valid frame. If an on-hook signal lasting longer than 150 milliseconds is detected, a DISCONNECT RECEIVED, is reported. The HDLC INV command operates substantially identically to the HDLC command, but it prepares the channel for 64 kbps HDLC inverted bit stream operation. The GET FRAME command is similar to the HDLC and HDCL INV commands, but does not include instructions which initialize the processor for either an HDLC or inverted HDLC mode.

The UPDATE SIGNALLING command cancels a previously issued FREEZE SIGNALLING command and begins updating the signalling states for the 23 data channels.

FIGS. 23-30 illustrate the receive processor 66 flow charts.

Figure 23:
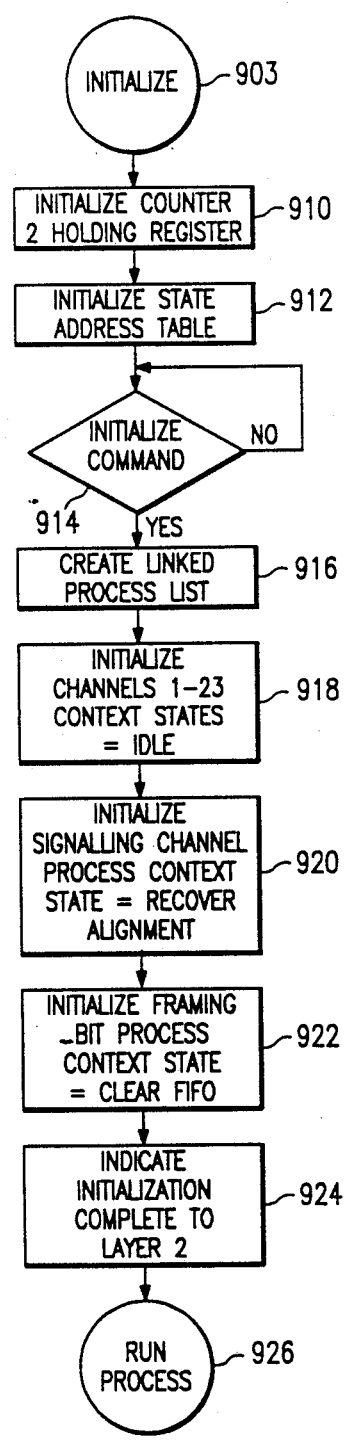

A flow chart illustrating the INITIALIZE process is illustrated in FIG. 23. The INITIALIZE process, denoted by reference character 903, begins by loading an initial value into the holding register 270. Normally, the holding register 270 will be loaded with a value of −6; thus, after counting 5 ones, an overflow condition will exist. In block 912, the state address table is initialized, setting the entry points into the microprogram memory 282 for the various layer 2 commands.

In decision block 914, a loop is formed wherein the INITIALIZE process waits until an INITIALIZE command is sent from the layer 2 processor 72. When the INITIALIZE command is received, the process continues to block 916, wherein a linked process list is created. As discussed in relation to the transmit processor 68 flow diagrams, the linked process list specifies a circular order of processes, i.e, a framing bit process, twenty-three data channel processes and a signalling channel process.

In block 918, the context memory pages associated with data channels 1-23 are set such that the "state address" location points to an IDLE routine in the microprogram memory 282. In block 920, the signalling channel context memory is set such that the signalling channel is in a "recover alignment" state. In block 922, the context memory associated with the framing bit process is set such that the process is in a "clear fifo" state. After the processes have been initialized, a message is sent to the layer 2 processor 72 indicating that the initialization process is complete in block 924. In block 926, control is relinquished to the RUN PROCESSES state illustrated in FIG. 24.

Figure 24:
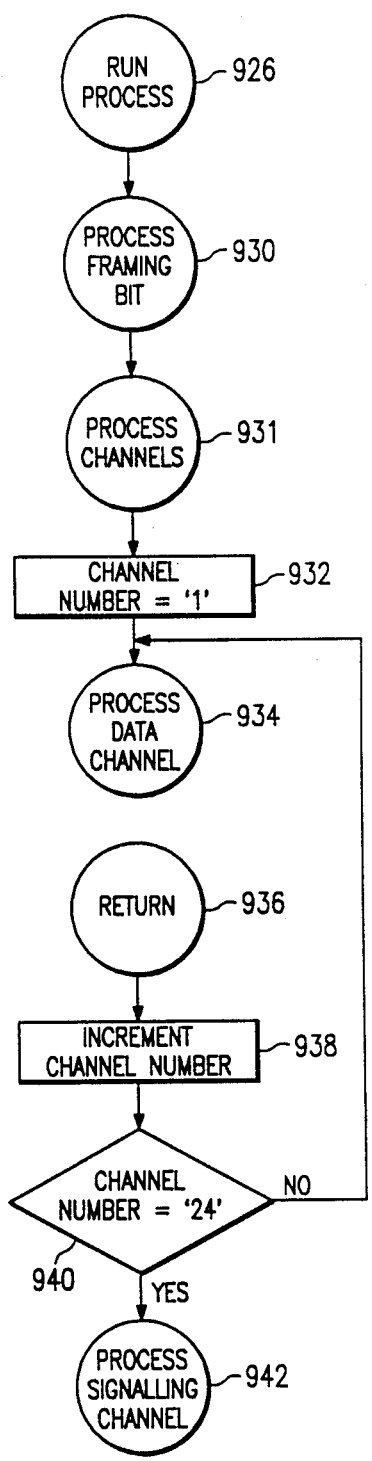

The RUN PROCESSES flow diagram is illustrated in FIG. 24. The run processes routine, indicated by reference number 926, illustrates the order in which the processes are run. In block 930, the framing bit process is performed. After completion of the framing bit process, the loop formed by blocks 934, 936, 938 and 940 process the data channels 1-23 in order. After the data channels are processed, the signalling channel is processed in block 942. After processing the signalling channel, the framing bit process is performed again.

Figure 25:
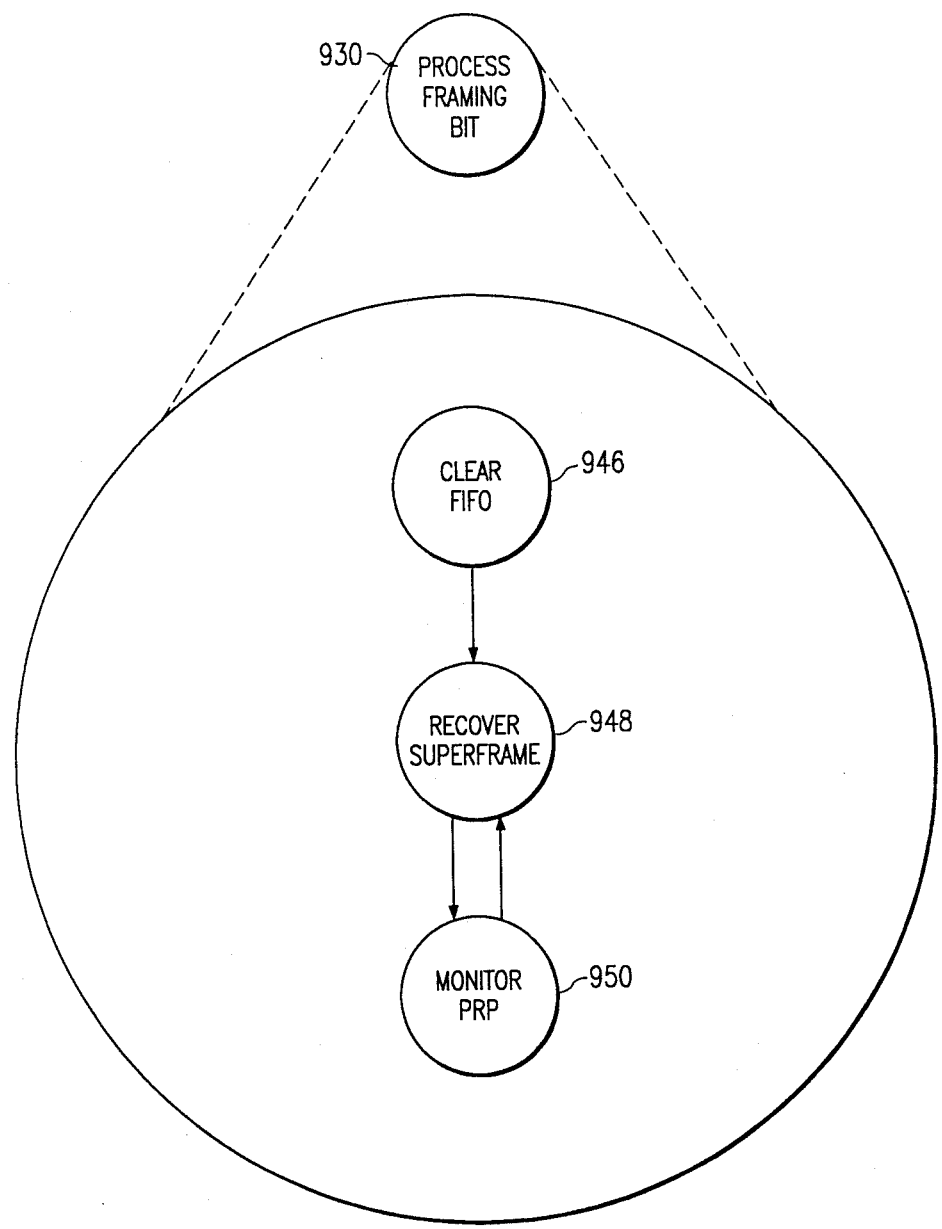

A state diagram for the framing bit process is illustrated in FIG. 25. The framing bit process 930 has three states: a CLEAR FIFO state 946, a RECOVER SUPERFRAME state 948 and a MONITOR PRP state 950. In the CLEAR FIFO state 946, 193 bits (one frame of data) are shifted from the fifo 112 and the information is discarded. The framing bit process proceeds to the RECOVER SUPERFRAME state 948.

The process associated with the RECOVER SUPERFRAME state 948 is illustrated in FIG. 26. In block 952, a bit is shifted in from the framer 108. In block 954, the status message location used to write status to the layer 2 processor 72 is checked to determine whether the status is clear. If the status is not clear in decision block 954, the program control returns to the PROCESS CHANNELS routine in block 931. If the status is clear in decision block 954, a loop formed by block 958 and decision block 960 is created wherein a bit is shifted in from the framer 108 until the recover superframe process 948 receives a start of superframe indication in decision block 960. The start of superframe indication from the framer 108 occurs on the framing bit of the last frame of a superframe (in Domestic Mode). The actual start of the superframe is 192 bits later; therefore, 192 bits are shifted in from the framer 108 in block 962 and discarded, and the state is switched to a MONITOR PRP state in block 964. In block 966, the bit count is initialized before proceeding to the MONITOR PRP state 950.

The process associated with the MONITOR PRP state 950 is illustrated in FIG. 27. The MONITOR PRP state 950 monitors the framing bits and compares them to a predetermined PRP pattern. In block 968, framing bits received from prior frames are taken from the framing process context memory page and stored in the low-data register 204. The number of bits previously received is also taken from context memory 226 and stored in one of the counters 266 or 272. In block 970, a bit from the framer 108 is shifted into the low-data register 204. If a byte of framing bits is not complete after shifting in the last framing bit in decision block 972, the data stored in the low-data register 204 and the bit count stored in the counter are returned to context memory 226 in block 974. If the byte is complete, the bit count is initialized in block 976 and the byte is compared to a predetermined PRP (stored in context memory) to determine whether the correct PRP code was received in decision block 978. If, in decision block 978, an incorrect PRP code is received, then the framing bit process reports a PRP error to the layer 2 processor 72 in block 980 and changes to the RECOVER SUPERFRAME state illustrated in FIG. 26. Subsequently, the process returns to the PROCESS CHANNELS state 931.

Figure 28:
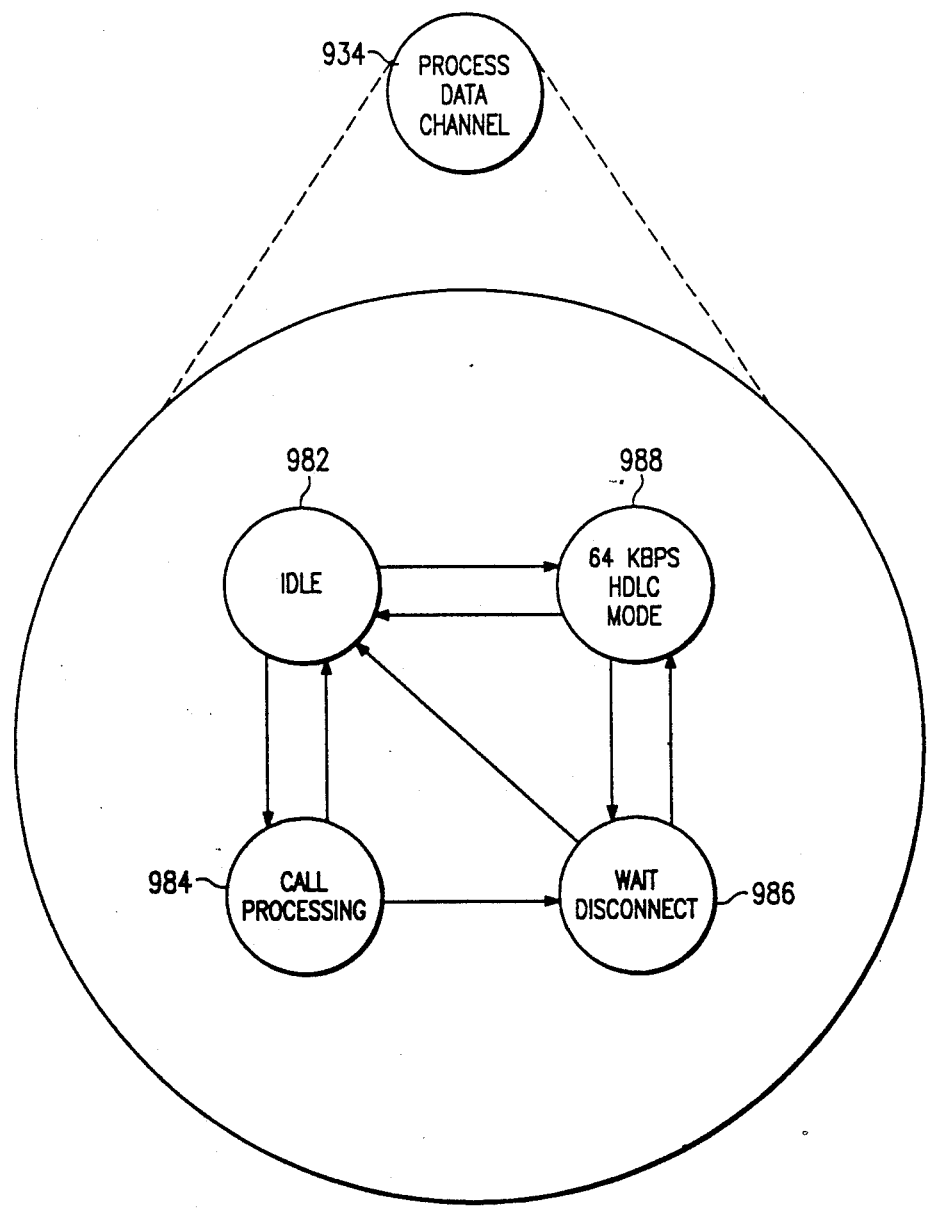

A state diagram for the process data channel state 934 is illustrated in FIG. 28. The process data channel state 934 has four states: an IDLE state 982, a CALL PROCESSING state 984, a WAIT DISCONNECT state 986 and a 64 kbps HDLC mode 988.

The IDLE state 982 shifts in eight bits from the framer 108 and checks the status message location used to write status to the layer 2 processor 72. If the status is clear, the IDLE state 982 determines whether there is a command from the layer 2 processor 72 instructing the IDLE routine to change to one of the routines of the CALL PROCESSING state 984. The CALL PROCESSING state 984 includes routines for receiving auto-incoming signals, wink signals, dialled incoming signals, answer signals, and dial digits.

The WAIT DISCONNECT state 986 waits for a on-hook signal lasting 150 milliseconds while shifting in eight bits each processing period, then reports a disconnect received status message to the layer 2 processor 72.

Figure 29:
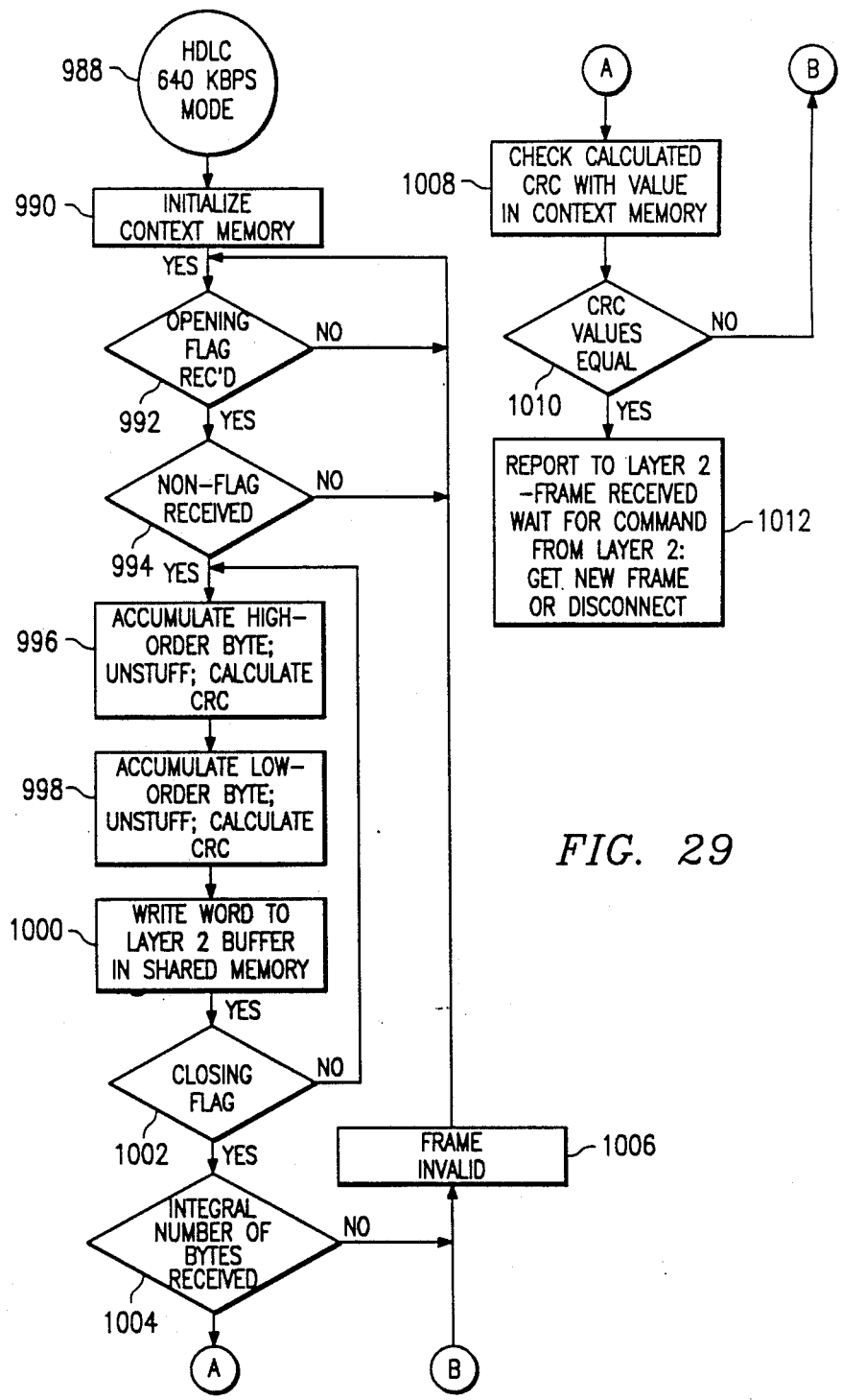

The processes associated with the 64 kbps HDLC mode state 988 are illustrated in FIG. 29. For ease of understanding, the flow chart outlines the operation for a single channel without accounting for the multiplexed processing of the data channels; as discussed in previous flowcharts, after processing the eight bits of a data channel, data from the elements of the receive processor 66 are stored in the context memory 226, and the next data channel is processed. The values stored in context memory are used for processing during the channel's next processing period.

In block 990, the context memory page associated with the particular channel being processed is initialized. Initialization sets the control values in context memory for an inverted or non-inverted output of the data bit stream, resets the 150 millisecond disconnect timer, resets the start of flag indicator, resets the number of ones count and resets the octet count. In block 992, the incoming data is monitored for an opening flag. After the opening flag is received, the data stream is monitored for a non-flag (block 994), since the transmitting end may send a plurality of flags before sending data. When data is received in block 996, the data is accumulated into the low data register 204 and embedded HDLC zeros are unstuffed. Also, data is shifted into the CRC to calculate the CRC check sequence. After accumulating the high order byte, the low order byte is accumulated, along with unstuffing and calculation of the CRC, as shown in block 998. After both the high order and low order bytes have been accumulated in blocks 998 and 996, the data word is written to the shared memory 244 where it may be accessed by the layer 2 processor 72 (block 1000). If the receive processor 66 does not detect a closing flag in decision block 1002, then the low order and high order bytes are again accumulated and sent to the shared memory 244. Although not illustrated in the flow diagram of FIG. 29 for purposes of simplicity, a closing flag may also be present after receiving a high order byte, if an odd number of bytes are being transmitted. When a closing flag is received, the process moves to block 958. In decision block 1004, the 64 kpbs HDLC mode process determines whether an integral number of bytes were received before the closing flag; if not, the frame is declared invalid in block 1006 and the processor waits for a new opening flag at decision block 992. If an integral number of bytes were received, the CRC calculated in the CRC registers 216 and 218 is compared with the CRC numbers stored in the context memory (block 1008). In decision block 1010, if the calculated CRC is different from the CRC stored in context memory, then the frame is declared invalid in block 1006 and the process continues at block 992, where the processor waits for an opening flag. If there is a match, then the process reports that a frame has been received to the layer 2 processor 72 and looks in shared memory 244 for a command from the layer 2 processor 72, either to get a new frame of data or for a disconnect command (block 1012).

Figure 30:
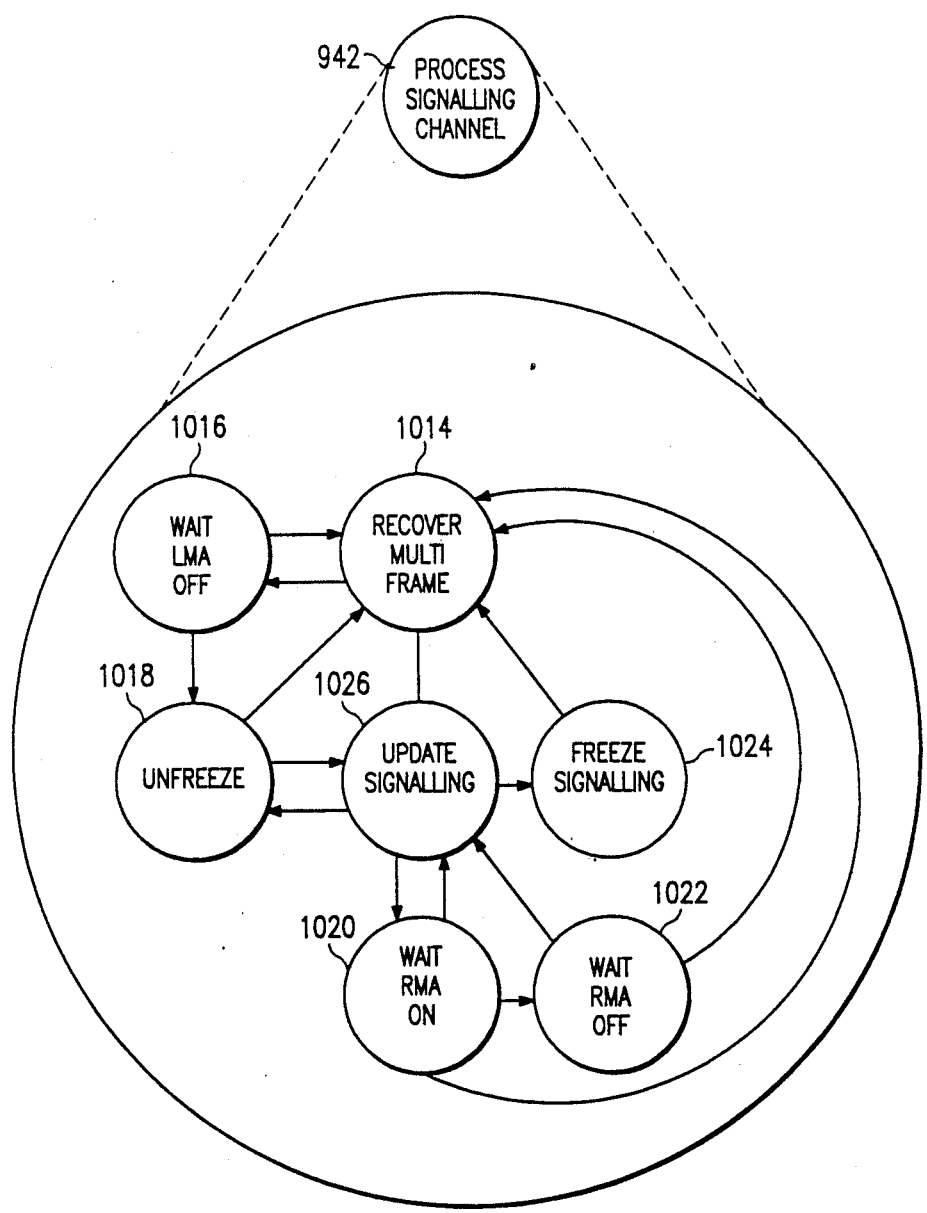

The process associated with PROCESS SIGNALLING CHANNEL state 942 is illustrated in FIG. 30. This state involves seven states: a RECOVER MULTIFRAME state 1014, a WAIT LMA OFF state 1016, an UNFREEZE state 1018, a WAIT RMA ON state 1020, a WAIT RMA OFF state 1022, a FREEZE SIGNALLING state 1024, and an UPDATE SIGNALLING state 1026.

The UPDATE SIGNALLING state 1026 is the only state in which signalling state information is processed. The remainder of the states discontinue processing of signalling state information.

The RECOVER MULTIFRAME state 1014 looks for an alignment sequence in the seventh bit of the signalling channel to determine when multiframe alignment has been recovered. If multiframe alignment is not recovered within 2 seconds, an LMA alarm is turned on.

The WAIT LMA OFF state 1016 waits 10 seconds after recovering multiframe alignment before turning on LMA Alarm off.

The UNFREEEE state 1018 waits an additional 1-2 multiframes before resuming processing of signalling state information after an MER condition (multiframe alignment error).

The WAIT RMA ON state 1020 monitors the twenty-fourth channel of each multiframe to see if the far end is sending an RMA. If an RMA exists for greater than 335 milliseconds, an RMA Alarm is reported to the layer 2 processor 72, and the state changes to a WAIT RMA OFF state 1022.

In the WAIT RMA OFF state 1022, the signalling channel waits for the far end to discontinue transmission of the RMA. The WAIT RMA OFF state 1022 returns to an UPDATE SIGNALLING state 1024 after RMA has been discontinued for 20 milliseconds. However, if the multiframe alignment is lost, the WAIT RMA OFF state 1022 changes to a RECOVER MULTIFRAME state 1014.

The FREEZE SIGNALLING state 1024 halts processing of the signalling channel after an error condition detected by the microprocessor 102 is sent to the layer 2 processor 72. Processing continues after the layer 2 processor 72 issues an appropriate command.

The adaptive digital network interface 62 described herein provides a means of serially processing a bit-oriented data stream on a Tl line. In the preferred embodiment, the adaptive digital network interface has been described as processing twenty-four eight-bit channels and a one-bit framing channel in accordance with the present DMI specification. However, since the adaptive digital network interface 62 processes data in a serial manner using software control, it affords many advantages over other present day multiplexed data communications systems.

Because the incoming and outgoing data is processed serially, both the multiplexing, framing and bit stuffing are performed simultaneously. Thus, the adaptive digital network interface 62 allows the DMI 24 to transmit and receive various divisions of the frame into data channels. For instance, it may be desirable to divide a frame into sixteen channels comprising twelve eight-bit channels, two sixteen-bit channels and two thirty-two-bit channels. By providing a program using the instruction set disclosed hereinabove, such a configuration could be accommodated. Since the adaptive digital network interface 62 is capable of serially processing the bit stream in real time, it is possible to receive and transmit a single 192-bit communication channel if desired. Furthermore, rate adaption (by the use of non-data bits) within the eight bit channels (or other channels having a preset bandwidth) can be accommodated.

Although the preferred embodiment uses an inverted HDLC protocol to satisfy the ones density requirement of the physical interface, it could be adapted to other protocols by modifying the microprogram, as would be evident to one skilled in the art.

Since the adaptive digital network interface 62 is software based, it could be designed to accommodate a plurality of data communication standards by loading a program associated with the desired standard into the microprogram memories 282 and 482 prior to the beginning of a communication session. This allows a single adaptive digital network interface 62 to communicate with a plurality of multiplex data communications equipment.

Importantly, some of the processing techniques used herein could be similarly used with other types of data processors to increase processing speeds. Specifically, the technique associated with the JVEC command could be used with other types of data processors with beneficial results.

Although a preferred embodiment of the invention has been described in detail, it should be understood that various changes, substitutions and alterations can be made therein without departing from the spirit and scope of the invention as defined by the appended claims.

What is claimed is:

1. A method of serially transmitting data bits over a plurality of time-multiplexed channels on a digital telecommunication circuit, comprising the steps of:
   determining one or more time intervals associated with a first channel and one or more time intervals associated with a second channel;
   transmitting data bits associated with said first channel during one or more of said time intervals associated with said first channel;
   generating a non-data bit in response and subsequent to a predetermined pattern of transmitted data bits;

transmitting said non-data bit prior to transmitting a next data bit; and transmitting data associated with said second channel after transmitting a predetermined number of data and non-data bits associated with said first channel.

2. The method of claim 1 wherein said data and non-data bits are transmitted into a first-in, first-out memory prior to transmission on the digital communication circuit.

3. The method of claim 1 and further comprising the steps of:

accessing a first data unit comprising a predetermined number of data bits associated with said first channel; and storing the untransmitted data bits of said first data unit prior to transmitting data associated with said second channel.

4. The method of claim 3 and further comprising the step of storing the number of data bits of said first data unit transmitted prior to transmitting data associated with said second channel.

5. The method of claim 3 and further comprising the step of storing the number of data bits of said first data unit which were not transmitted prior to transmitting data associated with said second channel.

6. The method of claim 1 wherein said predetermined pattern of data bits occurs when a predetermined number of consecutive data bits having the same predetermined binary value are transmitted.

7. The method of claim 1 wherein the length of said time intervals associated with said first channel may be varied.

8. An apparatus for serially transmitting data bits over a plurality of time-multiplexed channels on a digital telecommunication circuit, comprising:

means for determining one or more time intervals associated with a first channel and one or more time intervals associated with a second channel;

means for transmitting data bits over a first channel during one or more of said predetermined time intervals associated with said first channel;

means for generating a non-data bit in response to a predetermined pattern of transmitted data bits;

means for transmitting said non-data bit prior to transmitting a next data bit; and means for detecting the number of data and non-data bits which have been transmitted on said first channel, said apparatus transmitted data associated with a second channel after detection of a predetermined number of data and non-data bits.

9. The apparatus of claim 8 and further comprising a first-in, first-out memory, said first-in, first-out memory operable to receive data from said means for transmitting data bits.

10. The apparatus of claim 8 and further comprising:

means for accessing a data unit comprising a predetermined number of data bits associated with said first channel;

a memory for storing the untransmitted data bits of said first data unit prior to transmitting data associated with said second channel.

11. The apparatus of claim 10 wherein said memory for storing the untransmitted data bits also stores the number of data bits of said first data unit transmitted prior to transmitting data associated with said second channel.

12. The apparatus of claim 10 wherein said memory for storing the untransmitted data bits also stores the number of data bits of said first data unit which were not transmitted prior to transmitting data associated with said second channel.

13. The apparatus of claim 8 wherein said predetermined pattern of data bits occurs when a predetermined number of consecutive data bits having the same predetermined binary value are transmitted.

14. The apparatus of claim 8 wherein the bandwidth of said first channel may be changed by varying said predetermined number of data and non-data bits.

15. A method of serially receiving data bits over a plurality of time-multiplexed channels on a digital telecommunication circuit, comprising the steps of:

determining one or more time intervals associated with a first channel and one or more time intervals associated with a second channel;

receiving data bits during one or more of said predetermined time intervals associated with said first channel;

detecting a non-data bit in response and subsequent to a predetermined patter of received data bits;

removing said non-data bit from a data stream of received data bits prior to receiving a next data bit; and receiving data associated with a second channel after a predetermined number of data and non-data bits have been received on said first channel.

16. The method of claim 15 wherein said data and non-data bits are received into a first-in, first-out memory prior to grouping said data bits into a first data unit.

17. The method of claim 15 and further comprising the step of storing said received data bits of a first data unit prior to receiving data associated with said second channel, said first data unit having a predetermined number of bits.

18. The method of claim 17 and further comprising the step of storing the number of data bits of said first data unit received prior to receiving data associated with said second channel.

19. The method of claim 17 and further comprising the step of storing the number of data bits of said first data unit which were not received prior to receiving data associated with said second channel.

20. The method of claim 15 wherein said predetermined pattern of data bits occurs when a predetermined number of consecutive data bits having the same predetermined binary value are received.

21. The method of claim 15 wherein the bandwidth of said first channel may be changed by varying said predetermined number of data and non-data bits.

22. An apparatus for serially receiving data bits over a plurality of time-multiplexed channels on a digital telecommunication circuit, comprising:

means for determining one or more time intervals associated with a first channel and one or more time intervals associated with a second channel;

means for receiving bits over a first channel during one or more of said predetermined time intervals associated with said first channel;

means for detecting a non-data bit in response to a predetermined pattern of received bits, said non-data bit detected prior to receiving the next data bit; and means for receiving data associated with a second channel after a predetermined number of data and non-data bits have been received on said first channel.

23. The apparatus of claim 22 and further comprising a first-in, first-out memory, said first-in, first-out memory operable to input buts from said digital telecommunication circuit, and said means for receiving bits operable to receive bits from said first-in, first-out memory.

24. The apparatus of claim 22 and further comprising means for storing the received data bits of a data unit associated with first channel prior to receiving data associated with said second channel, said data unit having a predetermined number of data bits.

25. A method of serially transmitting and receiving data bits over a plurality of time-multiplexed channels on a digital telecommunication circuit, comprising the steps of:
- determining one or more time intervals associated with a first transmitting channel and one or more time intervals associated with a first receiving channel;
- transmitting data bits associated with said first transmitting channel during one or more of said first transmitting time intervals;
- generating a non-data bit in response and subsequent to transmitting a predetermined patter of data bits;
- transmitting said non-data bit prior to transmitting a next data bit;
- transmitting data bits associated with a second transmitting channel after transmitting a predetermined number of data and non-data bits associated with said first transmitting channel;
- receiving data bits associated with said first receiving channel during one or more of said first receiving time intervals;
- detecting a non-data bit in response and subsequent to receiving a predetermined pattern of data bits;
- removing said non-data bit from a data stream of received data bits prior to receiving a next data bit; and
- receiving data associated with a second receiving channel after receiving a predetermined number of data and non-data bits associated with said first receiving channel.

26. An apparatus for serially transmitting and receive data bits over a plurality of time-multiplexed channels on a digital telecommunication circuit, comprising:
- means for determining one or more time intervals associated with a first transmitting channel and one or more time intervals associated with a first receiving channel;
- means for transmitting data bits associated with said first transmitting channel during one or more of said first transmitting time intervals;
- means for generating a non-data bit in response and subsequent to transmitting a predetermined pattern of data bits;
- means for transmitting said non-data bit prior to transmitting a next data bit;
- means for transmitting data bits associated with a second transmitting channel after transmitting a predetermined number of data and non-data bits associated with said first transmitted channel;
- means for receiving data bits associated with said first receiving channel during one or more of said first receiving time intervals;
- means for detecting a non-data bit in response and subsequent to receiving a predetermined patter of data bits;
- means for removing said non-data bit from a data stream of received data bits prior to receiving a next data bit; and
- means for receiving data associated with a second receiving channel after receiving a predetermined number of data and non-data bits associated with said first receiving channel.

* * * * *